US012711910B2

(12) United States Patent
Lim et al.

(10) Patent No.: US 12,711,910 B2
(45) Date of Patent: Aug. 18, 2026

(54) PIXEL CIRCUIT, DISPLAY DEVICE INCLUDING THE SAME AND ELECTRONIC DEVICE INCLUDING THE SAME

(71) Applicant: SAMSUNG DISPLAY CO., LTD., Yongin-si (KR)

(72) Inventors: Jaekeun Lim, Yongin-si (KR); Bon-Seog Gu, Yongin-si (KR); Jinyoung Roh, Yongin-si (KR); Hae-Kwan Seo, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/056,571

(22) Filed: Feb. 18, 2025

(65) Prior Publication Data

US 2025/0316219 A1 Oct. 9, 2025

(30) Foreign Application Priority Data

Apr. 8, 2024 (KR) ........................ 10-2024-0047633

(51) Int. Cl.
*G09G 3/32* (2016.01)

(52) U.S. Cl.
CPC ....... *G09G 3/32* (2013.01); *G09G 2300/0819* (2013.01); *G09G 2310/08* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 10,977,997 B2 * | 4/2021 | Kim | ..................... | G09G 3/3275 |
| 12,020,640 B2 * | 6/2024 | Kim | ..................... | G09G 3/3233 |
| 12,322,311 B2 * | 6/2025 | Park | ..................... | G09G 3/2096 |
| 12,475,848 B2 * | 11/2025 | Shin | ..................... | G09G 3/3266 |

(Continued)

FOREIGN PATENT DOCUMENTS

| | | |
|---|---|---|
| KR | 10-2023-0015037 A | 1/2023 |
| KR | 10-2023-0082766 A | 6/2023 |
| KR | 10-2023-0127383 A | 9/2023 |

OTHER PUBLICATIONS

Extended European Search Report dated May 26, 2025 from the European Patent Office for European Patent Application No. 25168836.2, 16 pages.

*Primary Examiner* — Dorothy Harris
(74) *Attorney, Agent, or Firm* — F. CHAU & ASSOCIATES, LLC

(57) ABSTRACT

A pixel circuit includes a light emitting element, a first switch connected to first, second and third nodes, a second switch applying a data voltage to the second node in response to a writing gate signal, a third switch connecting the first and third nodes in response to a compensation gate signal, a capacitor connected to the first and fourth nodes, a fifth switch receiving a power voltage and connected to the second node, a sixth switch connected to the third node and an anode of the light emitting element, an eighth switch receiving a reference voltage and connected to the fourth node and a ninth switch receiving the power voltage and connected to the fourth node. One of the eighth and ninth switches is an N-type transistor and the other is a P-type transistor. Control electrodes of the fifth and sixth switches receive different signals.

30 Claims, 57 Drawing Sheets

(56) References Cited

U.S. PATENT DOCUMENTS

| | | | | |
|---|---|---|---|---|
| 2010/0265237 | A1* | 10/2010 | Tsuge | G09G 3/3275 345/76 |
| 2014/0111563 | A1* | 4/2014 | Hwang | G09G 3/003 345/691 |
| 2018/0166025 | A1* | 6/2018 | Zhou | G09G 3/3233 |
| 2018/0190197 | A1* | 7/2018 | Chang | H10K 59/1216 |
| 2019/0371238 | A1* | 12/2019 | Gao | H10K 59/131 |
| 2020/0211476 | A1* | 7/2020 | Park | G09G 3/3233 |
| 2020/0388214 | A1* | 12/2020 | Yang | G09G 3/3266 |
| 2021/0193046 | A1* | 6/2021 | Wang | G09G 3/3258 |
| 2021/0241689 | A1* | 8/2021 | Lee | H10D 86/60 |
| 2021/0256916 | A1 | 8/2021 | Park et al. | |
| 2022/0122534 | A1* | 4/2022 | Kim | G09G 3/3233 |
| 2023/0186832 | A1 | 6/2023 | Shin et al. | |
| 2023/0206838 | A1 | 6/2023 | Lee et al. | |

* cited by examiner

PIXEL CIRCUIT, DISPLAY DEVICE INCLUDING THE SAME AND ELECTRONIC DEVICE INCLUDING THE SAME

CROSS-REFERENCE TO RELATED APPLICATION

This U.S. patent application claims priority under 35 U.S.C. § 119 to Korean Patent Application No. 10-2024-0047633, filed on Apr. 8, 2024 in the Korean Intellectual Property Office KIPO, the disclosure of is incorporated by reference in its entirety herein.

1. Technical Field

Embodiments of the present inventive concept are directed to a pixel circuit, a display apparatus including the pixel circuit and an electronic apparatus including the display apparatus.

2. Discussion of Related Art

Flat panel displays are thin, lightweight screens used in various electronic devices, like TVs, monitors, and smartphones. Unlike traditional cathode-ray tube (CRT) displays, flat panels use modern technology such as liquid crystal displays (LCDs), organic light-emitting diodes (OLEDs), or plasma to produce images with high resolution and clarity. They are known for their slim design, energy efficiency, and ability to deliver vivid colors and sharp visuals in a compact form factor.

A display apparatus of a flat panel display may include a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

The display panel in some flat panel displays, like Organic Light-Emitting Diode (OLED) and MicroLED panels, have pixels with a light-emitting element. However, the display panel may sometimes consume more power than necessary since a driving current of the light emitting element is based on a difference between a power voltage and a data voltage.

A pixel circuit in the display panel includes a driving switching element to control current flow the light-emitting element within each pixel. However, display quality may deteriorate due to a hysteresis of the driving switching element.

SUMMARY

Embodiments of the present inventive concept provide a pixel circuit including a light emitting element having a driving current determined based on a difference between a reference voltage, which is lower than a first power voltage, and a data voltage and a driving switching element in which a bias operation is operated to reduce a power consumption and to enhance display quality.

Embodiments of the present inventive concept also provide a display apparatus including the pixel circuit.

Embodiments of the present inventive concept also provide an electronic apparatus including the display panel.

In an embodiment of a pixel circuit according to the present inventive concept, the pixel circuit includes a light emitting element, a first switching element including a control electrode connected to a first node, a first electrode connected to a second node and a second electrode connected to a third node, a second switching element configured to apply a data voltage to the second node in response to a data writing gate signal, a third switching element configured to connect the first node to the third node in response to a compensation gate signal, a capacitor including a first electrode connected to the first node and a second electrode connected to a fourth node, a fifth switching element including a first electrode configured to receive a first power voltage and a second electrode connected to the second node, a sixth switching element including a first electrode connected to the third node and a second electrode connected to an anode electrode of the light emitting element, an eighth switching element including a first electrode configured to receive a reference voltage and a second electrode connected to the fourth node and a ninth switching element including a first electrode configured to receive the first power voltage and a second electrode connected to the fourth node. One of the eighth switching element and the ninth switching element is an N-type transistor and the other is a P-type transistor. For example, the eighth switching element and the ninth switching element may be complementary transistors. A signal applied to a control electrode of the fifth switching element is different from a signal applied to a control electrode of the sixth switching element.

In an embodiment, the reference voltage may be lower than the first power voltage.

In an embodiment, the driving current of the light emitting element may be determined based on a difference between the reference voltage and the data voltage.

In an embodiment, the eighth switching element may further include a control electrode configured to receive a bias gate signal. The ninth switching element may further include a control electrode configured to receive the bias gate signal.

In an embodiment, the pixel circuit may further include a fourth switching element including a control electrode configured to receive an initialization gate signal, a first electrode connected to the first node and a second electrode configured to receive a first initialization voltage and a seventh switching element including a control electrode configured to receive the bias gate signal, a first electrode configured to receive a second initialization voltage and a second electrode connected to the anode electrode.

In an embodiment, the seventh switching element and the eighth switching element may be N-type transistors and the ninth switching element may be a P-type transistor.

In an embodiment, the pixel circuit may further include a fourth switching element including a control electrode configured to receive an initialization gate signal, a first electrode connected to the first node and a second electrode configured to receive a first initialization voltage and a seventh switching element including a control electrode configured to receive the data writing gate signal, a first electrode configured to receive a second initialization voltage and a second electrode connected to the anode electrode.

In an embodiment, the pixel circuit may further include a fourth switching element including a control electrode configured to receive an initialization gate signal, a first electrode connected to the first node and a second electrode configured to receive a first initialization voltage and a seventh switching element including a control electrode configured to receive the initialization gate signal, a first electrode configured to receive a second initialization voltage and a second electrode connected to the anode electrode.

In an embodiment, the pixel circuit may further include a fourth switching element including a control electrode configured to receive an initialization gate signal, a first electrode connected to the first node and a second electrode configured to receive a first initialization voltage and a seventh switching element including a control electrode configured to receive the compensation gate signal, a first electrode configured to receive a second initialization voltage and a second electrode connected to the anode electrode.

In an embodiment, the pixel circuit may further include a fourth switching element including a control electrode configured to receive an initialization gate signal, a first electrode connected to the first node and a second electrode configured to receive a first initialization voltage and a seventh switching element including a control electrode configured to receive an emission signal, a first electrode configured to receive a second initialization voltage and a second electrode connected to the anode electrode.

In an embodiment, the fifth switching element may further include a control electrode configured to receive the compensation gate signal. The sixth switching element may further include a control electrode configured to receive an emission signal.

In an embodiment, the third switching element and the eighth switching element may be N-type transistors. The first switching element, the second switching element, the fifth switching element, the sixth switching element and the ninth switching element may be P-type transistors.

In an embodiment, the pixel circuit may further include a fourth switching element including a control electrode configured to receive an initialization gate signal, a first electrode connected to the first node and a second electrode configured to receive a first initialization voltage. The eighth switching element may further include a control electrode configured to receive a bias gate signal. The ninth switching element may further include a control electrode configured to receive the bias gate signal. The fifth switching element may further include a control electrode configured to receive the compensation gate signal. The sixth switching element may further include a control electrode configured to receive an emission signal.

In an embodiment, the emission signal may have an inactive level in a first period. The initialization gate signal may have an active level in the first period. The compensation gate signal may have an inactive level in the first period. The data writing gate signal may have an inactive level in the first period. The bias gate signal may have an inactive level in the first period.

In an embodiment, the emission signal may have the inactive level in a second period subsequent to the first period. The initialization gate signal may have an inactive level in the second period. The compensation gate signal may have an active level in the second period. The data writing gate signal may have the inactive level in the second period. The bias gate signal may have an active level in the second period.

In an embodiment, the emission signal may have the inactive level in a third period subsequent to the second period. The initialization gate signal may have the inactive level in the third period. The compensation gate signal may have the active level in the third period. The data writing gate signal may have an active level in the third period. The bias gate signal may have the active level in the third period.

In an embodiment, the emission signal may have the inactive level in a fourth period subsequent to the third period. The initialization gate signal may have the inactive level in the fourth period. The compensation gate signal may have the inactive level in the fourth period. The data writing gate signal may have the inactive level in the fourth period. The bias gate signal may have the active level in the fourth period.

In an embodiment, the emission signal may have an active level in a fifth period subsequent to the fourth period. The initialization gate signal may have the inactive level in the fifth period. The compensation gate signal may have the inactive level in the fifth period. The data writing gate signal may have the inactive level in the fifth period. The bias gate signal may have the inactive level in the fifth period.

In an embodiment, the emission signal may have an inactive level in a first period. The initialization gate signal may have an active level in the first period. The compensation gate signal may have an active level in the first period. The data writing gate signal may have an inactive level in the first period. The bias gate signal may have an inactive level in the first period.

In an embodiment, the fifth switching element may further include a control electrode configured to receive a first emission signal. The sixth switching element may further include a control electrode configured to receive a second emission signal having a waveform different from a waveform of the first emission signal. The ninth switching element may further include a control electrode configured to receive the second emission signal.

In an embodiment, the eighth switching element may further include a control electrode configured to receive the second emission signal.

In an embodiment, the eighth switching element may further include a control electrode configured to receive the first emission signal.

In an embodiment, the pixel circuit may further include a fourth switching element including a control electrode configured to receive an initialization gate signal, a first electrode connected to the first node and a second electrode configured to receive a first initialization voltage and a seventh switching element including a control electrode configured to receive the second emission signal, a first electrode configured to receive a second initialization voltage and a second electrode connected to the anode electrode.

In an embodiment, the first emission signal may have an inactive level in a first period. The second emission signal may have an inactive level in the first period. The initialization gate signal may have an active level in the first period. The compensation gate signal may have an inactive level in the first period. The data writing gate signal may have an inactive level in the first period. The first emission signal may have the inactive level in a second period subsequent to the first period. The second emission signal may have the inactive level in the second period. The initialization gate signal may have an inactive level in the second period. The compensation gate signal may have an active level in the second period. The data writing gate signal may have the inactive level in the second period. The first emission signal may have the inactive level in a third period subsequent to the second period. The second emission signal may have the inactive level in the third period. The initialization gate signal may have the inactive level in the third period. The compensation gate signal may have the active level in the third period. The data writing gate signal may have an active level in the third period. The first emission signal may have an active level in a fourth period subsequent to the third period. The second emission signal may have the inactive level in the fourth period. The initialization gate signal may have the inactive level in the fourth period. The compensation gate signal may have the inactive level in the fourth period. The data writing gate signal may have the inactive level in the fourth period. The first emission signal may have the active level in a fifth period subsequent to the fourth period. The second emission signal may have an active level in the fifth period. The initialization gate signal may have the inactive level in the fifth period. The compensation gate signal may have the inactive level in the fifth period. The data writing gate signal may have the inactive level in the fifth period.

In an embodiment, the pixel may further include a fourth switching element including a control electrode configured to receive an initialization gate signal, a first electrode connected to the first node and a second electrode configured to receive a first initialization voltage and a seventh switching element including a control electrode configured to receive the data writing gate signal, a first electrode configured to receive a second initialization voltage and a second electrode connected to the anode electrode.

In an embodiment, the pixel may further include a fourth switching element including a control electrode configured to receive an initialization gate signal, a first electrode connected to the first node and a second electrode configured to receive a first initialization voltage and a seventh switching element including a control electrode configured to receive the initialization gate signal, a first electrode configured to receive a second initialization voltage and a second electrode connected to the anode electrode.

In an embodiment, the pixel may further include a fourth switching element including a control electrode configured to receive an initialization gate signal, a first electrode connected to the first node and a second electrode configured to receive a first initialization voltage and a seventh switching element including a control electrode configured to receive the compensation gate signal, a first electrode configured to receive a second initialization voltage and a second electrode connected to the anode electrode.

In an embodiment of a display device according to the present inventive concept, the display device includes a display panel that includes a pixel, a gate driver, a data driver configured to apply a data voltage, and a power supply configured to provide a first power voltage. The pixel includes a light emitting element, a first switching element including a control electrode connected to a first node, a first electrode connected to a second node and a second electrode connected to a third node, a second switching element configured to apply the data voltage to the second node in response to a data writing gate signal from the gate driver, a third switching element configured to connect the first node to the third node in response to a compensation gate signal from the gate driver, a capacitor including a first electrode connected to the first node and a second electrode connected to a fourth node, a fifth switching element including a first electrode configured to receive the first power voltage and a second electrode connected to the second node, a sixth switching element including a first electrode connected to the third node and a second electrode connected to an anode electrode of the light emitting element, an eighth switching element including a first electrode configured to receive a reference voltage and a second electrode connected to the fourth node and a ninth switching element including a first electrode configured to receive the first power voltage and a second electrode connected to the fourth node. The eighth switching element and the ninth switching element are complementary transistors. A signal applied to a control electrode of the fifth switching element is different from a signal applied to a control electrode of the sixth switching element.

In an embodiment of an electronic device according to the present inventive concept, the electronic device includes a display device and a power supply to provide a first power voltage to the display device. The display device includes a gate driver, a data driver configured to apply a data voltage, an emission driver and a pixel. The pixel includes a light emitting element, a first switching element including a control electrode connected to a first node, a first electrode connected to a second node and a second electrode connected to a third node, a second switching element configured to apply the data voltage to the second node in response to a data writing gate signal from the gate driver, a third switching element configured to connect the first node and the third node in response to a compensation gate signal from the gate driver, a capacitor including a first electrode connected to the first node and a second electrode connected to a fourth node, a fifth switching element including a first electrode configured to receive a first power voltage and a second electrode connected to the second node, a sixth switching element including a first electrode connected to the third node and a second electrode connected to an anode electrode of the light emitting element, an eighth switching element including a first electrode configured to receive a reference voltage and a second electrode connected to the fourth node and a ninth switching element including a first electrode configured to receive the first power voltage and a second electrode connected to the fourth node. The eighth switching element and the ninth switching element are complementary transistors. A signal applied to a control electrode of the fifth switching element by the gate driver is different from a signal applied to a control electrode of the sixth switching element by the emission driver.

According to the pixel circuit, the display apparatus including the pixel circuit and the electronic apparatus including the display apparatus, the driving current of the light emitting element may be determined based on the difference between the reference voltage, which is lower than the first power voltage, and the data voltage in the pixel circuit. Thus, the power consumption of the pixel circuit may be reduced.

In addition, the bias operation of the first switching element may be performed in the bias period when different signals are applied to the control electrode of the fifth switching element and the control electrode of the sixth switching element and the first switching element and the fifth switching element are turned on while the sixth switching element is turned off. Thus, the hysteresis characteristics of the first switching element may be enhanced so that the display quality of the display panel may be enhanced.

BRIEF DESCRIPTION OF THE DRAWINGS

The above and other features of the inventive concept will become more apparent by describing in detailed embodiments thereof with reference to the accompanying drawings, in which.

DETAILED DESCRIPTION

Hereinafter, the present inventive concept will be explained in detail with reference to the accompanying drawings.

Figure 1:
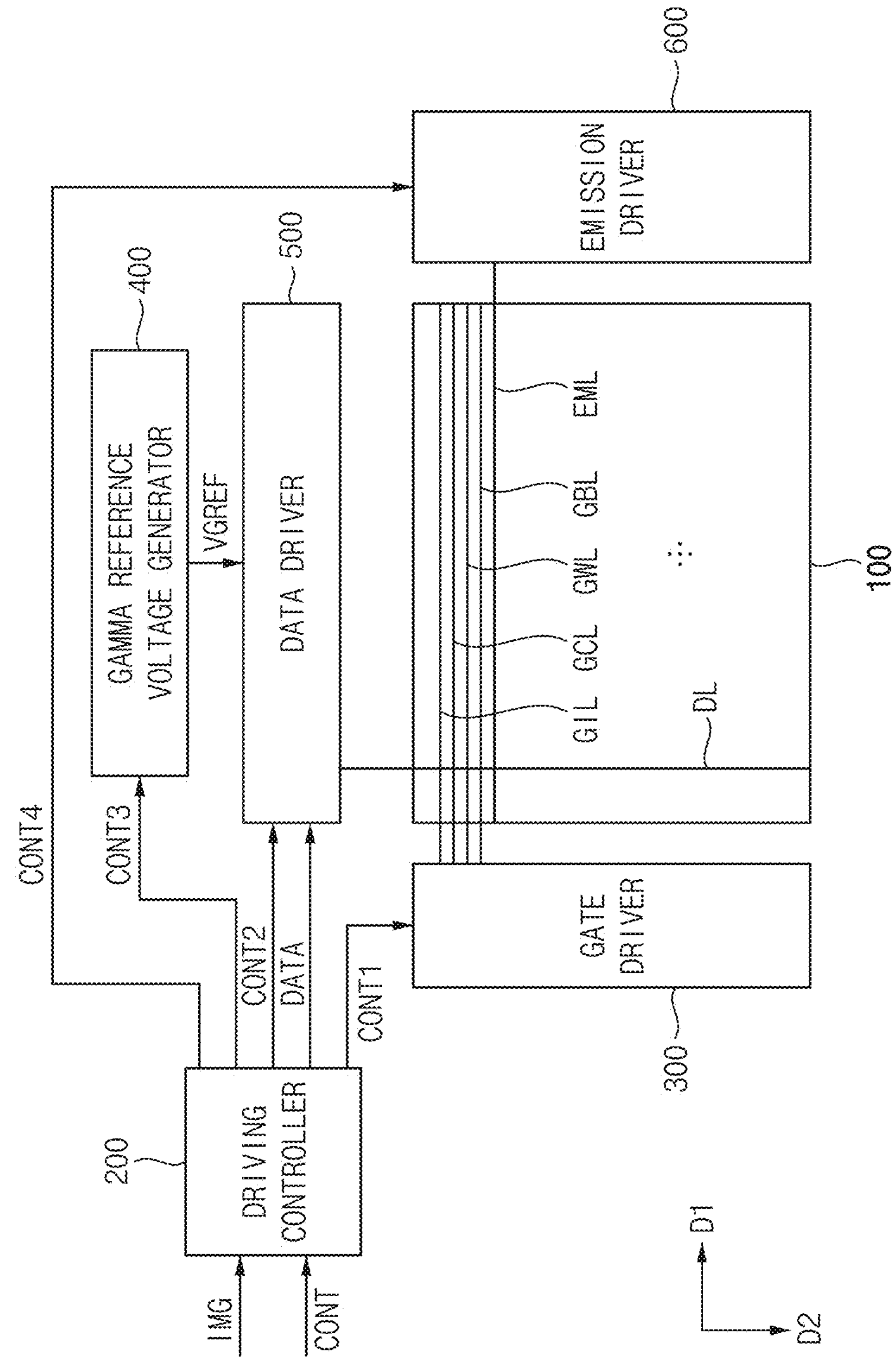
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. The display panel driver includes a driving controller 200 (e.g., a controller circuit), a gate driver 300 (e.g., a first driver circuit), a gamma reference voltage generator 400, a data driver 500 (e.g., a second driver circuit) and an emission driver 600 (e.g., a third driver circuit).

The display panel 100 has a display region on which an image is displayed and a peripheral region adjacent to the display region. The peripheral region may surround the display region.

The display panel 100 includes a plurality of gate lines GIL, GCL, GWL and GBL, a plurality of data lines DL, a plurality of emission lines EML and a plurality of pixels electrically connected to the gate lines GIL, GCL, GWL and GBL, the data lines DL and the emission lines EML. The gate lines GIL, GCL, GWL and GBL may extend in a first direction D1, the data lines DL may extend in a second direction D2 crossing the first direction D1 and the emission lines EML may extend in the first direction D1. For example, the first direction D1 may be perpendicular to the second direction D2, but is not limited thereto.

The driving controller 200 receives input image data IMG and an input control signal CONT from an external apparatus (e.g., a host or an application processor). For example, the input image data IMG may include red image data, green image data and blue image data. The input image data IMG may include white image data in addition to the red image data, green image data and blue image data. The input image data IMG may include magenta image data, cyan image data and yellow image data instead of the red image data, green image data and blue image data. The input control signal CONT may include a master clock signal and a data enable signal. The master clock signal may provide the primary timing reference for the display system, setting the rate at which data is sent and processed. The data enable signal indicates when valid data is being sent for display. The input control signal CONT may further include a vertical synchronizing signal and a horizontal synchronizing signal. The vertical synchronizing signal indicates the beginning of a new frame by synchronizing the start of each vertical scan. The horizontal synchronizing signal marks the start of each new row of pixels or horizontal line.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal. The vertical start signal may indicate the beginning of each vertical scan and the gate clock signal may control the timing of row activation for driving each row in sequence from top to bottom.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal. The horizontal start signal indicates the beginning of a new horizontal line of pixel. The load signal may be used for maintaining synchronization between image data being processed and physical pixels being driven.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400. The voltages generated by the gamma reference voltage generator 400 may help control the brightness and color accuracy of each pixel.

The driving controller 200 generates the fourth control signal CONT4 for controlling an operation of the emission driver 600 based on the input control signal CONT, and outputs the fourth control signal CONT4 to the emission driver 600. The emission driver 600 may be for controlling the brightness of each pixel by regulating the amount of current supplied to the light-emitting elements in the display panel.

The gate driver 300 generates gate signals driving the gate lines GIL, GCL, GWL and GBL in response to the first control signal CONT1 received from the driving controller 200. The gate driver 300 may output the gate signals to the gate lines GIL, GCL, GWL and GBL. The gate signals may include an initialization gate signal, a compensation gate signal and a data writing gate signal. The initialization gate signal may reset or initialize the pixel circuit at the start of each frame or cycle. The compensation gate signal may compensate for variations in pixel performance due to factors like aging, temperature, and manufacturing inconsistencies. The data writing gate signal may allow pixel data to be written to each pixel in the display panel.

In an embodiment of the present inventive concept, the gate driver 300 is integrated on the peripheral region of the display panel 100. In an embodiment of the present inventive concept, the gate driver 300 is mounted on the peripheral region of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA. For example, the gamma reference voltage VGREF may be set to match specific brightness levels (or gray levels) in the data signal that the display panel needs to render accurately.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. For example, the data driver 500 may transform digital image data into precise analog voltages (i.e., the data voltages) that can drive each pixel on the display panel, with these voltages adjusted according to the gamma correction provided by VGREF. The data driver 500 outputs the data voltages to the data lines DL.

In an embodiment of the present inventive concept, the data driver 500 is integrated on the peripheral region of the display panel 100. In an embodiment of the present inventive concept, the data driver 500 is mounted on the peripheral region of the display panel 100.

The emission driver 600 generates emission signals to drive the emission lines EML in response to the fourth control signal CONT4 received from the driving controller 200. The emission driver 600 may output the emission signals to the emission lines EML.

In an embodiment of the present inventive concept, the emission driver 600 is integrated on the peripheral region of the display panel 100. In an embodiment of the present inventive concept, the emission driver 600 is mounted on the peripheral region of the display panel 100.

Although the gate driver 300 is illustrated as being disposed on a first side of the display panel 100 and the emission driver 600 is illustrated as being disposed on a second side of the display panel 100 opposite to the first side in FIG. 1 for convenience of explanation, the present inventive concept is not limited thereto. For example, both of the gate driver 300 and the emission driver 600 may be disposed on the first side of the display panel 100. For example, the gate driver 300 and the emission driver 600 may be integrally formed. For example, both of the gate driver 300 and the emission driver 600 may be disposed on both sides of the display panel 100. For example, the gate driver 300 may be divided into a first sub-gate driver to drive some gate lines and a second sub-gate driver to drive the rest of the gate lines; and the emission driver 600 may be divided into a first sub-emission driver to drive some emission lines and a second sub-emission driver to drive the rest of the emission lines.

Figure 2:
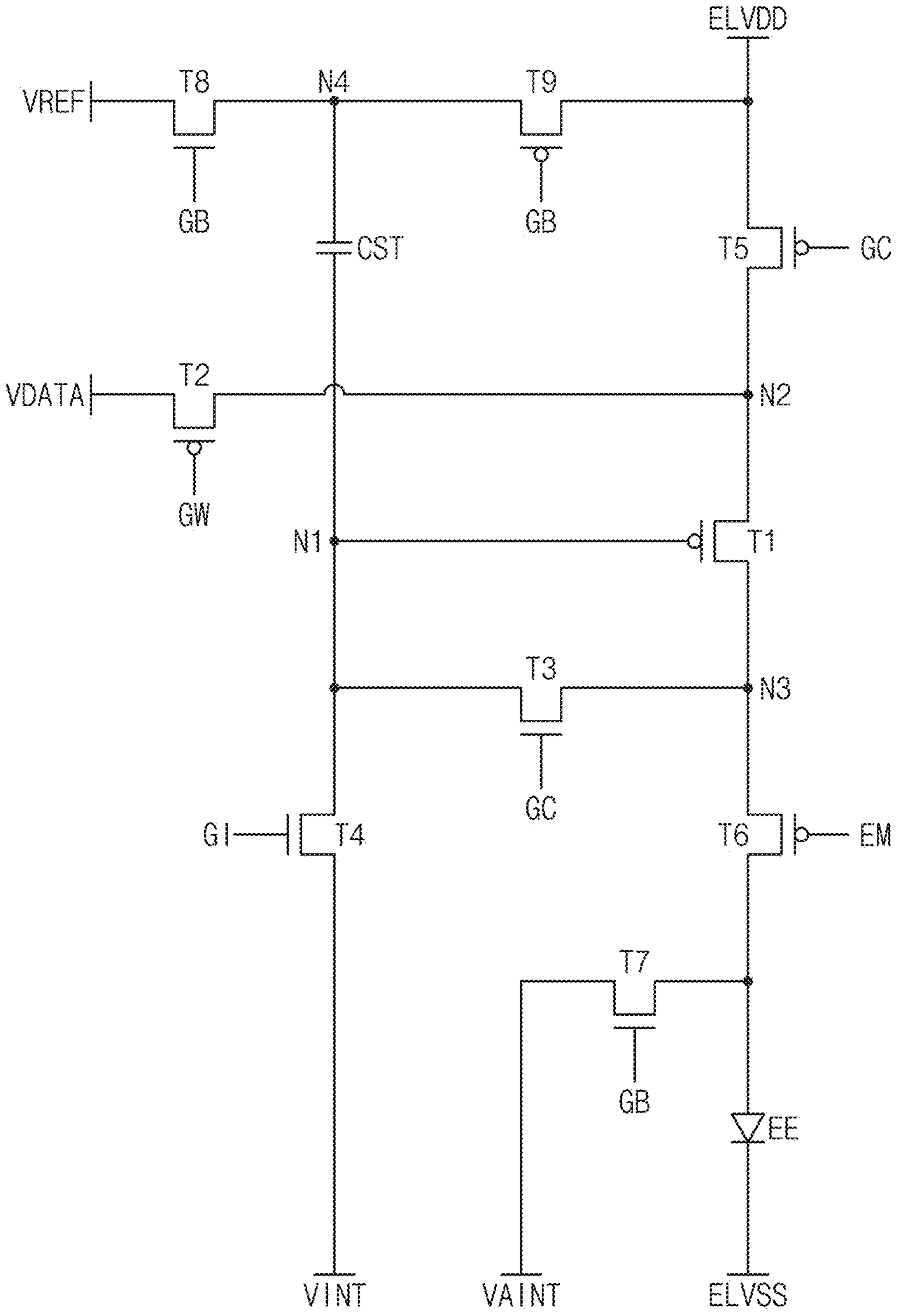
FIG. 2 is a circuit diagram illustrating a pixel circuit of a display panel of FIG. 1.

FIG. 2 is a circuit diagram illustrating the pixel circuit of the display panel 100 of FIG. 1 according to an embodiment.

Referring to FIGS. 1 and 2, the pixel circuit includes a light emitting element EE, a first switching element T1 (e.g., a first transistor), a second switching element T2 (e.g., a first transistor), a third switching element T3 (e.g., a third transistor), a capacitor CST, a fifth switching element T5 (e.g., a fifth transistor), a sixth switching element T6 (e.g., a sixth transistor), an eighth switching element T8 (e.g., an eighth transistor) and a ninth switching element T9 (e.g., a ninth transistor).

The first switching element T1 includes a control electrode connected to a first node N1, a first electrode connected to a second node N2 and a second electrode connected to a third node N3. The first switching element T1 may apply a driving current to the light emitting element EE. The first switching element T1 may be referred to as a driving switching element (or a driving transistor).

The second switching element T2 applies a data voltage VDATA to the second node N2 in response to a data writing gate signal GW. For example, the second switching element T2 may include a control electrode receiving the data writing gate signal GW, a first electrode receiving the data voltage VDATA and a second electrode connected to the second node N2. In an embodiment, the gate driver 300 provides the data writing gate signal GW.

The third switching element T3 connects the first node N1 and the third node N3 in response to a compensation gate signal GC. For example, the third switching element T3 may include a control electrode receiving the compensation gate signal GC, a first electrode connected to the first node N1 and a second electrode connected to the third node N3.

The capacitor CST includes a first electrode connected to the first node N1 and a second electrode connected to a fourth node N4.

The fifth switching element T5 includes a first electrode receiving a first power voltage ELVDD and a second electrode connected to the second node N2. The sixth switching element T6 includes a first electrode connected to the third node N3 and a second electrode connected to an anode electrode of the light emitting element EE.

In an embodiment, a signal applied to a control electrode of the fifth switching element T5 is different from a signal applied to a control electrode of the sixth switching element T6.

In an embodiment, a control electrode of the fifth switching element T5 receives the compensation gate signal GC and a control electrode of the sixth switching element T6 receives the emission signal EM. The compensation gate signal GC may be provided by the gate driver 300 and the emission signal EM may be provided by the emission driver 600.

The eighth switching element T8 includes a first electrode receiving a reference voltage VREF and a second electrode connected to the fourth node N4. The ninth switching element T9 includes a first electrode receiving a first power voltage ELVDD and a second electrode connected to the fourth node N4. In an embodiment, one of the eighth switching element T8 and the ninth switching element T9 is an N-type transistor and the other is a P-type transistor. For example, the eighth switching element T8 and the ninth switching element T9 may be complementary transistors. The eighth switching element T8 and the ninth switching element T9 may together form a Complementary Metal Oxide Semiconductor (CMOS) circuit.

In an embodiment, a control electrode of the eighth switching element T8 and a control electrode of the ninth switching element T9 both receive a bias gate signal GB. In an embodiment, the gate driver 300 provides the bias gate signal GB.

In an embodiment, the eighth switching element T8 is an N-type transistor and the ninth switching element T9 is a P-type transistor. For example, the eighth switching element T8 and the ninth switching element T9 may be complementary transistors. In an embodiment, a same signal (the bias gate signal GB) is applied to the control electrode of the eighth switching element T8 and the control electrode of the ninth switching element T9. Thus, when the eight switching element T8 is turned on, the ninth switching element T9 may be turned off. When the eight switching element T8 is turned off, the ninth switching element T9 may be turned on.

In an embodiment, the driving current of the light emitting element EE is determined by a difference between the reference voltage VREF and the data voltage VDATA. In an embodiment, the reference voltage VREF is lower than the first power voltage ELVDD. In a pixel circuit different from the inventive concept, the driving current of the light emitting element EE is determined based on a difference between the first power voltage ELVDD and the data voltage VDATA. In contrast, in the pixel circuit of the present embodiment, the driving current of the light emitting element EE is determined based on the difference between the reference voltage VREF, which is lower than the first power voltage ELVDD, and the data voltage VDATA. Thus, levels of the data voltages VDATA may be reduced and a level of a data power voltage applied to the data driver 500 may also be reduced.

A power consumption of the data driver 500 may be determined by Equation 1.

$$P = f \cdot C \cdot V_{LIN} \cdot \Delta V \quad \text{[Equation 1]}$$

Herein, P is the power consumption of the data driver 500, f is a driving frequency of the display panel 100, C is a total capacitance of the data line, $V_{LIN}$ is the data power voltage and ΔV is a toggling degree of the data voltage VDATA.

In the present embodiment, the data power voltage $V_{LIN}$ may be reduced so that the power consumption of the data driver 500 may be reduced. In a pixel circuit different from the inventive concept, a gate-source voltage Vgs of the first switching element T1 is Vgs=ELVDD−(VDATA−VTH). However, in the present pixel circuit, a gate-source voltage Vgs of the first switching element T1 is Vgs=VREF−(VDATA−VTH). Herein, VTH may be a threshold voltage of the first switching element T1.

Accordingly, the levels of the data voltages VDATA may be decreased based on a difference between the first power voltage ELVDD and the reference voltage VREF. For example, when the difference between the first power voltage ELVDD and the reference voltage VREF is 1.5V, a data voltage corresponding to a black grayscale value may be decreased by 1.5V compared to a conventional data voltage corresponding to the black grayscale value and a data voltage corresponding to a white grayscale value may be decreased by 1.5V compared to a conventional data voltage corresponding to the white grayscale value.

The pixel circuit may further include a fourth switching element T4 and a seventh switching element T7.

The fourth switching element T4 may include a control electrode receiving an initialization gate signal GI, a first electrode connected to the first node N1 and a second electrode receiving a first initialization voltage VINT. The gate driver 300 may supply the initialization gate signal GI.

In the present embodiment, the seventh switching element T7 may include a control electrode receiving the bias gate signal GB, a first electrode receiving a second initialization voltage VAINT and a second electrode connected to an anode electrode of the light emitting element EE. In an embodiment of the present inventive concept, the first initialization voltage VINT and the second initialization voltage VAINT have different levels. Alternatively, the first initialization voltage VINT and the second initialization voltage VAINT may have the same level.

A cathode electrode of the light emitting element EE may receive a second power voltage ELVSS.

For example, the first power voltage ELVDD may be a high power voltage for emitting the light emitting element EE and the second power voltage ELVSS may be a low power voltage for emitting the light emitting element EE. The first power voltage ELVDD may be greater than the second power voltage ELVSS.

Each of the first to ninth switching elements T1 to T9 may include a single transistor. However, the present inventive concept is not limited thereto. Alternatively, at least one of the first to ninth switching elements T1 to T9 may include a plurality of transistors connected to each other in series.

In the present embodiment, some of the transistors in the pixel circuit may be P-type transistors and some of the transistors in the pixel circuit may be N-type transistors. For example, the P-type transistor may be a low temperature polycrystalline silicon (LTPS) transistor. For example, the N-type transistor may be an oxide semiconductor transistor.

For example, the first switching element T1 may be the P-type transistor. The second switching element T2 may be the P-type transistor. The third switching element T3 may be the N-type transistor. The fourth switching element T4 may be the N-type transistor. The fifth switching element T5 may be the P-type transistor. The sixth switching element T6 may be the P-type transistor. The seventh switching element T7 may be the N-type transistor. The eighth switching element T8 may be the N-type transistor. The ninth switching element T9 may be the P-type transistor.

Figure 3:
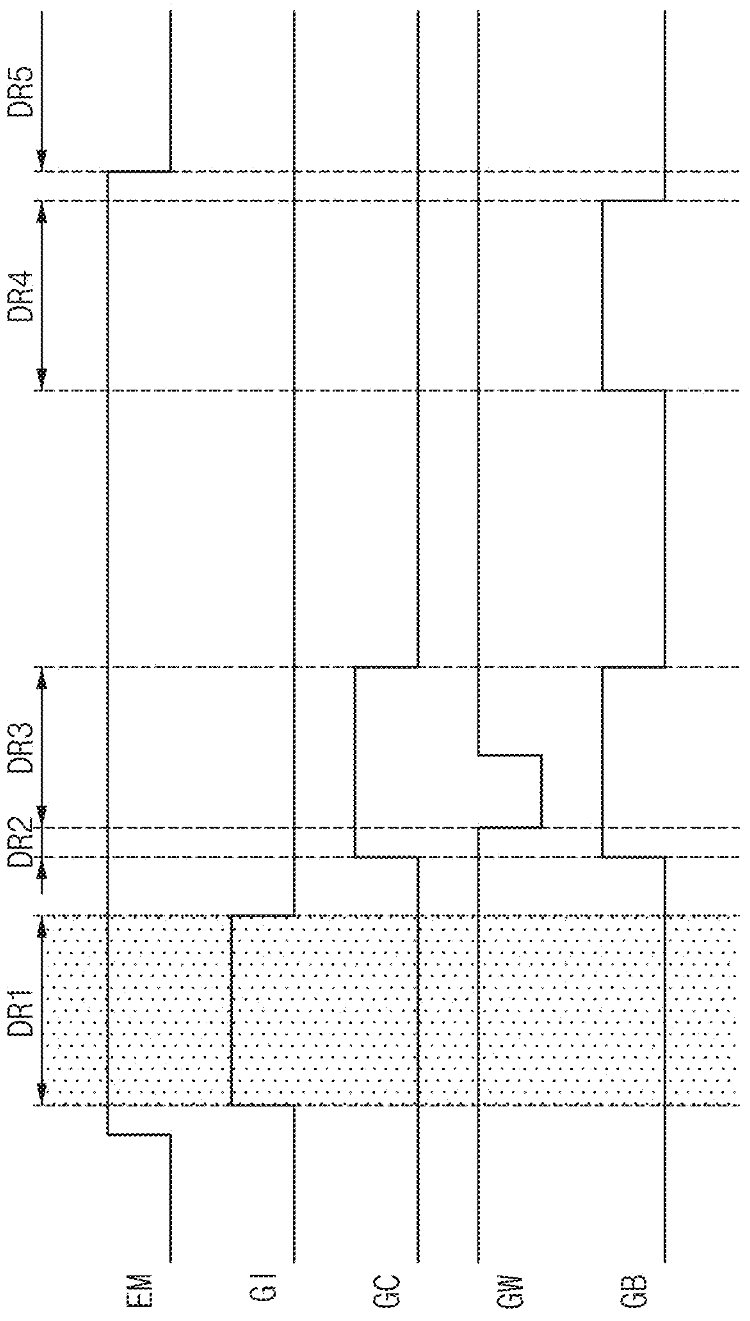
FIG. 3 is a timing diagram illustrating an example of an operation of the pixel circuit of FIG. 2 in a first period.
Figure 4:
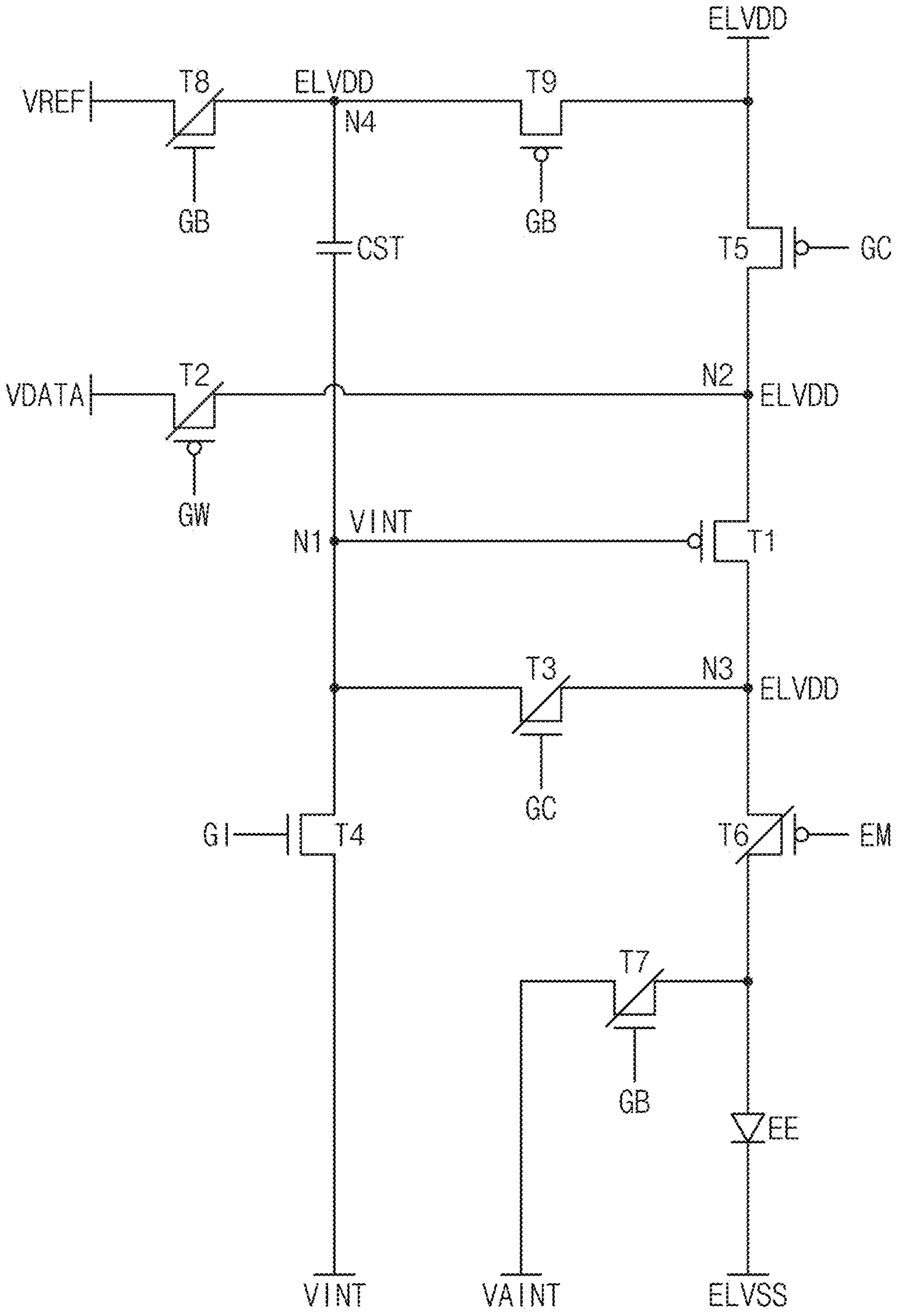
FIG. 4 is a circuit diagram illustrating an example of the operation of the pixel circuit of FIG. 2 in the first period.
Figure 5:
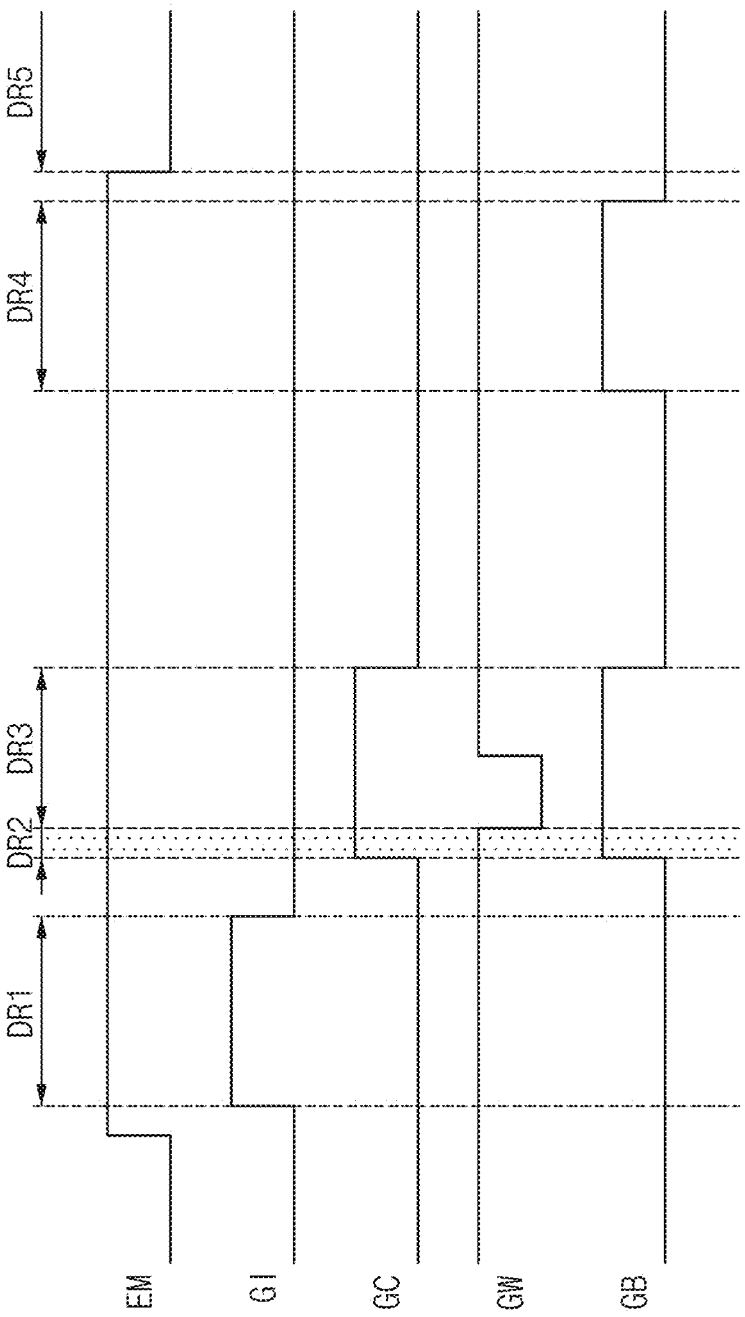
FIG. 5 is a timing diagram illustrating an example of an operation of the pixel circuit of FIG. 2 in a second period.
Figure 6:
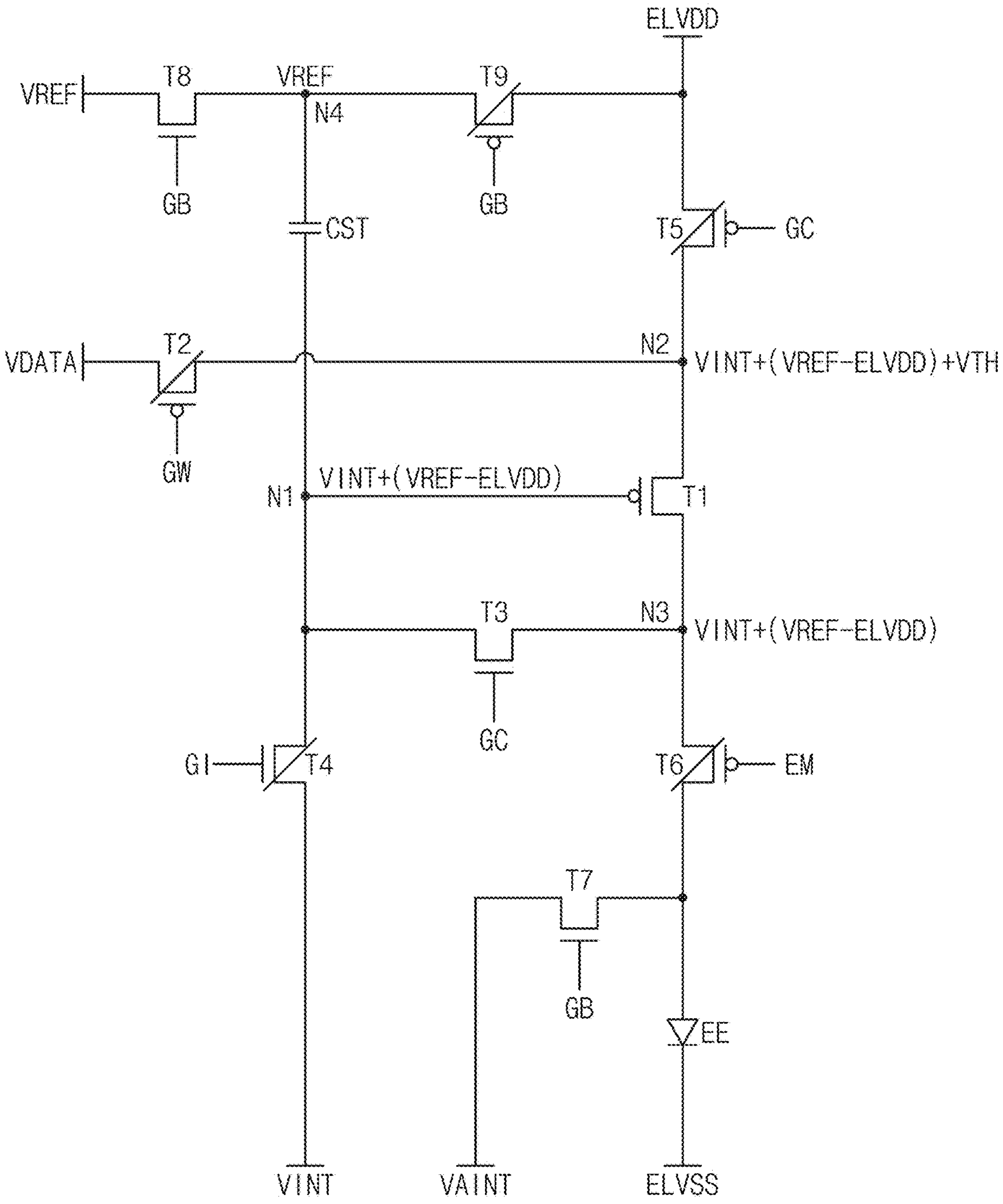
FIG. 6 is a circuit diagram illustrating an example of the operation of the pixel circuit of FIG. 2 in the second period.
Figure 7:
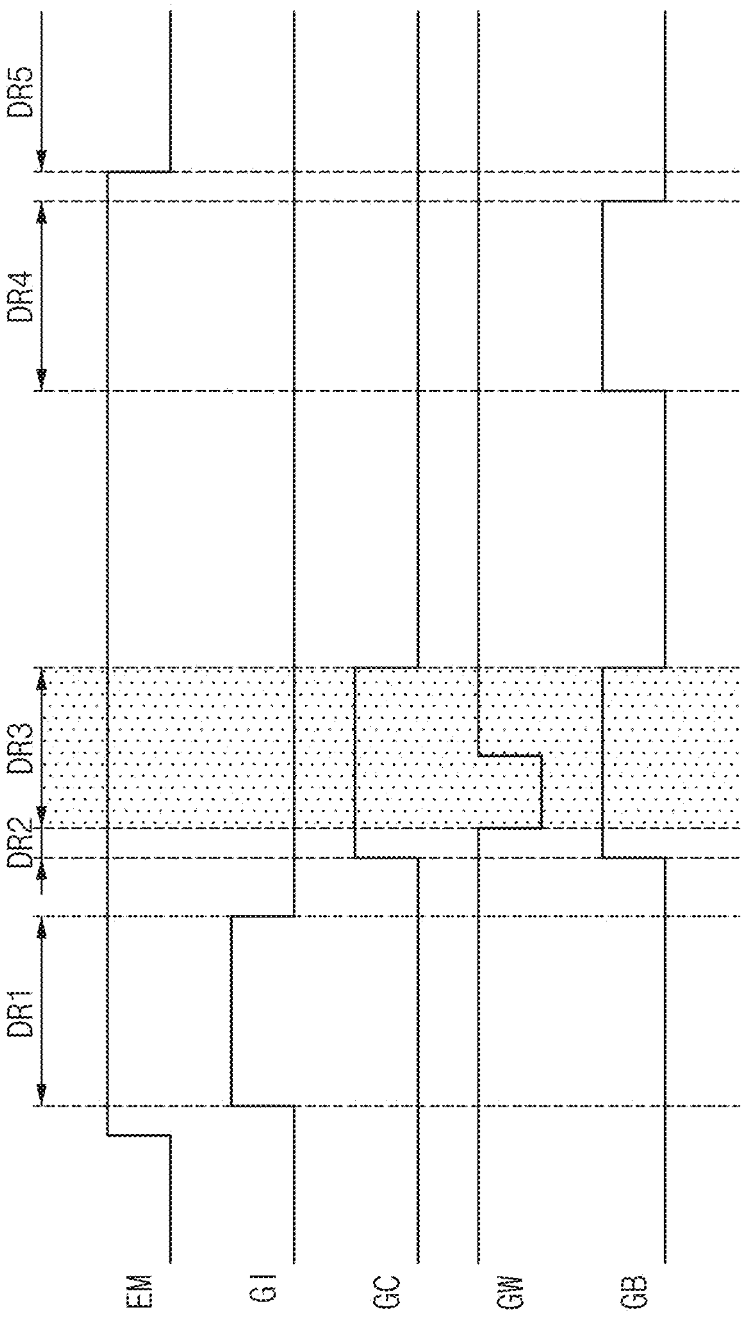
FIG. 7 is a timing diagram illustrating an example of an operation of the pixel circuit of FIG. 2 in a third period.
Figure 8:
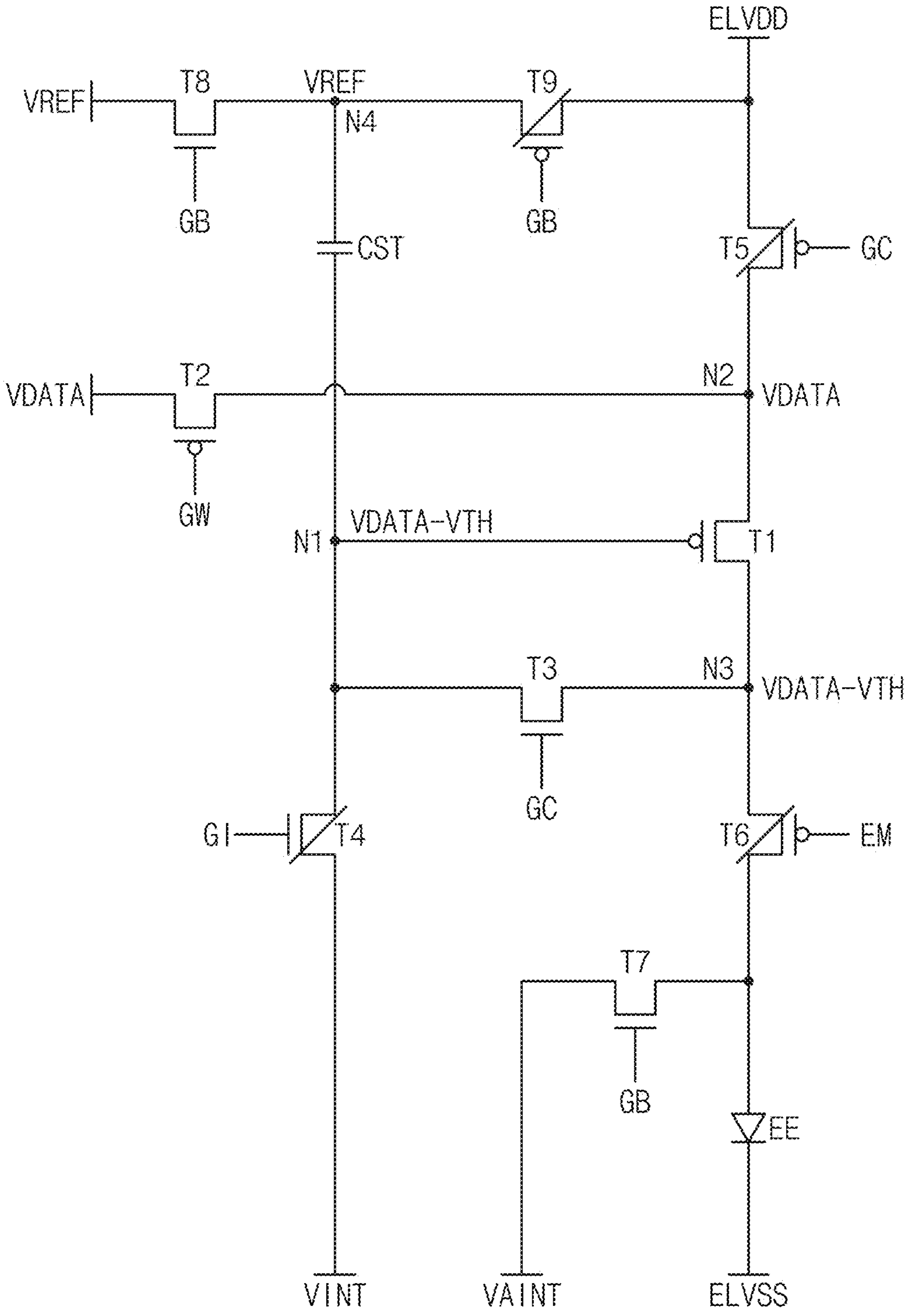
FIG. 8 is a circuit diagram illustrating an example of the operation of the pixel circuit of FIG. 2 in the third period.
Figure 9:
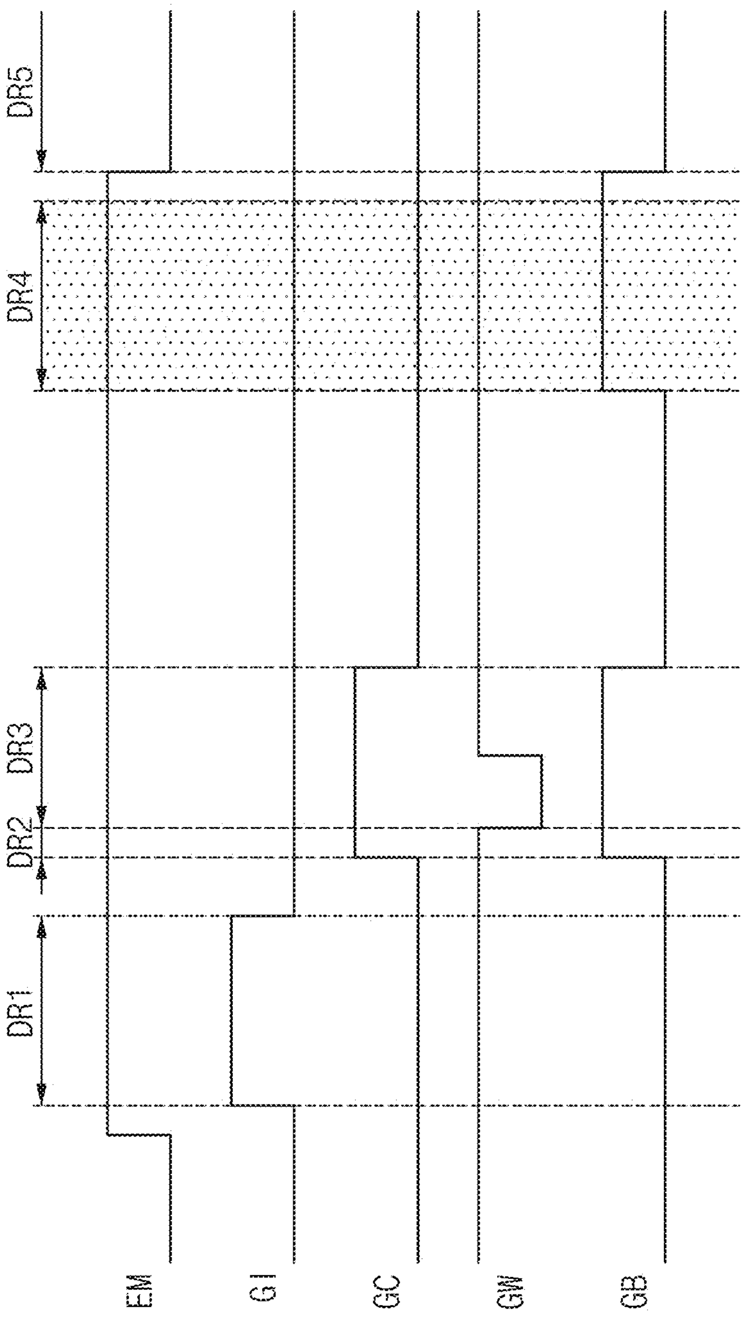
FIG. 9 is a timing diagram illustrating an example of an operation of the pixel circuit of FIG. 2 in a fourth period.
Figure 10:
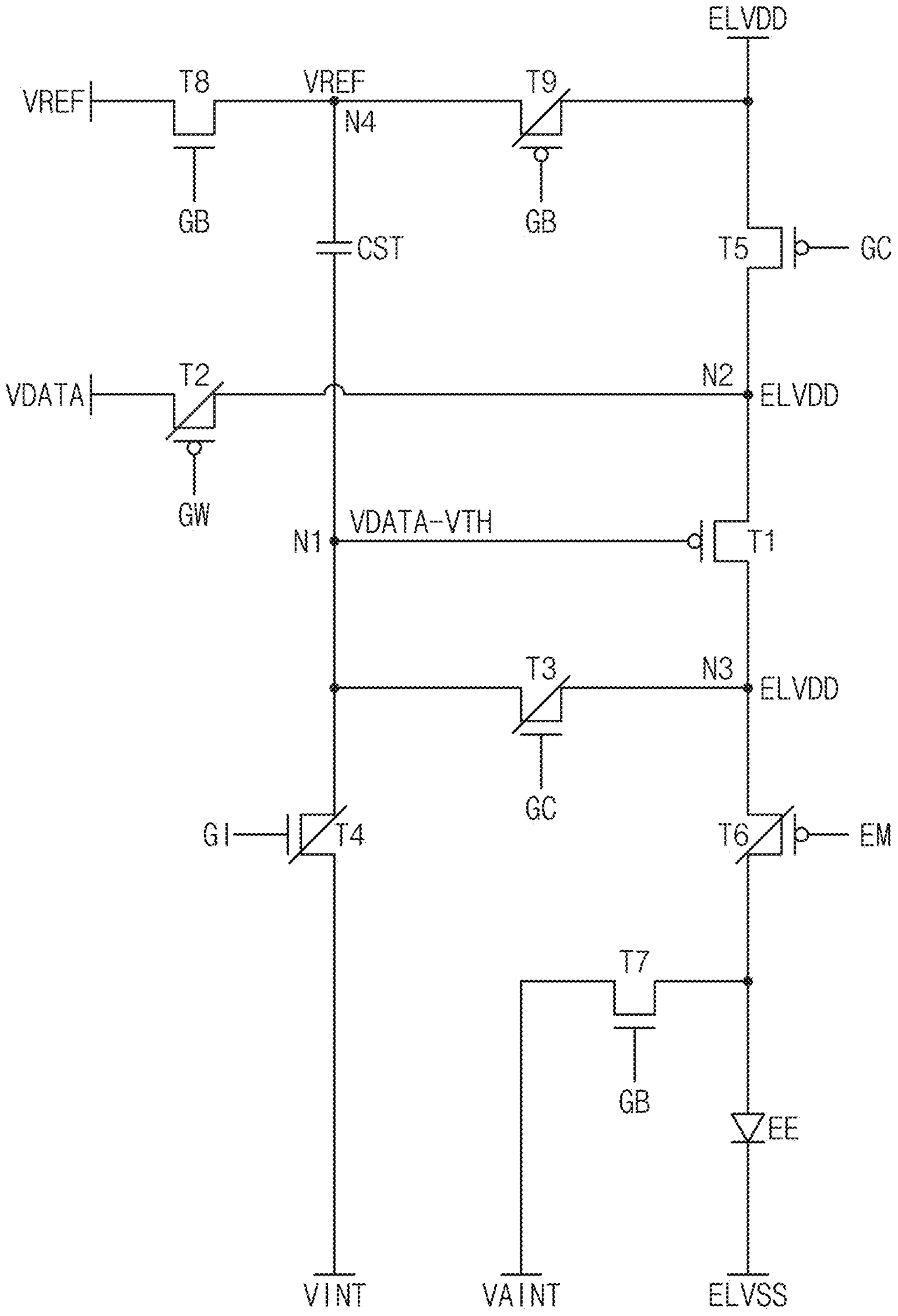
FIG. 10 is a circuit diagram illustrating an example of the operation of the pixel circuit of FIG. 2 in the fourth period.
Figure 11:
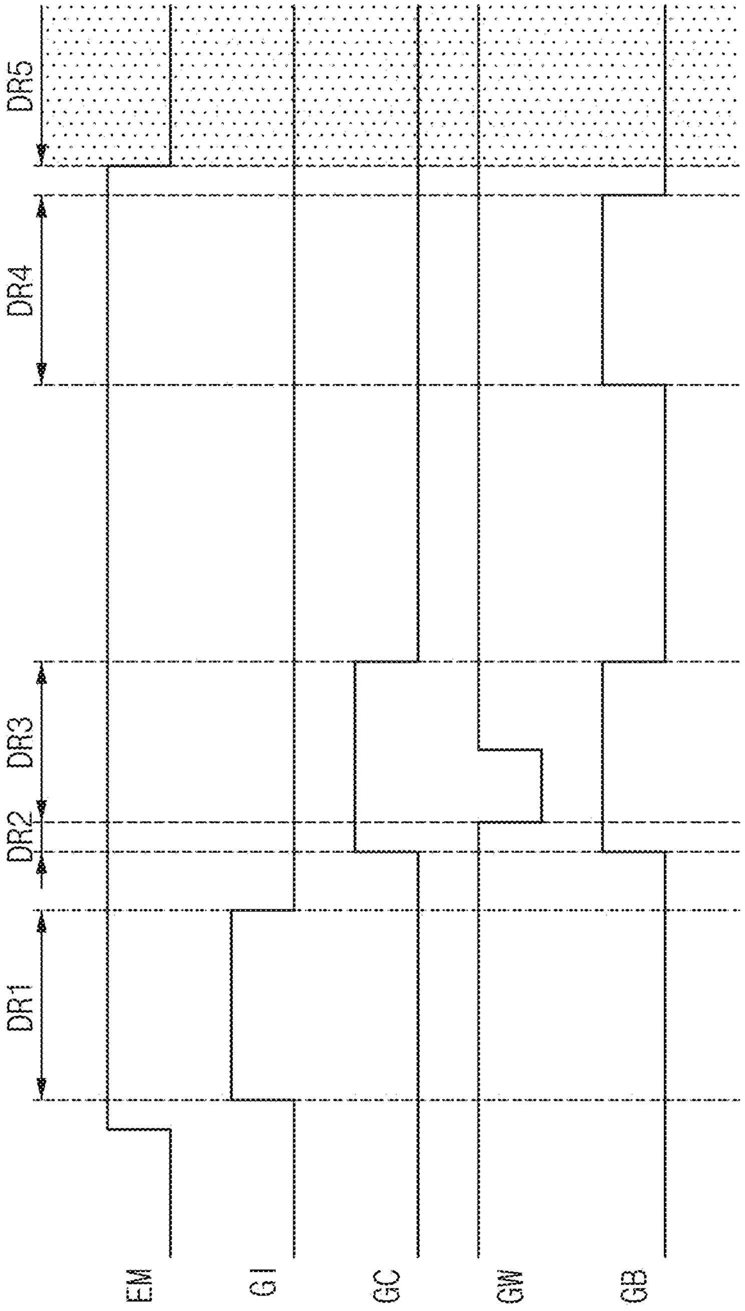
FIG. 11 is a timing diagram illustrating an example of an operation of the pixel circuit of FIG. 2 in a fifth period.
Figure 12:
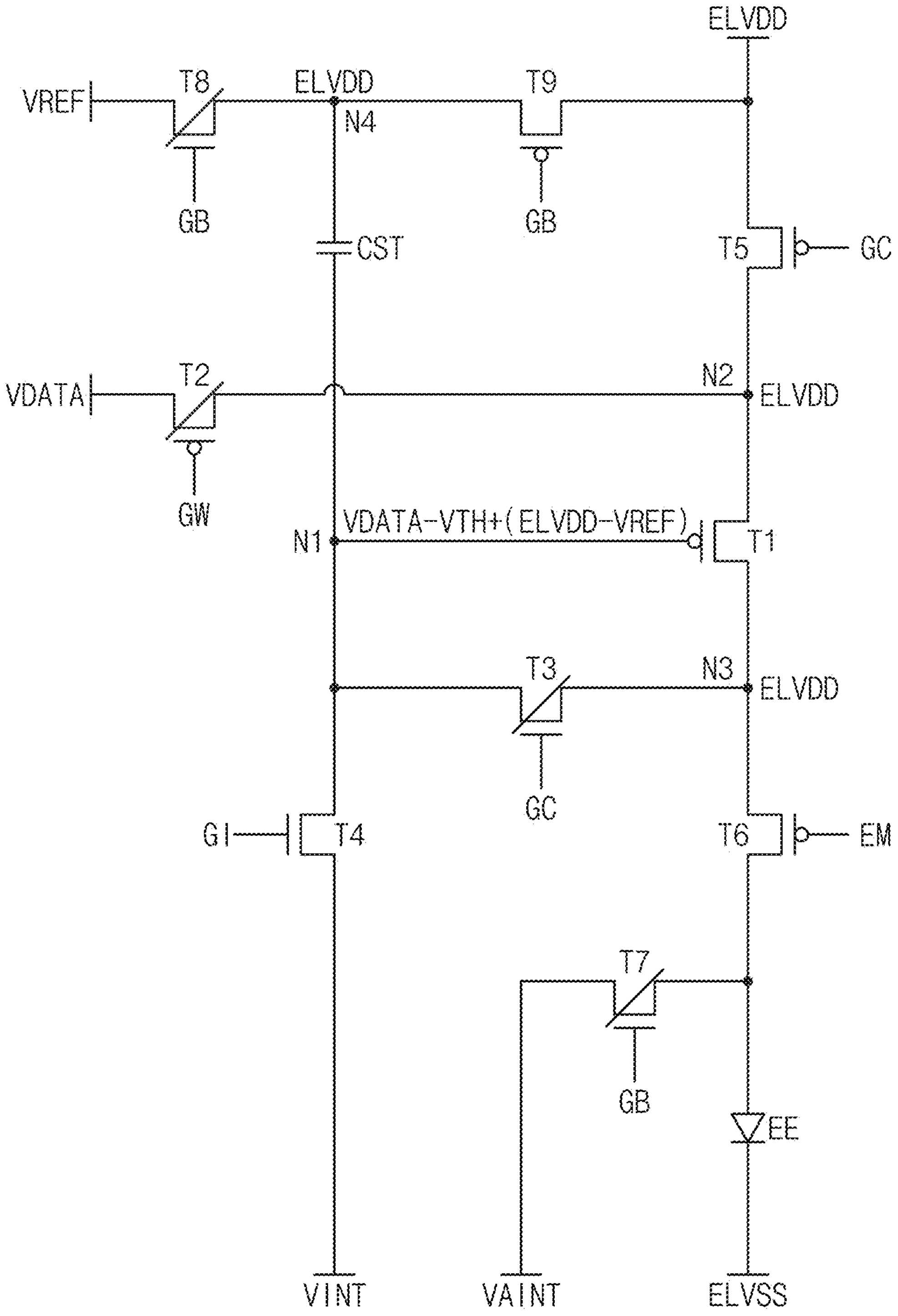
FIG. 12 is a circuit diagram illustrating an example of the operation of the pixel circuit of FIG. 2 in the fifth period.

FIG. 3 is a timing diagram illustrating an example of an operation of the pixel circuit of FIG. 2 in a first period DR1. FIG. 4 is a circuit diagram illustrating an example of the operation of the pixel circuit of FIG. 2 in the first period DR1. FIG. 5 is a timing diagram illustrating an example of an operation of the pixel circuit of FIG. 2 in a second period DR2. FIG. 6 is a circuit diagram illustrating an example of the operation of the pixel circuit of FIG. 2 in the second period DR2. FIG. 7 is a timing diagram illustrating an example of an operation of the pixel circuit of FIG. 2 in a third period DR3. FIG. 8 is a circuit diagram illustrating an example of the operation of the pixel circuit of FIG. 2 in the third period DR3. FIG. 9 is a timing diagram illustrating an example of an operation of the pixel circuit of FIG. 2 in a fourth period DR4. FIG. 10 is a circuit diagram illustrating an example of the operation of the pixel circuit of FIG. 2 in the fourth period DR4. FIG. 11 is a timing diagram illustrating an example of an operation of the pixel circuit of FIG. 2 in a fifth period DR5. FIG. 12 is a circuit diagram illustrating an example of the operation of the pixel circuit of FIG. 2 in the fifth period DR5.

Referring to FIGS. 1 to 12, the first period DR1 may be an initialization period of the first switching element T1.

In the first period DR1, the emission signal EM may have an inactive level, the initialization gate signal GI may have an active level, the compensation gate signal GC may have an inactive level, the data writing gate signal GW may have an inactive level and the bias gate signal GB may have an inactive level.

Herein, when a transistor receiving the emission signal EM, the initialization gate signal GI, the compensation gate signal GC, the data writing gate signal GW and the bias gate signal GB is a P-type transistor, the active level may be a low level and the inactive level may be a high level. In contrast, when the transistor receiving the emission signal EM, the initialization gate signal GI, the compensation gate signal GC the data writing gate signal GW and the bias gate signal GB is an N-type transistor, the active level may be a high level and the inactive level may be a low level.

Herein, the active level and the inactive level of the emission signal EM are defined with respect to the sixth switching element T6, the active level and the inactive level of the initialization gate signal GI are defined with respect to the fourth switching element T4, the active level and the inactive level of the compensation gate signal GC are defined with respect to the third switching element T3, the active level and the inactive level of the data writing gate signal GW are defined with respect to the second switching element T2 and the active level and the inactive level of the bias gate signal GB are defined with respect to the eighth switching element T8.

Thus, in FIGS. 3, 5, 7, 9 and 11, the active level of the emission signal EM may be a low level, the active level of the initialization gate signal GI may be a high level, the active level of the compensation gate signal GC may be a high level, the active level of the data writing gate signal GW may be a low level and the active level of the bias gate signal GB may be a high level.

In the first period DR1, the first initialization voltage VINT may be applied to the first node N1 by the fourth switching element T4 turned on in response to the active level of the initialization gate signal GI.

In the first period DR1, the first power voltage ELVDD may be applied to the fourth node N4 by the ninth switching element T9 turned on in response to the inactive level of the bias gate signal GB.

In the first period DR1, the first power voltage ELVDD may be applied to the second node N2 by the fifth switching element T5 turned on in response to the inactive level of the compensation gate signal GC.

In the first period DR1, the first power voltage ELVDD may be applied to the third node N3 by the first switching element T1 turned on in response to the first initialization voltage VINT.

In the first period DR1, switching elements T2, T3, T6, T7 and T8 may be turned off (e.g., see diagonal lines in FIG. 4 across each of these elements).

The second period DR2 may be a turn-on period of the compensation gate signal GC.

In the second period DR2 subsequent to the first period DR1, the emission signal EM may have the inactive level, the initialization gate signal GI may have an inactive level, the compensation gate signal GC may have an active level, the data writing gate signal GW may have the inactive level and the bias gate signal GB may have an active level.

In the second period DR2, the reference voltage VREF may be applied to the fourth node N4 by the eighth switching element T8 turned on in response to the active level of the bias gate signal GB.

In the second period DR2, the first node N1 and the third node N3 may be connected to each other by the third switching element T3 turned on in response to the active level of the compensation gate signal GC.

Herein, a voltage change VREF-ELVDD of the fourth node N4 may be transferred to the first node N1 by the capacitor CST. Thus, in the second period DR2, a voltage of the first node N1 may be VINT+(VREF−ELVDD).

In the second period DR2, the voltage of the third node N3 may become VINT+(VREF−ELVDD) by the turned-on third switching element T3 and the voltage of the second node N2 may become VINT+(VREF−ELVDD)+VTH by the turned-on first switching element T1.

In the second period DR2, switching elements T2, T4, T5, T6, and T9 may be turned off (e.g., see diagonal lines in FIG. 6 across each of these elements).

The third period DR3 may be a data writing and compensation period.

In the third period DR3 subsequent to the second period DR2, the emission signal EM may have the inactive level, the initialization gate signal GI may have the inactive level, the compensation gate signal GC may have the active level, the data writing gate signal GW may have an active level and the bias gate signal GB may have the active level.

In the third period DR3, the reference voltage VREF may be still applied to the fourth node N4 by the eighth switching element T8 turned on in response to the active level of the bias gate signal GB.

In the third period DR3, the data voltage VDATA including a threshold voltage VTH of the first switching element T1 may be written to the first node N1 by the second switching element T2 turned on in response to the active level of the data writing gate signal GW, the first switching element T1 turned on in response to the voltage of the first node N1 and the third switching element T3 turned on in response to the active level of the compensation gate signal GC. In the third period DR3, the voltage of the first node N1 may be VDATA-VTH.

In the third period DR3, a voltage of the second node N2 may be VDATA and a gate-source voltage Vgs of the first switching element T1 may be VTH.

In the third period DR3, switching elements T4, T5, T6, and T9 may be turned off (e.g., see diagonal lines in FIG. 8 across each of these elements.

In the present embodiment, an initialization of the anode electrode of the light emitting element EE may be performed in the second period DR2 and the third period DR3. In the second period DR2 and the third period DR3, the second initialization voltage VAINT may be applied to the anode electrode by the seventh switching element T7 turned on in response to the active level of the bias gate signal GB.

The fourth period DR4 may be a bias period.

In the fourth period DR4 subsequent to the third period DR3, the emission signal EM may have the inactive level, the initialization gate signal GI may have the inactive level, the compensation gate signal GC may have the inactive level, the data writing gate signal GW may have the inactive level and the bias gate signal GB may have the active level.

In the fourth period DR4, the reference voltage VREF may be applied to the fourth node N4 by the eighth switching element T8 turned on in response to the active level of the bias gate signal GB.

In the fourth period DR4, the ninth switching element T9 may be turned off in response to the active level of the bias gate signal GB. In addition, in the fourth period DR4, the fifth switching element T5 may be turned on in response to the inactive level of the compensation gate signal GC so that the first power voltage ELVDD may be applied to the second node N2.

In the fourth period DR4, the voltage at the first node N1 may remain at a level of VDATA−VTH, as it was in the third period DR3. Additionally, the gate source voltage Vgs of the first switching element T1 may be ELVDD−VDATA+VTH. In the fourth period DR4, the first switching element T1 may be turned on regardless of the level of the data voltage VDATA and this operation may be referred to as a bias operation of the first switching element T1. In the fourth period DR4, the emission signal EM has the inactive level so that the sixth switching element T6 may be turned off. In the fourth period DR4, even though the first switching element T1 is turned on, the sixth switching element T6 is turned off so that the light emitting element EE does not emit light.

The bias operation is performed in which the first switching element T1 is turned on before a light emitting period (the fifth period DR5) to enhance the hysteresis characteristics of the first switching element T1.

In the present embodiment, an initialization operation of the anode electrode of the light emitting element EE may be also performed in the fourth period DR4. In the fourth period DR4, the second initialization voltage VAINT may be applied to the anode electrode by the seventh switching element T7 turned on in response to the active level of the bias gate signal GB.

In the fourth period DR4, switching elements T2, T3, T4, T6, and T9 may be turned off (e.g., see diagonal lines in FIG. 10 across each of these elements).

The fifth period DR5 may be a light emitting period.

In the fifth period DR5 subsequent to the fourth period DR4, the emission signal EM may have an active level, the initialization gate signal GI may have the inactive level, the compensation gate signal GC may have the inactive level, the data writing gate signal GW may have the inactive level and the bias gate signal GB may have the inactive level.

In the fifth period DR5, the first power voltage ELVDD may be applied to the second node N2 by the fifth switching element T5 turned on in response to the inactive level of the compensation gate signal GC.

In the fifth period DR5, the third node N3 may be connected to the anode electrode of the light emitting element EE by the sixth switching element T6 turned on in response to the active level of the emission signal EM.

In the fifth period DR5, the light emitting element EE may emit light through a path that includes the turned-on fifth switching element T5, the turned-on first switching element T1 and the turned-on sixth switching element T6.

In the fifth period DR5, switching elements T2, T3, T7, and T8 may be turned off (e.g., see diagonal lines in FIG. 12 across each of these elements).

In the fifth period DR5, the voltage of the first node N1 may be VDATA−VTH+(ELVDD−VREF).

In the fifth period DR5, the voltage of the second node N2 may be ELVDD and the gate-source voltage Vgs of the first switching element T1 may be VREF−VDATA+VTH.

In the fifth period DR5, a current of the light emitting element EE may be calculated by Equation 2.

$$IEE = \frac{1}{2}uCox\frac{W}{L}(VREF - VDATA)^2 \quad \text{[Equation 2]}$$

Herein, the current flowing through the light emitting element EE may be referred to as IEE, u may be a mobility of the first switching element T1, Cox may be a capacitance of the first switching element T1 and W/L may be a ratio of a width (W) and a length (L) of a channel of the first switching element T1.

As shown in Equation 2, the current of the light emitting element EE may be determined by a difference between the reference voltage VREF and the data voltage VDATA. Thus, a luminance of the light emitting element EE may be maintained even if levels of the reference voltage VREF and the data voltage VDATA are lowered together while maintaining the difference between the reference voltage VREF and the data voltage VDATA.

In the pixel circuit of the present embodiment, the levels of the reference voltage VREF and the data voltage VDATA may be lowered compared to those of a conventional pixel circuit so that the power consumption of the display apparatus may be reduced.

According to the present embodiment, the driving current IEE of the light emitting element EE may be determined based on the difference between the reference voltage VREF, which is lower than the first power voltage ELVDD, and the data voltage VDATA in the pixel circuit. Thus, power consumption of the pixel circuit may be reduced.

In addition, the bias operation of the first switching element T1 may be operated in the bias period DR4 when different signals are applied to the control electrode of the fifth switching element T5 and the control electrode of the sixth switching element T6 and the first switching element T1 and the fifth switching element T5 are turned on but the sixth switching element T6 is turned off. In an embodiment, these different signals are supplied by the gate driver 300 and the emission driver 600. For example, the gate driver 300 may supply the signal to the control electrode of the first switching element T5 and the emission driver 600 may supply the signal to the sixth switching element T6 is turned off. Thus, the hysteresis characteristics of the first switching element T1 may be enhanced so that the display quality of the display panel 100 may be enhanced.

Figure 13:
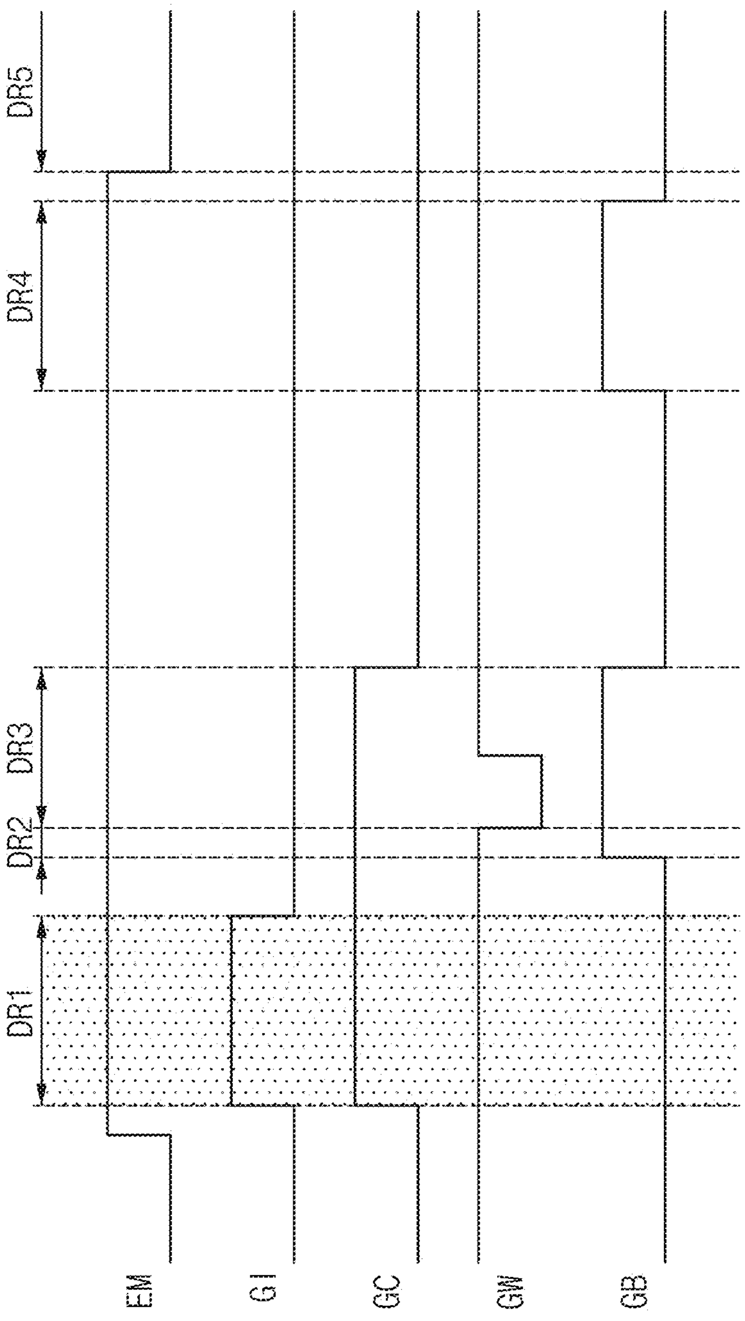
FIG. 13 is a timing diagram illustrating an example of an operation of the pixel circuit of FIG. 2 in a first period.
Figure 14:
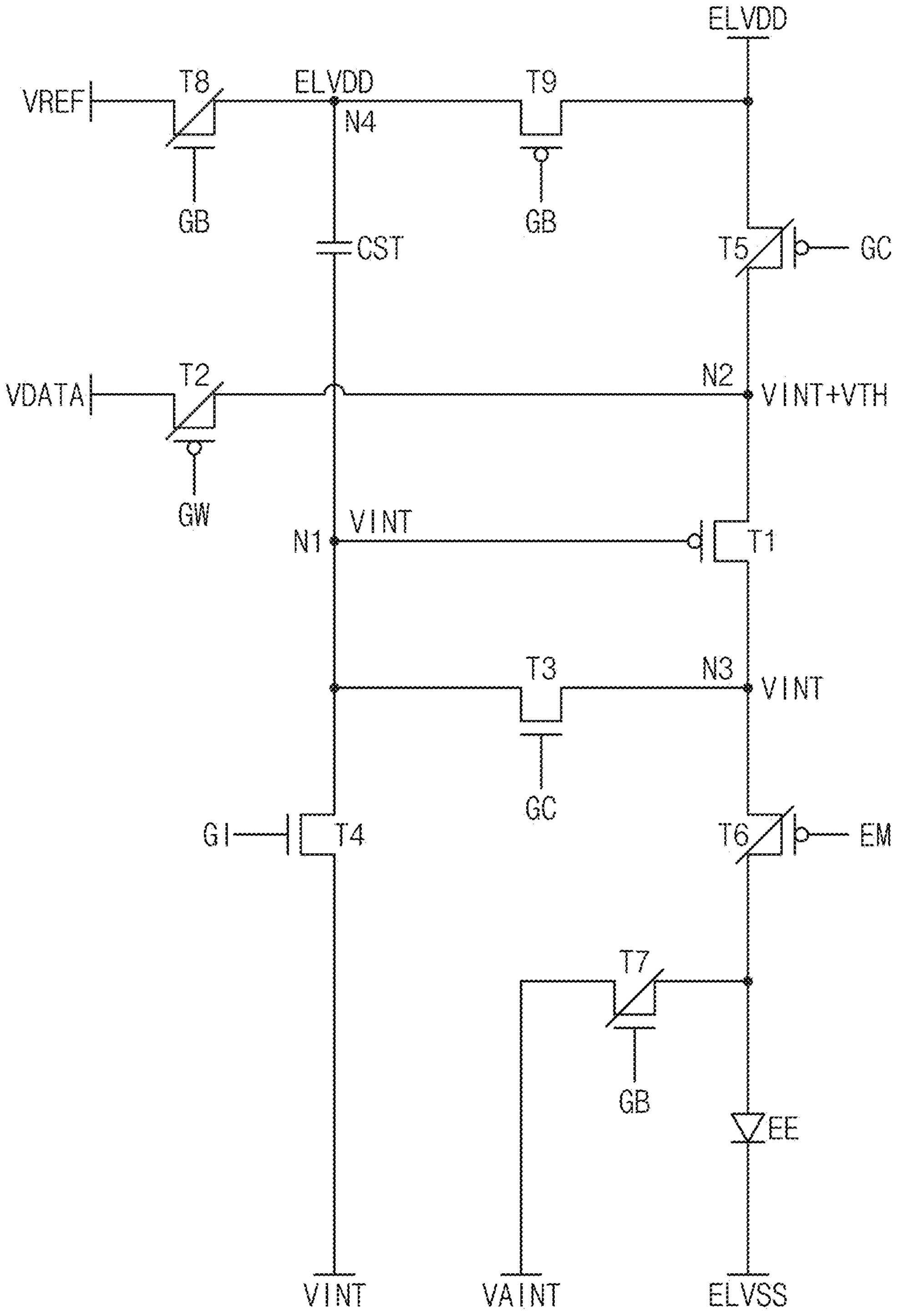
FIG. 14 is a circuit diagram illustrating an example of the operation of the pixel circuit of FIG. 2 in the first period.
Figure 15:
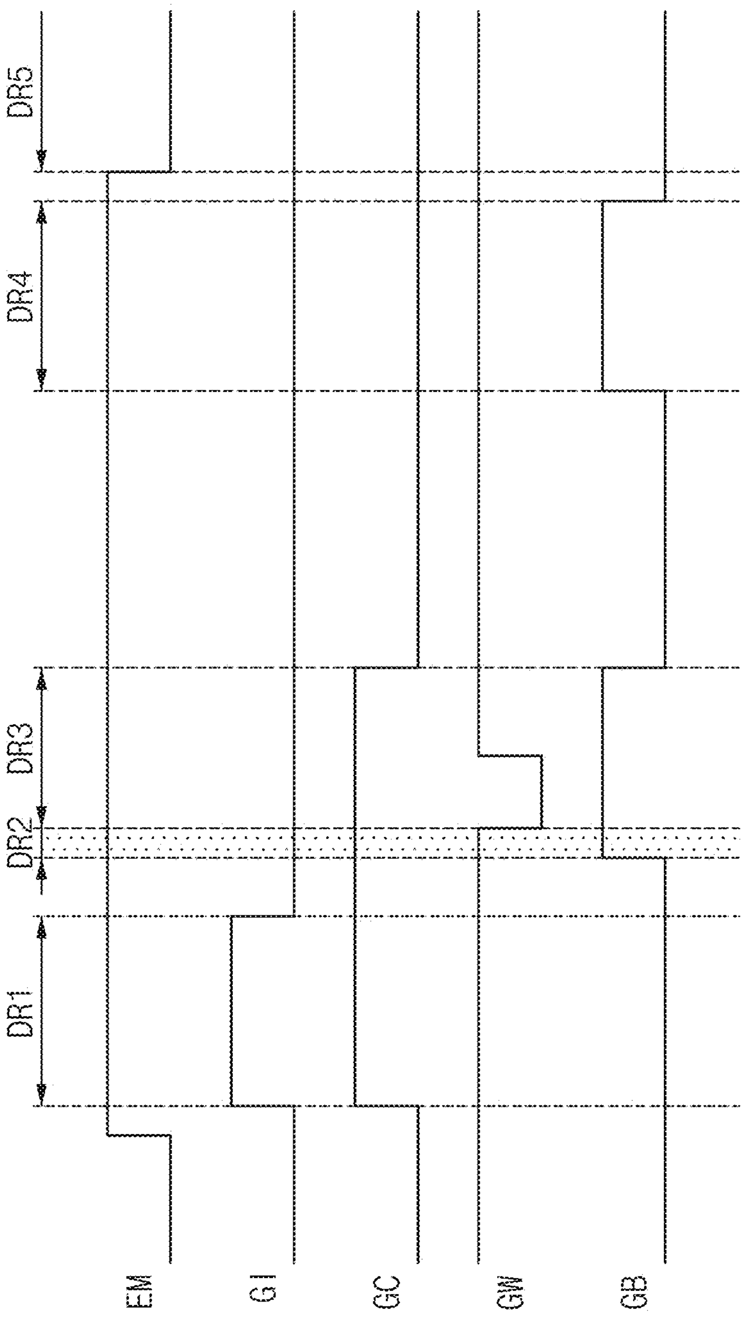
FIG. 15 is a timing diagram illustrating an example of an operation of the pixel circuit of FIG. 2 in a second period.
Figure 16:
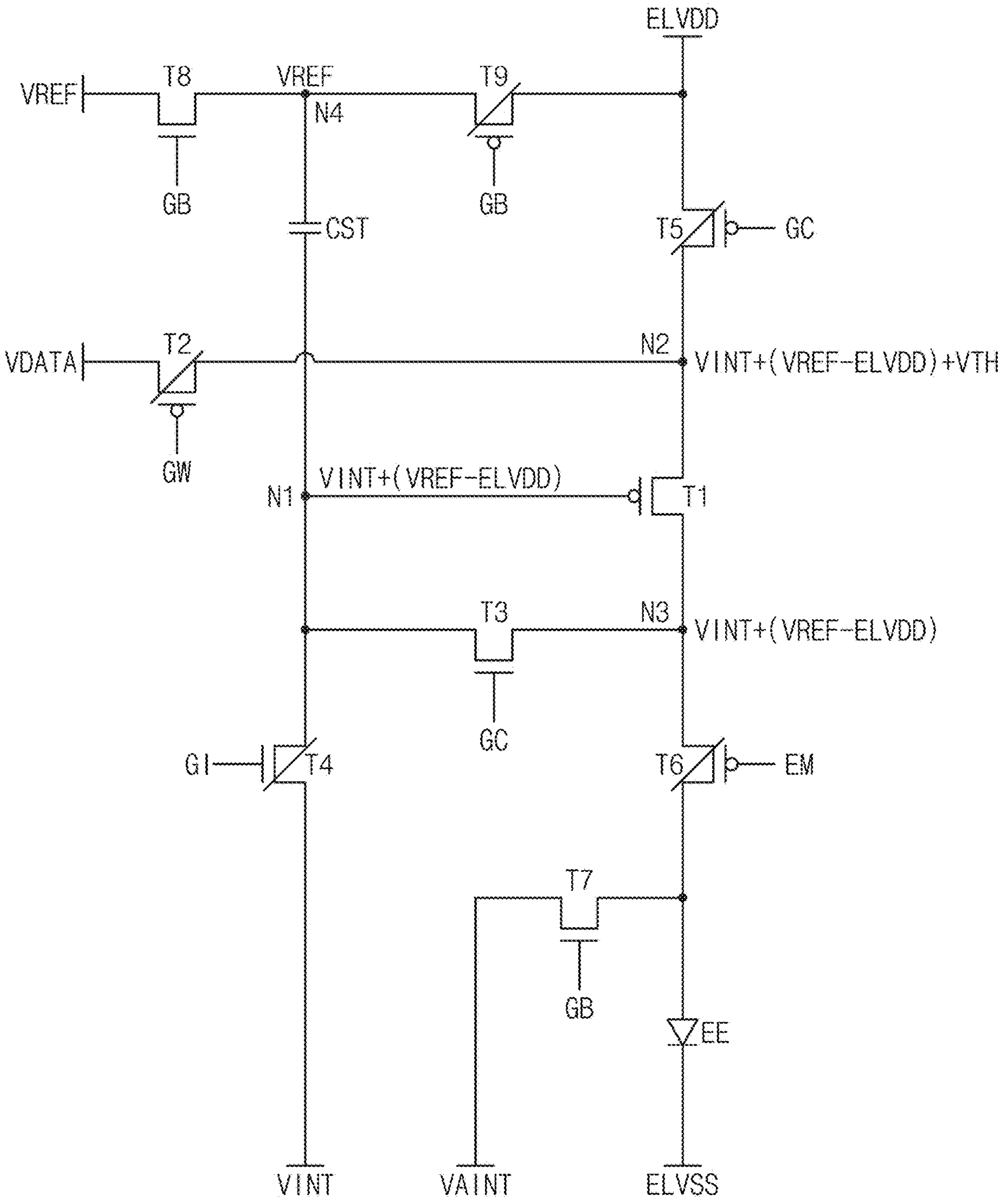
FIG. 16 is a circuit diagram illustrating an example of the operation of the pixel circuit of FIG. 2 in the second period.
Figure 17:
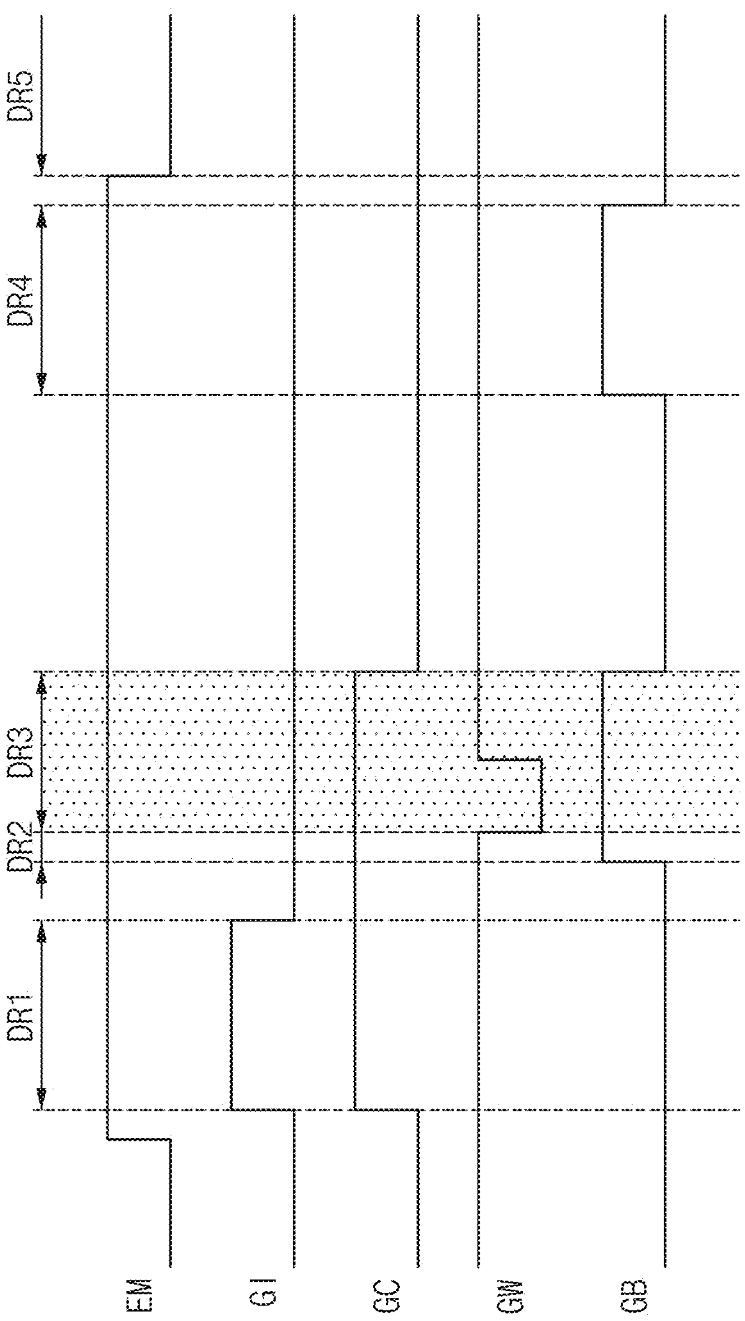
FIG. 17 is a timing diagram illustrating an example of an operation of the pixel circuit of FIG. 2 in a third period.
Figure 18:
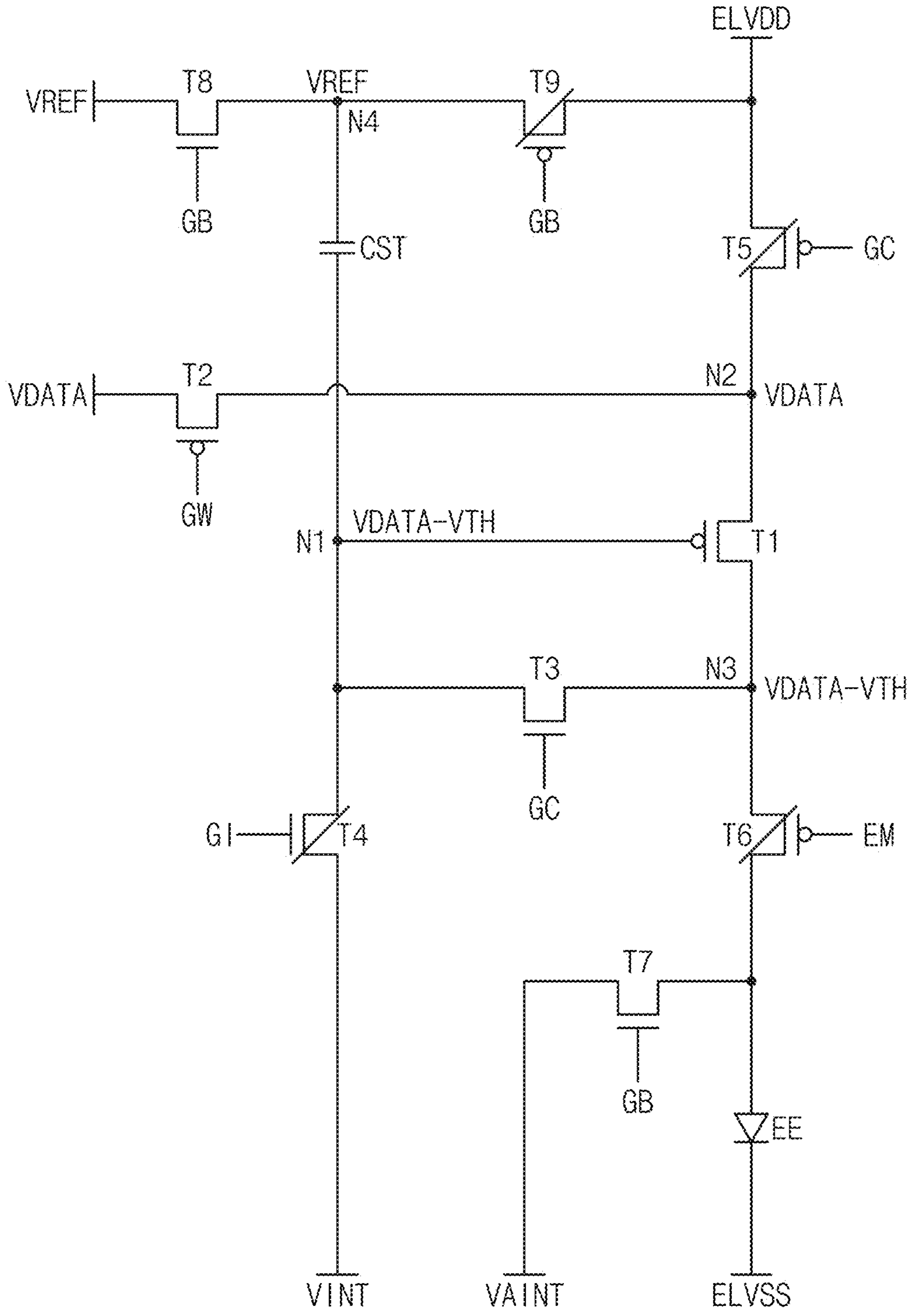
FIG. 18 is a circuit diagram illustrating an example of the operation of the pixel circuit of FIG. 2 in the third period.
Figure 19:
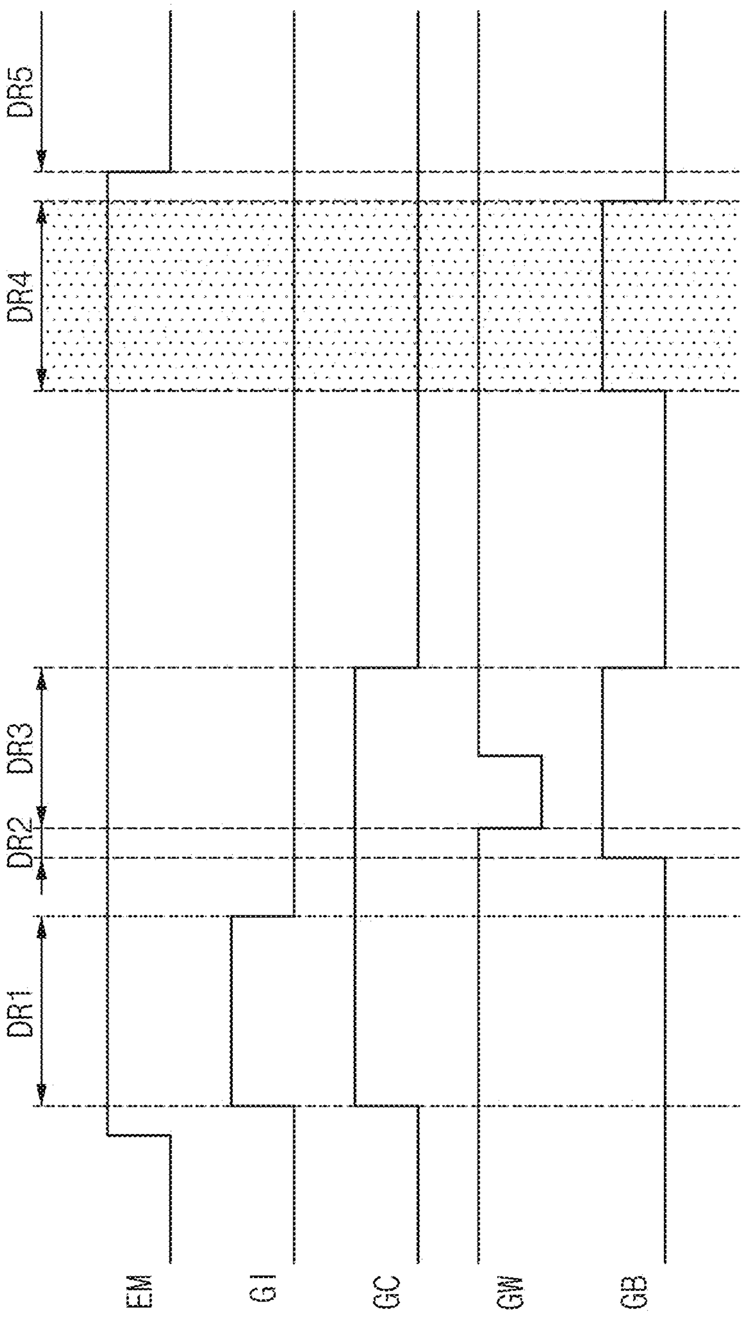
FIG. 19 is a timing diagram illustrating an example of an operation of the pixel circuit of FIG. 2 in a fourth period.
Figure 20:
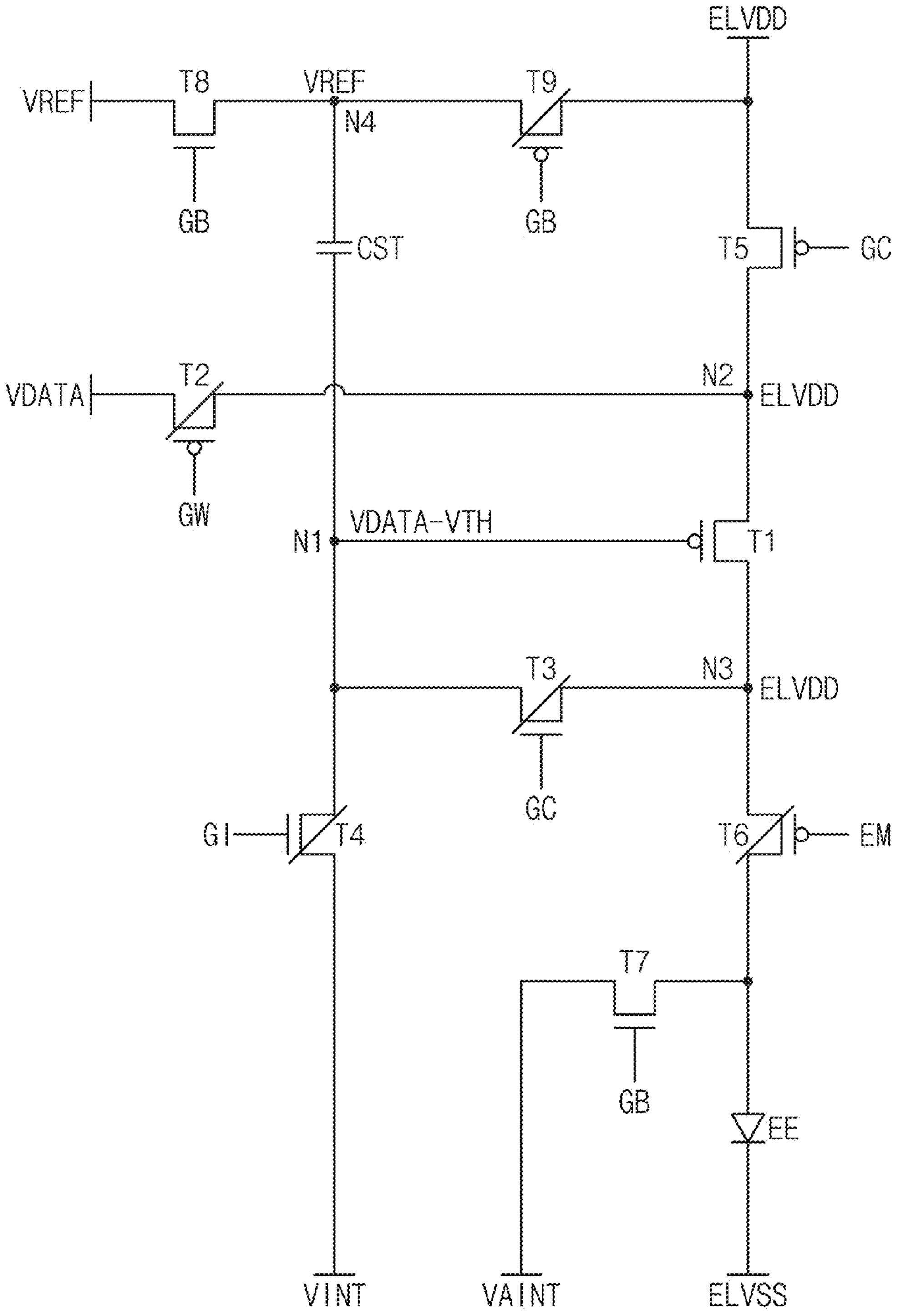
FIG. 20 is a circuit diagram illustrating an example of the operation of the pixel circuit of FIG. 2 in the fourth period.
Figure 21:
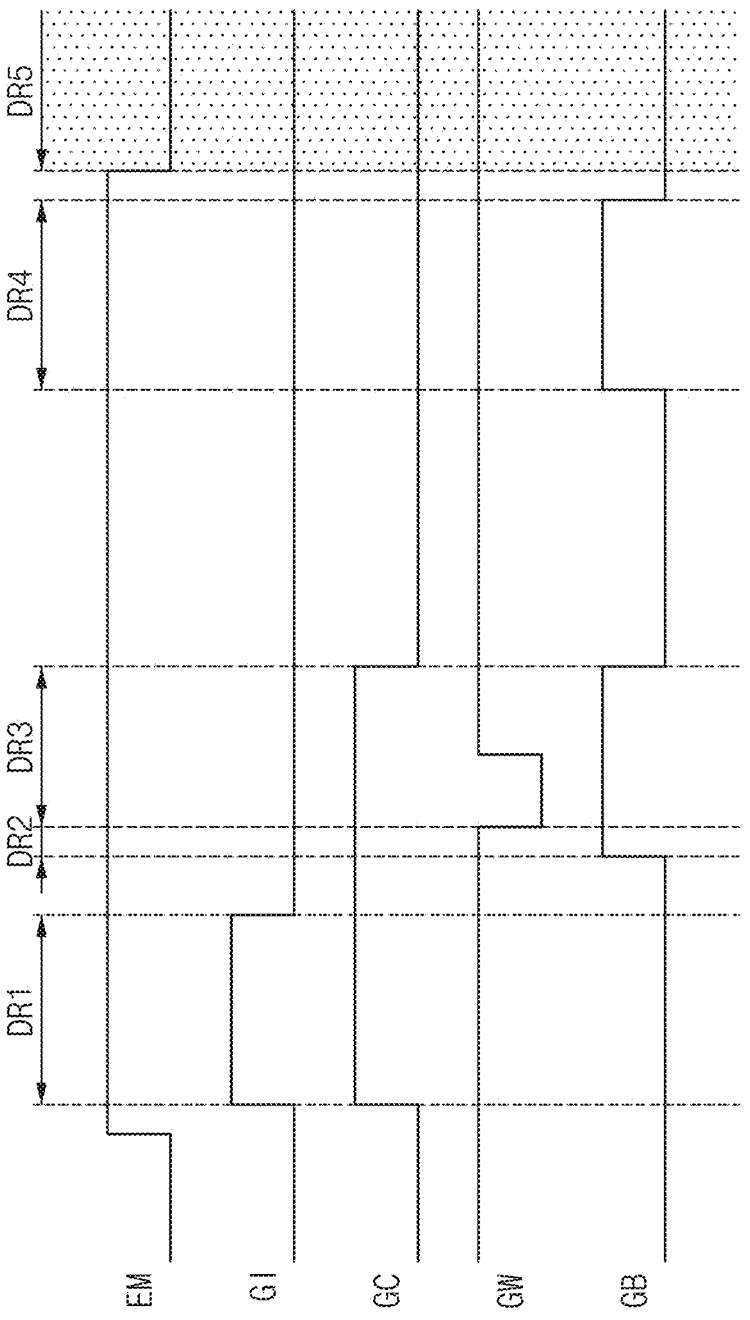
FIG. 21 is a timing diagram illustrating an example of an operation of the pixel circuit of FIG. 2 in a fifth period.
Figure 22:
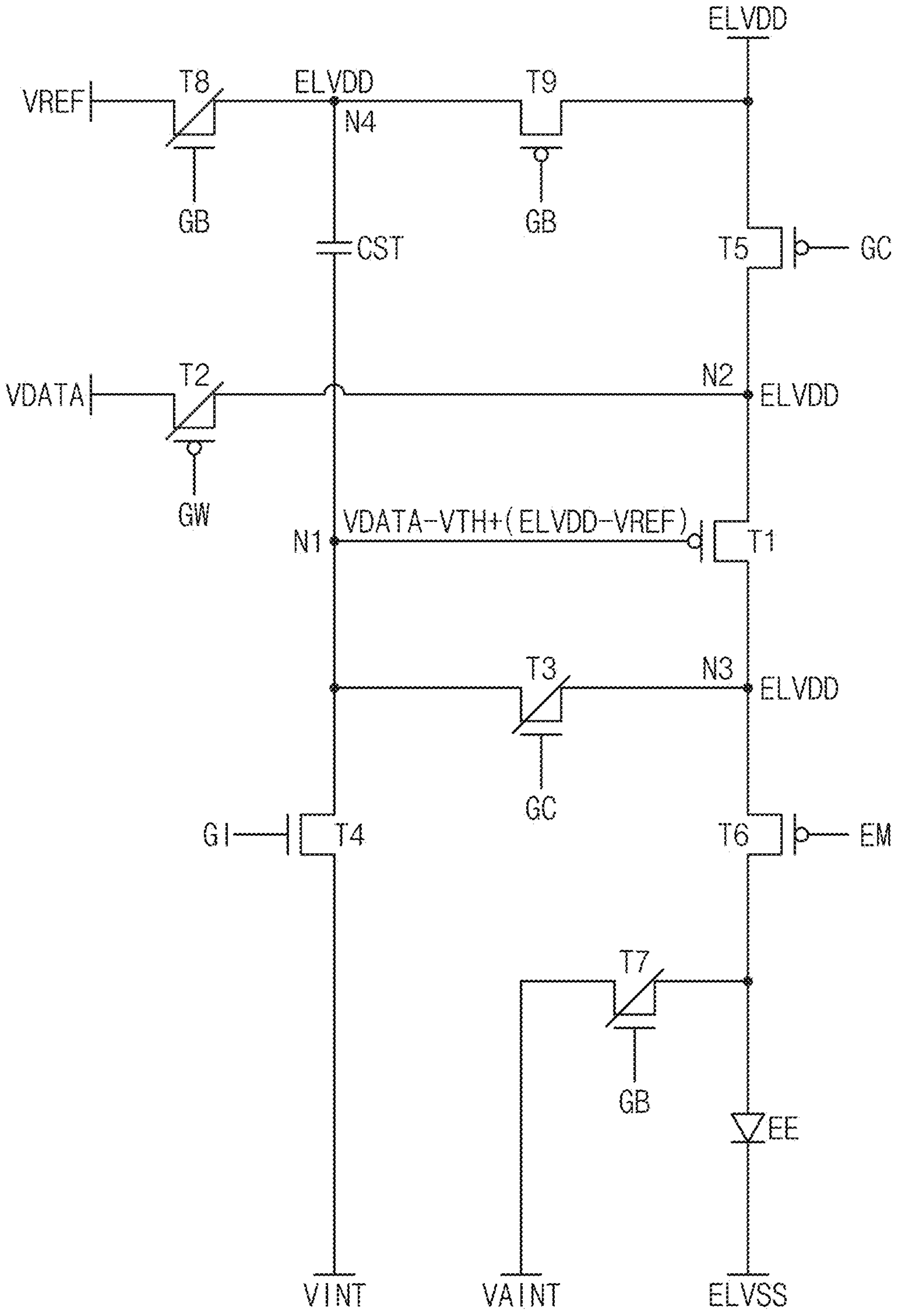
FIG. 22 is a circuit diagram illustrating an example of the operation of the pixel circuit of FIG. 2 in the fifth period.

FIG. 13 is a timing diagram illustrating an example of an operation of the pixel circuit of FIG. 2 in a first period DR1. FIG. 14 is a circuit diagram illustrating an example of the operation of the pixel circuit of FIG. 2 in the first period DR1. FIG. 15 is a timing diagram illustrating an example of an operation of the pixel circuit of FIG. 2 in a second period DR2. FIG. 16 is a circuit diagram illustrating an example of the operation of the pixel circuit of FIG. 2 in the second period DR2. FIG. 17 is a timing diagram illustrating an example of an operation of the pixel circuit of FIG. 2 in a third period DR3. FIG. 18 is a circuit diagram illustrating an example of the operation of the pixel circuit of FIG. 2 in the third period DR3. FIG. 19 is a timing diagram illustrating an example of an operation of the pixel circuit of FIG. 2 in a fourth period DR4. FIG. 20 is a circuit diagram illustrating an example of the operation of the pixel circuit of FIG. 2 in the fourth period DR4. FIG. 21 is a timing diagram illustrating an example of an operation of the pixel circuit of FIG. 2 in a fifth period DR5. FIG. 22 is a circuit diagram illustrating an example of the operation of the pixel circuit of FIG. 2 in the fifth period DR5.

The timing diagrams in FIGS. 13, 15, 17, 19 and 21 are substantially the same as the timing diagrams in FIGS. 3, 5, 7, 9 and 11 except for the waveform of the compensation gate signal GC.

Referring to FIGS. 1, 2 and 13 to 22, a first period DR1 may be an initialization period of the first switching element T1.

In the first period DR1, the emission signal EM may have an inactive level, the initialization gate signal GI may have an active level, the compensation gate signal GC may have an active level, the data writing gate signal GW may have an inactive level and the bias gate signal GB may have an inactive level.

In the first period DR1, the first initialization voltage VINT may be applied to the first node N1 by the fourth switching element T4 turned on in response to the active level of the initialization gate signal GI.

In the first period DR1, the first power voltage ELVDD may be applied to the fourth node N4 by the ninth switching element T9 turned on in response to the inactive level of the bias gate signal GB.

In the first period DR1, the first node N1 and the third node N3 may be connected to each other by the third switching element T3 turned on in response to the active level of the compensation gate signal GC. Thus, the first initialization voltage VINT may be applied to the third node N3 and the voltage of the second node N2 may become VINT+VTH.

In the first period DR1, switching elements T2, T5, T6, T7, and T8 may be turned off (e.g., see diagonal lines in FIG. 14 across each of these elements).

A second period DR2 may be a turn-on period of the compensation gate signal GC.

In the second period DR2 subsequent to the first period DR1, the emission signal EM may have the inactive level, the initialization gate signal GI may have the active level, the compensation gate signal GC may have an active level, the data writing gate signal GW may have the inactive level and the bias gate signal GB may have an active level.

In the second period DR2, switching elements T2, T4, T5, T6, and T9 may be turned off (e.g., see diagonal lines in FIG. 16 across each of these elements).

A third period DR3 may be the data writing and compensation period.

In the third period DR3 subsequent to the second period DR2, the emission signal EM may have the inactive level, the initialization gate signal GI may have the inactive level, the compensation gate signal GC may have the active level, the data writing gate signal GW may have an active level and the bias gate signal GB may have the active level.

In the third period DR3, the reference voltage VREF may be still applied to the fourth node N4 by the eighth switching element T8 turned on in response to the active level of the bias gate signal GB.

In the third period DR3, the data voltage VDATA including a threshold voltage VTH of the first switching element T1 may be written to the first node N1 by the second switching element T2 turned on in response to the active level of the data writing gate signal GW, the first switching element T1 turned on in response to the voltage of the first node N1 and the third switching element T3 turned on in response to the active level of the compensation gate signal GC. In the third period DR3, the voltage of the first node N1 may be VDATA-VTH.

In the third period DR3, a voltage of the second node N2 may be VDATA and a gate-source voltage Vgs of the first switching element T1 may be VTH.

In the third period DR3, switching elements T4, T5, T6, and T9 may be turned off (e.g., see diagonal lines in FIG. 18 across each of these elements).

A fourth period DR4 may be a bias period.

In the fourth period DR4 subsequent to the third period DR3, the emission signal EM may have the inactive level, the initialization gate signal GI may have the inactive level, the compensation gate signal GC may have the inactive level, the data writing gate signal GW may have the inactive level and the bias gate signal GB may have the active level.

In the fourth period DR4, the reference voltage VREF may be applied to the fourth node N4 by the eighth switching element T8 turned on in response to the active level of the bias gate signal GB.

In the fourth period DR4, the ninth switching element T9 may be turned off in response to the active level of the bias gate signal GB. In addition, in the fourth period DR4, the fifth switching element T5 may be turned on in response to the inactive level of the compensation gate signal GC so that the first power voltage ELVDD may be applied to the second node N2.

In the fourth period DR4, the voltage of the first node N1 may have a level of VDATA−VTH, consistent with its level in the third period DR3. Additionally, the gate source voltage Vgs of the first switching element T1 may be ELVDD−VDATA+VTH. In the fourth period DR4, the first switching element T1 may be turned on regardless of the level of the data voltage VDATA and this operation may be referred to as a bias operation of the first switching element T1. In the fourth period DR4, the emission signal EM has the inactive level so that the sixth switching element T6 may be turned off. In the fourth period DR4, even though the first switching element T1 is turned on, the sixth switching element T6 is turned off so that the light emitting element EE does not emit light.

The bias operation is performed in which the first switching element T1 is turned on prior to a light emitting period (the fifth period DR5) to enhance the hysteresis characteristics of the first switching element T1.

In the fourth period DR4, switching elements T2, T3, T4, T6, and T9 may be turned off (e.g., see diagonal lines in FIG. 20 across each of these elements).

A fifth period DR5 may be a light emitting period.

In the fifth period DR5 subsequent to the fourth period DR4, the emission signal EM may have an active level, the initialization gate signal GI may have the inactive level, the compensation gate signal GC may have the inactive level, the data writing gate signal GW may have the inactive level and the bias gate signal GB may have the inactive level.

In the fifth period DR5, the light emitting element EE may emit light through a path of including the turned-on fifth switching element T5, the turned-on first switching element T1 and the turned-on sixth switching element T6.

In the fifth period DR5, the voltage of the first node N1 may be VDATA−VTH+(ELVDD−VREF).

In the fifth period DR5, the voltage of the second node N2 may be ELVDD and the gate-source voltage Vgs of the first switching element T1 may be VREF−VDATA+VTH.

In the fifth period DR5, switching elements T2, T3, T7, and T8 may be turned off (e.g., see diagonal lines in FIG. 22 across each of these elements).

According to the present embodiment, the driving current IEE of the light emitting element EE may be determined based on the difference between the reference voltage VREF, which is lower than the first power voltage ELVDD, and the data voltage VDATA in the pixel circuit. Thus, the power consumption of the pixel circuit may be reduced.

In addition, the bias operation of the first switching element T1 may be performed in the bias period DR4, when different signals are applied to the control electrode of the fifth switching element T5 and the control electrode of the sixth switching element T6. In this configuration, the first switching element T1 and the fifth switching element T5 are turned on, while the sixth switching element T6 is turned off. Thus, the hysteresis characteristics of the first switching element T1 may be enhanced so that the display quality of the display panel 100 may be enhanced.

Figure 23:
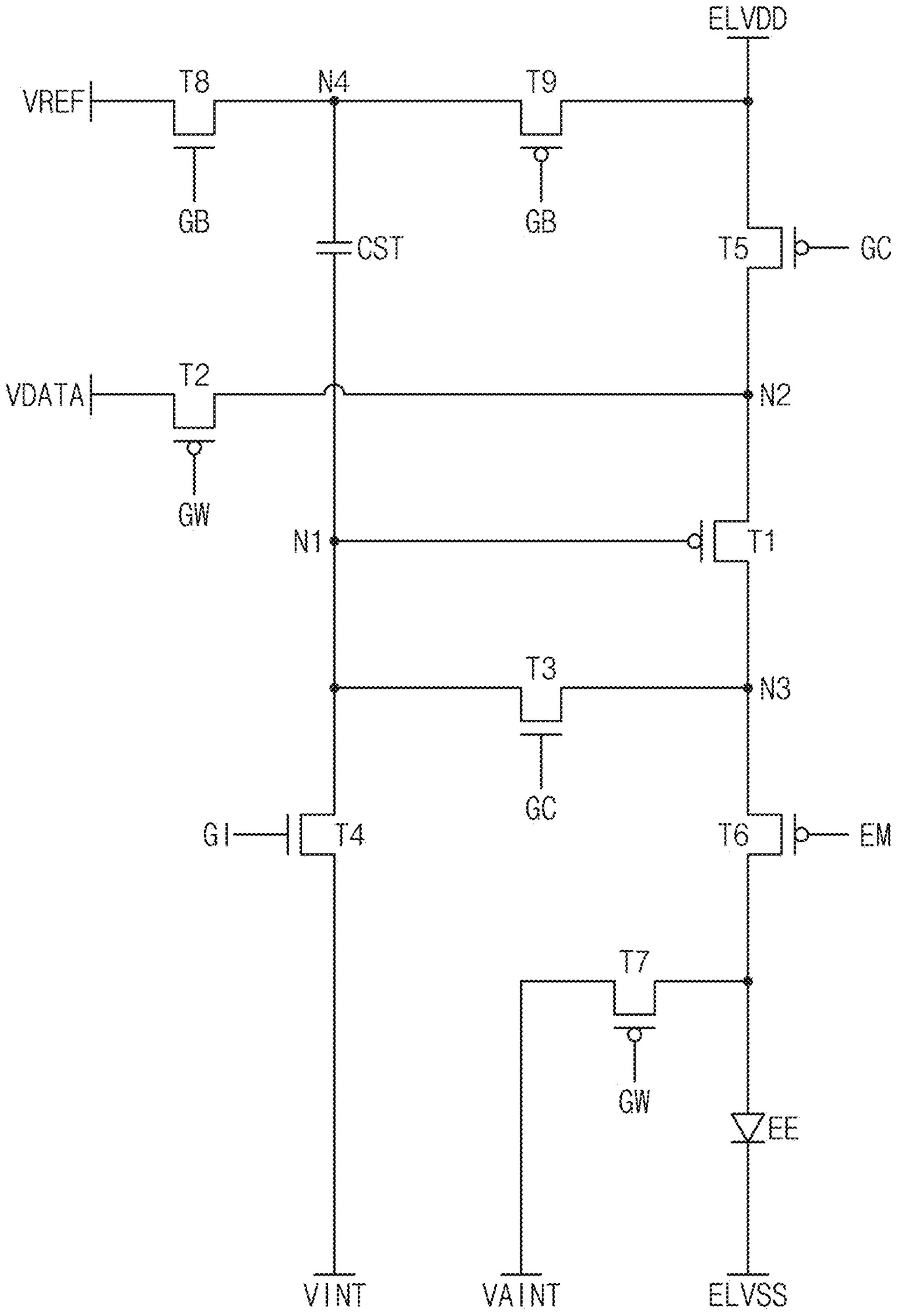
FIG. 23 is a circuit diagram illustrating a pixel circuit of a display apparatus according to an embodiment of the present inventive concept.

FIG. 23 is a circuit diagram illustrating a pixel circuit of a display apparatus according to an embodiment of the present inventive concept.

The pixel circuit of the display apparatus according to the present embodiment is substantially the same as the pixel circuit of the display apparatus of the previous embodiment explained referring to FIGS. 1 to 12 except for the seventh switching element. Thus, the same reference numerals will be used to refer to the same or like parts as those described in the previous embodiment of FIGS. 1 to 12 and any repetitive explanation concerning the above elements will be omitted.

Referring to FIGS. 1 and 23, the pixel circuit includes a light emitting element EE, a first switching element T1, a second switching element T2, a third switching element T3, a capacitor CST, a fifth switching element T5, a sixth switching element T6, an eighth switching element T8 and a ninth switching element T9.

The first switching element T1 includes a control electrode connected to a first node N1, a first electrode connected to a second node N2 and a second electrode connected to a third node N3. The first switching element T1 may apply a driving current to the light emitting element EE.

The second switching element T2 applies a data voltage VDATA to the second node N2 in response to a data writing gate signal GW.

The third switching element T3 connects the first node N1 and the third node N3 in response to a compensation gate signal GC.

The capacitor CST includes a first electrode connected to the first node N1 and a second electrode connected to a fourth node N4.

The fifth switching element T5 includes a first electrode receiving a first power voltage ELVDD and a second electrode connected to the second node N2. The sixth switching element T6 includes a first electrode connected to the third node N3 and a second electrode connected to an anode electrode of the light emitting element EE.

In an embodiment, a signal applied to a control electrode of the fifth switching element T5 is different from a signal applied to a control electrode of the sixth switching element T6.

The eighth switching element T8 includes a first electrode receiving a reference voltage VREF and a second electrode connected to the fourth node N4. The ninth switching element T9 includes a first electrode receiving a first power voltage ELVDD and a second electrode connected to the fourth node N4. In an embodiment, one of the eighth switching element T8 and the ninth switching element T9 is an N-type transistor and the other is a P-type transistor. For example, the eighth switching element T8 and the ninth switching element T9 may be complementary transistors. The eighth switching element T8 and the ninth switching element T9 may together form a Complementary Metal Oxide Semiconductor (CMOS) circuit.

In an embodiment, a control electrode of the eighth switching element T8 and a control electrode of the ninth switching element T9 both receive the bias gate signal GB.

In an embodiment, the eighth switching element T8 is an N-type transistor and the ninth switching element T9 is a P-type transistor. In an embodiment, a same signal (the bias gate signal GB) is applied to the control electrode of the eighth switching element T8 and the control electrode of the ninth switching element T9. Thus, when the eight switching element T8 is turned on, the ninth switching element T9 may be turned off. When the eight switching element T8 is turned off, the ninth switching element T9 may be turned on.

In the present embodiment, the driving current of the light emitting element EE may be determined based on a difference between the reference voltage VREF and the data voltage VDATA. The reference voltage VREF may be lower than the first power voltage ELVDD.

The pixel circuit may further include a fourth switching element T4 and a seventh switching element T7.

The fourth switching element T4 may include a control electrode receiving an initialization gate signal GI, a first electrode connected to the first node N1 and a second electrode receiving a first initialization voltage VINT.

In the present embodiment, the seventh switching element T7 may include a control electrode receiving the data writing gate signal GW, a first electrode receiving a second initialization voltage VAINT and a second electrode connected to the anode electrode. Thus, in the present embodiment, the anode electrode of the light emitting element EE may be initialized in the third period DR3 of FIG. 3.

A cathode of the light emitting element EE may receive a second power voltage ELVSS.

For example, the first switching element T1 may be the P-type transistor. The second switching element T2 may be the P-type transistor. The third switching element T3 may be the N-type transistor. The fourth switching element T4 may be the N-type transistor. The fifth switching element T5 may be the P-type transistor. The sixth switching element T6 may be the P-type transistor. The seventh switching element T7 may be the P-type transistor.

According to the present embodiment, the driving current IEE of the light emitting element EE may be determined based on the difference between the reference voltage VREF, which is lower than the first power voltage ELVDD, and the data voltage VDATA in the pixel circuit. Thus, the power consumption of the pixel circuit may be reduced.

In addition, the bias operation of the first switching element T1 may be performed in the bias period DR4 when different signals are applied to the control electrode of the fifth switching element T5 and the control electrode of the sixth switching element T6. In this state, the first switching element T1 and the fifth switching element T5 are turned on while the sixth switching element T6 is turned off. Thus, the hysteresis characteristics of the first switching element T1 may be enhanced so that the display quality of the display panel 100 may be enhanced.

Figure 24:
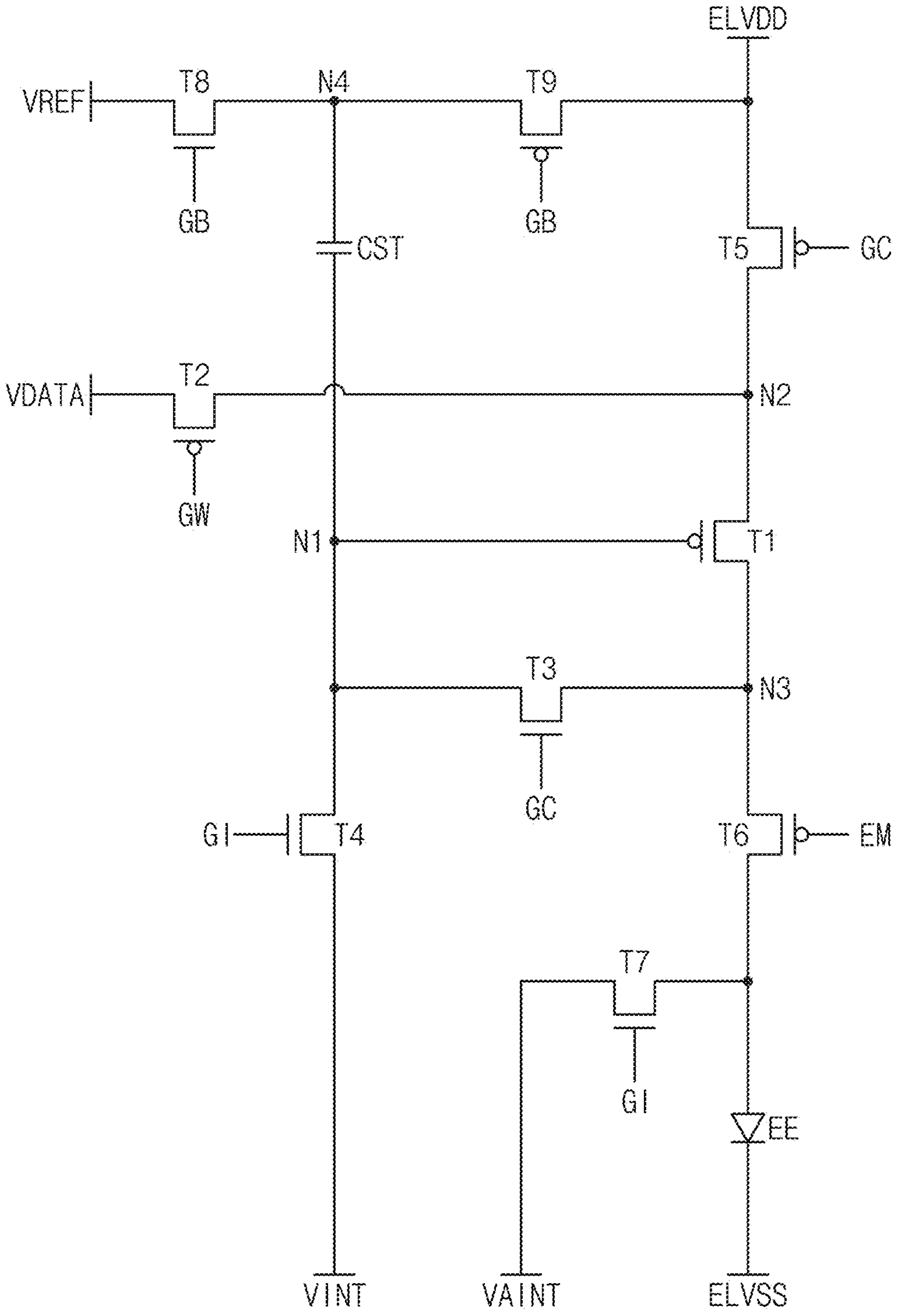
FIG. 24 is a circuit diagram illustrating a pixel circuit of a display apparatus according to an embodiment of the present inventive concept.

FIG. 24 is a circuit diagram illustrating a pixel circuit of a display apparatus according to an embodiment of the present inventive concept.

The pixel circuit of the display apparatus according to the present embodiment is substantially the same as the pixel circuit of the display apparatus of the previous embodiment explained referring to FIGS. 1 to 12 except for the seventh switching element. Thus, the same reference numerals will be used to refer to the same or like parts as those described in the previous embodiment of FIGS. 1 to 12 and any repetitive explanation concerning the above elements will be omitted.

Referring to FIGS. 1 and 24, the pixel circuit includes a light emitting element EE, a first switching element T1, a second switching element T2, a third switching element T3, a capacitor CST, a fifth switching element T5, a sixth switching element T6, an eighth switching element T8 and a ninth switching element T9.

The first switching element T1 includes a control electrode connected to a first node N1, a first electrode connected to a second node N2 and a second electrode connected to a third node N3. The first switching element T1 may apply a driving current to the light emitting element EE.

The second switching element T2 applies a data voltage VDATA to the second node N2 in response to a data writing gate signal GW.

The third switching element T3 connects the first node N1 and the third node N3 in response to a compensation gate signal GC.

The capacitor CST includes a first electrode connected to the first node N1 and a second electrode connected to a fourth node N4.

The fifth switching element T5 includes a first electrode receiving a first power voltage ELVDD and a second electrode connected to the second node N2. The sixth switching element T6 includes a first electrode connected to the third node N3 and a second electrode connected to an anode electrode of the light emitting element EE.

In an embodiment, a signal applied to a control electrode of the fifth switching element T5 is different from a signal applied to a control electrode of the sixth switching element T6.

The eighth switching element T8 includes a first electrode receiving a reference voltage VREF and a second electrode connected to the fourth node N4. The ninth switching element T9 includes a first electrode receiving a first power voltage ELVDD and a second electrode connected to the fourth node N4. In an embodiment, one of the eighth switching element T8 and the ninth switching element T9 is an N-type transistor and the other is a P-type transistor. For example, the switching element T8 and the ninth switching element T9 may be complementary transistors. In other words, the eighth switching element T8 and the ninth switching element T9 may together form a Complementary Metal Oxide Semiconductor (CMOS) circuit.

In an embodiment, a control electrode of the eighth switching element T8 and a control electrode of the ninth switching element T9 receive the bias gate signal GB.

In the present embodiment, the eighth switching element T8 may be an N-type transistor and the ninth switching element T9 may be a P-type transistor. In an embodiment, a same signal (the bias gate signal GB) is applied to the control electrode of the eighth switching element T8 and the control electrode of the ninth switching element T9. Thus, when the eight switching element T8 is turned on, the ninth switching element T9 may be turned off. When the eight switching element T8 is turned off, the ninth switching element T9 may be turned on.

In the present embodiment, the driving current of the light emitting element EE may be determined based on a difference between the reference voltage VREF and the data voltage VDATA. The reference voltage VREF may be lower than the first power voltage ELVDD.

The pixel circuit may further include a fourth switching element T4 and a seventh switching element T7.

The fourth switching element T4 may include a control electrode receiving an initialization gate signal GI, a first electrode connected to the first node N1 and a second electrode receiving a first initialization voltage VINT.

In the present embodiment, the seventh switching element T7 may include a control electrode receiving the initialization gate signal GI, a first electrode receiving a second initialization voltage VAINT and a second electrode connected to the anode electrode of the light emitting element EE. Thus, in the present embodiment, the anode electrode of the light emitting element EE may be initialized in the first period DR1 of FIG. 3.

A cathode electrode of the light emitting element EE may receive a second power voltage ELVSS.

For example, the first switching element T1 may be the P-type transistor. The second switching element T2 may be the P-type transistor. The third switching element T3 may be the N-type transistor. The fourth switching element T4 may be the N-type transistor. The fifth switching element T5 may be the P-type transistor. The sixth switching element T6 may be the P-type transistor. The seventh switching element T7 may be the N-type transistor.

According to the present embodiment, the driving current IEE of the light emitting element EE may be determined based on the difference between the reference voltage VREF, which is lower than the first power voltage ELVDD, and the data voltage VDATA in the pixel circuit. Thus, the power consumption of the pixel circuit may be reduced.

In addition, the bias operation of the first switching element T1 may be performed in the bias period DR4 when different signals are applied to the control electrode of the fifth switching element T5 and the control electrode of the sixth switching element T6. In this state, the first switching element T1 and the fifth switching element T5 are turned on while the sixth switching element T6 is turned off. Thus, the hysteresis characteristics of the first switching element T1 may be enhanced so that the display quality of the display panel 100 may be enhanced.

Figure 25:
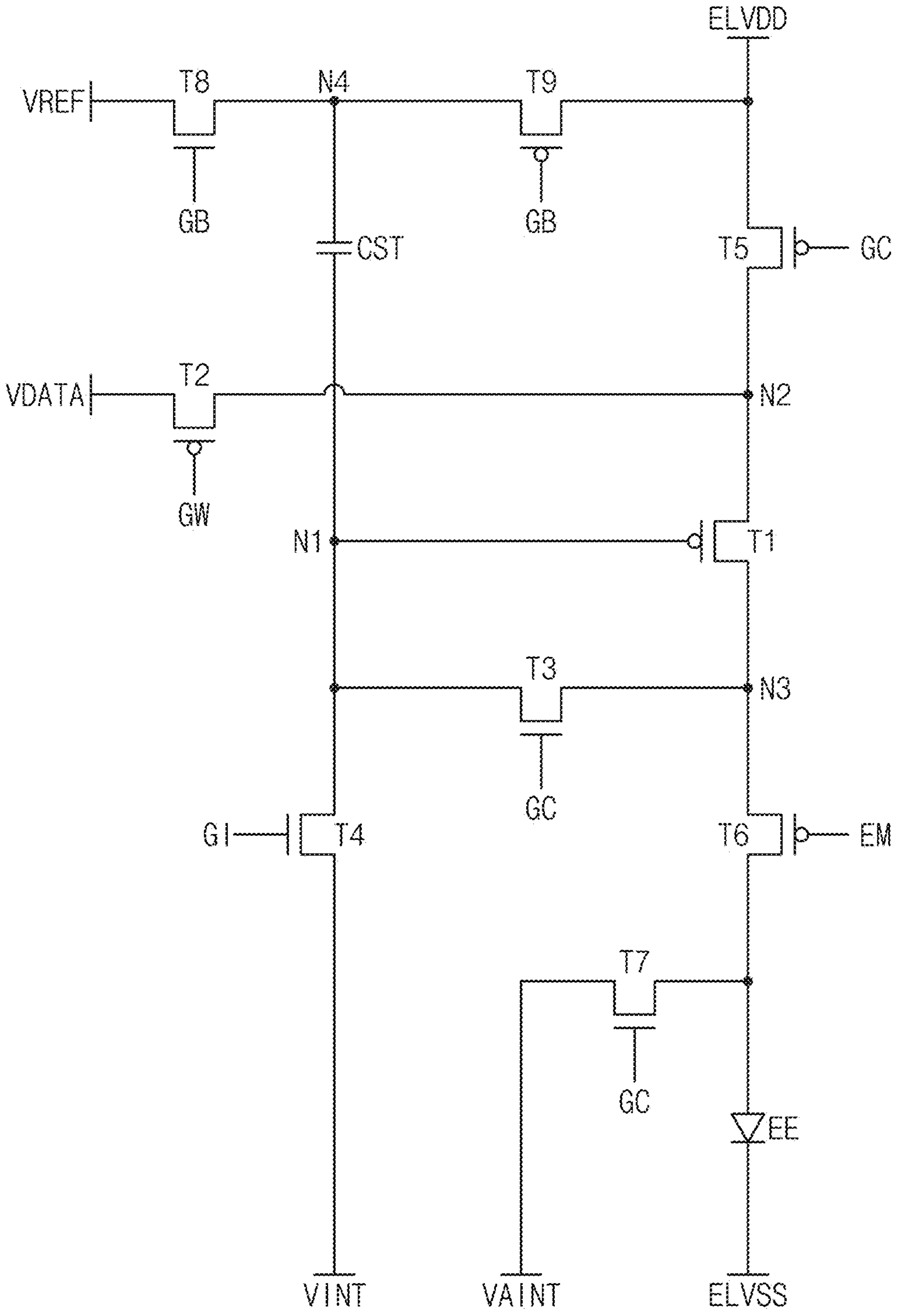
FIG. 25 is a circuit diagram illustrating a pixel circuit of a display apparatus according to an embodiment of the present inventive concept.

FIG. 25 is a circuit diagram illustrating a pixel circuit of a display apparatus according to an embodiment of the present inventive concept.

The pixel circuit of the display apparatus according to the present embodiment is substantially the same as the pixel circuit of the display apparatus of the previous embodiment explained referring to FIGS. 1 to 12 except for the seventh switching element. Thus, the same reference numerals will be used to refer to the same or like parts as those described in the previous embodiment of FIGS. 1 to 12 and any repetitive explanation concerning the above elements will be omitted.

Referring to FIGS. 1 and 25, the pixel circuit includes a light emitting element EE, a first switching element T1, a second switching element T2, a third switching element T3, a capacitor CST, a fifth switching element T5, a sixth switching element T6, an eighth switching element T8 and a ninth switching element T9.

The first switching element T1 includes a control electrode connected to a first node N1, a first electrode connected to a second node N2 and a second electrode connected to a third node N3. The first switching element T1 may apply a driving current to the light emitting element EE.

The second switching element T2 applies a data voltage VDATA to the second node N2 in response to a data writing gate signal GW.

The third switching element T3 connects the first node N1 and the third node N3 in response to a compensation gate signal GC.

The capacitor CST includes a first electrode connected to the first node N1 and a second electrode connected to a fourth node N4.

The fifth switching element T5 includes a first electrode receiving a first power voltage ELVDD and a second electrode connected to the second node N2. The sixth switching element T6 includes a first electrode connected to the third node N3 and a second electrode connected to an anode electrode of the light emitting element EE.

A signal applied to a control electrode of the fifth switching element T5 is different from a signal applied to a control electrode of the sixth switching element T6.

The eighth switching element T8 includes a first electrode receiving a reference voltage VREF and a second electrode connected to the fourth node N4. The ninth switching element T9 includes a first electrode receiving a first power voltage ELVDD and a second electrode connected to the fourth node N4. In an embodiment, one of the eighth switching element T8 and the ninth switching element T9 is an N-type transistor and the other is a P-type transistor. For example, the eighth switching element T8 and the ninth switching element T9 may be complementary transistors. The eighth switching element T8 and the ninth switching element T9 may together form a Complementary Metal Oxide Semiconductor (CMOS) circuit.

In an embodiment, a control electrode of the eighth switching element T8 and a control electrode of the ninth switching element T9 receive the bias gate signal GB.

In the present embodiment, the eighth switching element T8 may be an N-type transistor and the ninth switching element T9 may be a P-type transistor. In an embodiment, a same signal (the bias gate signal GB) is applied to the control electrode of the eighth switching element T8 and the control electrode of the ninth switching element T9. Thus, when the eight switching element T8 is turned on, the ninth switching element T9 may be turned off. When the eight switching element T8 is turned off, the ninth switching element T9 may be turned on.

In the present embodiment, the driving current of the light emitting element EE may be determined based on a difference between the reference voltage VREF and the data voltage VDATA. The reference voltage VREF may be lower than the first power voltage ELVDD.

The pixel circuit may further include a fourth switching element T4 and a seventh switching element T7.

The fourth switching element T4 may include a control electrode receiving an initialization gate signal GI, a first electrode connected to the first node N1 and a second electrode receiving a first initialization voltage VINT.

In the present embodiment, the seventh switching element T7 may include a control electrode receiving the compensation gate signal GC, a first electrode receiving a second initialization voltage VAINT and a second electrode connected to the anode electrode. Thus, in the present embodiment, the anode electrode of the light emitting element EE may be initialized in the second period DR2 and the third period DR3 of FIG. 3.

A cathode electrode of the light emitting element EE may receive a second power voltage ELVSS.

For example, the first switching element T1 may be the P-type transistor. The second switching element T2 may be the P-type transistor. The third switching element T3 may be the N-type transistor. The fourth switching element T4 may be the N-type transistor. The fifth switching element T5 may be the P-type transistor. The sixth switching element T6 may be the P-type transistor. The seventh switching element T7 may be the N-type transistor.

According to the present embodiment, the driving current IEE of the light emitting element EE may be determined based on the difference between the reference voltage VREF, which is lower than the first power voltage ELVDD, and the data voltage VDATA in the pixel circuit. Thus, the power consumption of the pixel circuit may be reduced.

In addition, the bias operation of the first switching element T1 may be performed in the bias period DR4 when different signals are applied to the control electrode of the fifth switching element T5 and the control electrode of the sixth switching element T6. In this state, the first switching element T1 and the fifth switching element T5 are turned on while the sixth switching element T6 is turned off. Thus, the hysteresis characteristics of the first switching element T1 may be enhanced so that the display quality of the display panel 100 may be enhanced.

Figure 26:
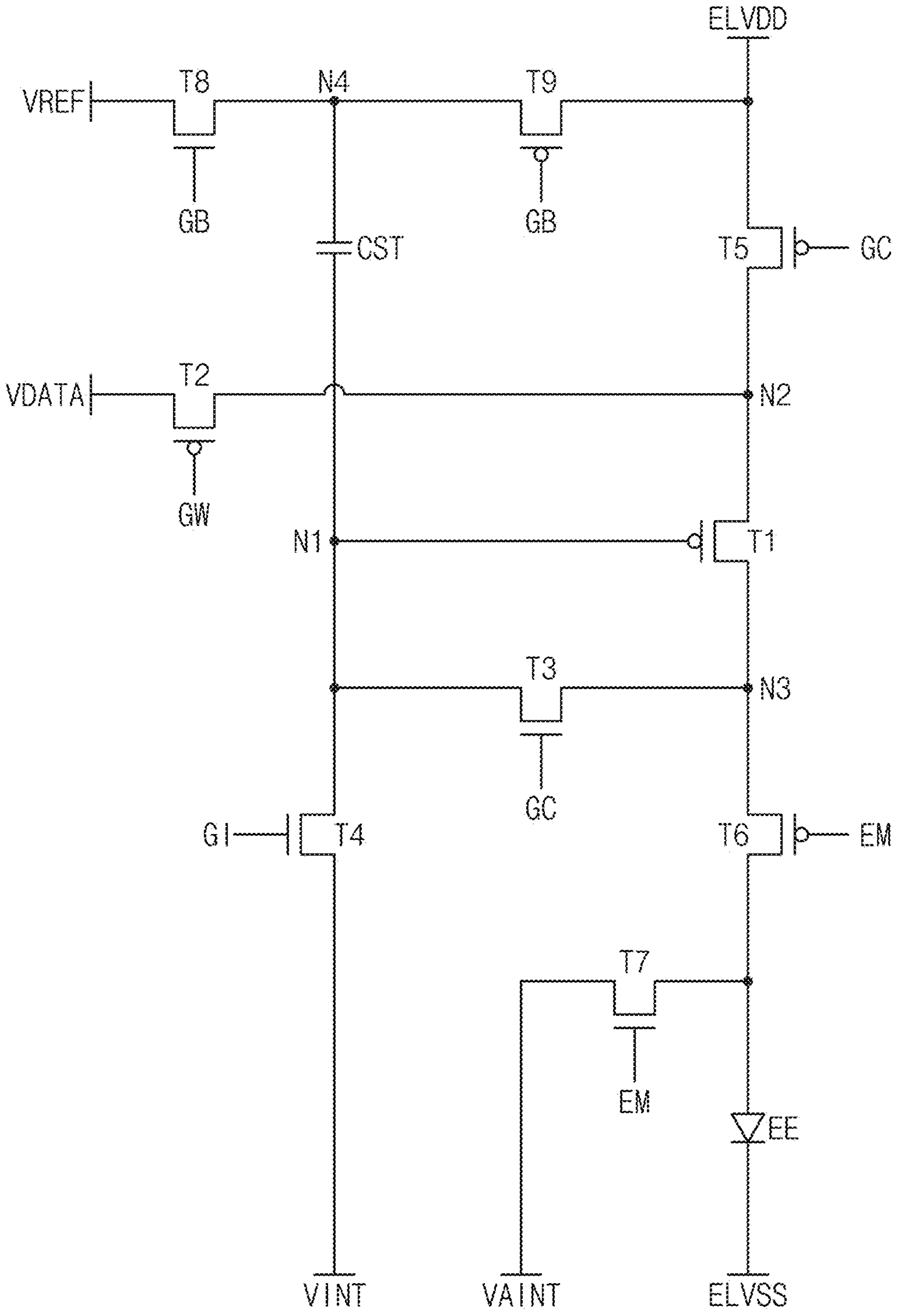
FIG. 26 is a circuit diagram illustrating a pixel circuit of a display apparatus according to an embodiment of the present inventive concept.

FIG. 26 is a circuit diagram illustrating a pixel circuit of a display apparatus according to an embodiment of the present inventive concept.

The pixel circuit of the display apparatus according to the present embodiment is substantially the same as the pixel circuit of the display apparatus of the previous embodiment explained referring to FIGS. 1 to 12 except for the seventh switching element. Thus, the same reference numerals will be used to refer to the same or like parts as those described in the previous embodiment of FIGS. 1 to 12 and any repetitive explanation concerning the above elements will be omitted.

Referring to FIGS. 1 and 26, the pixel circuit includes a light emitting element EE, a first switching element T1, a second switching element T2, a third switching element T3, a capacitor CST, a fifth switching element T5, a sixth switching element T6, an eighth switching element T8 and a ninth switching element T9.

The first switching element T1 includes a control electrode connected to a first node N1, a first electrode connected to a second node N2 and a second electrode connected to a third node N3. The first switching element T1 may apply a driving current to the light emitting element EE.

The second switching element T2 applies a data voltage VDATA to the second node N2 in response to a data writing gate signal GW.

The third switching element T3 connects the first node N1 and the third node N3 in response to a compensation gate signal GC.

The capacitor CST includes a first electrode connected to the first node N1 and a second electrode connected to a fourth node N4.

The fifth switching element T5 includes a first electrode receiving a first power voltage ELVDD and a second electrode connected to the second node N2. The sixth switching element T6 includes a first electrode connected to the third node N3 and a second electrode connected to an anode electrode of the light emitting element EE.

In an embodiment, a signal applied to a control electrode of the fifth switching element T5 is different from a signal applied to a control electrode of the sixth switching element T6.

The eighth switching element T8 includes a first electrode receiving a reference voltage VREF and a second electrode connected to the fourth node N4. The ninth switching element T9 includes a first electrode receiving a first power voltage ELVDD and a second electrode connected to the fourth node N4. In an embodiment, one of the eighth switching element T8 and the ninth switching element T9 is an N-type transistor and the other is a P-type transistor. For example, the eighth switching element T8 and the ninth switching element T9 may be complementary transistors. The eighth switching element T8 and the ninth switching element T9 may together form a Complementary Metal Oxide Semiconductor (CMOS) circuit.

In an embodiment, a control electrode of the eighth switching element T8 and a control electrode of the ninth switching element T9 receive the bias gate signal GB.

In the present embodiment, the eighth switching element T8 may be an N-type transistor and the ninth switching element T9 may be a P-type transistor. In an embodiment, a same signal (the bias gate signal GB) is applied to the control electrode of the eighth switching element T8 and the control electrode of the ninth switching element T9. Thus, when the eight switching element T8 is turned on, the ninth switching element T9 may be turned off. When the eight switching element T8 is turned off, the ninth switching element T9 may be turned on.

In the present embodiment, the driving current of the light emitting element EE may be determined based on a difference between the reference voltage VREF and the data voltage VDATA. The reference voltage VREF may be lower than the first power voltage ELVDD.

The pixel circuit may further include a fourth switching element T4 and a seventh switching element T7.

The fourth switching element T4 may include a control electrode receiving an initialization gate signal GI, a first electrode connected to the first node N1 and a second electrode receiving a first initialization voltage VINT.

In the present embodiment, the seventh switching element T7 may include a control electrode receiving the emission signal EM, a first electrode receiving a second initialization voltage VAINT and a second electrode connected to the anode electrode. Thus, in the present embodiment, the anode electrode of the light emitting element EE may be initialized in the first period DR1 to the fourth period DR4 of FIG. 3.

A cathode electrode of the light emitting element EE may receive a second power voltage ELVSS.

For example, the first switching element T1 may be the P-type transistor. The second switching element T2 may be the P-type transistor. The third switching element T3 may be the N-type transistor. The fourth switching element T4 may be the N-type transistor. The fifth switching element T5 may be the P-type transistor. The sixth switching element T6 may be the P-type transistor. The seventh switching element T7 may be the N-type transistor.

According to the present embodiment, the driving current IEE of the light emitting element EE may be determined based on the difference between the reference voltage VREF, which is lower than the first power voltage ELVDD, and the data voltage VDATA in the pixel circuit. Thus, the power consumption of the pixel circuit may be reduced.

In addition, the bias operation of the first switching element T1 may be performed in the bias period DR4 when different signals are applied to the control electrode of the fifth switching element T5 and the control electrode of the sixth switching element T6. In this state, the first switching element T1 and the fifth switching element T5 are turned on while the sixth switching element T6 is turned off. Thus, the hysteresis characteristics of the first switching element T1 may be enhanced so that the display quality of the display panel 100 may be enhanced.

Figure 27:
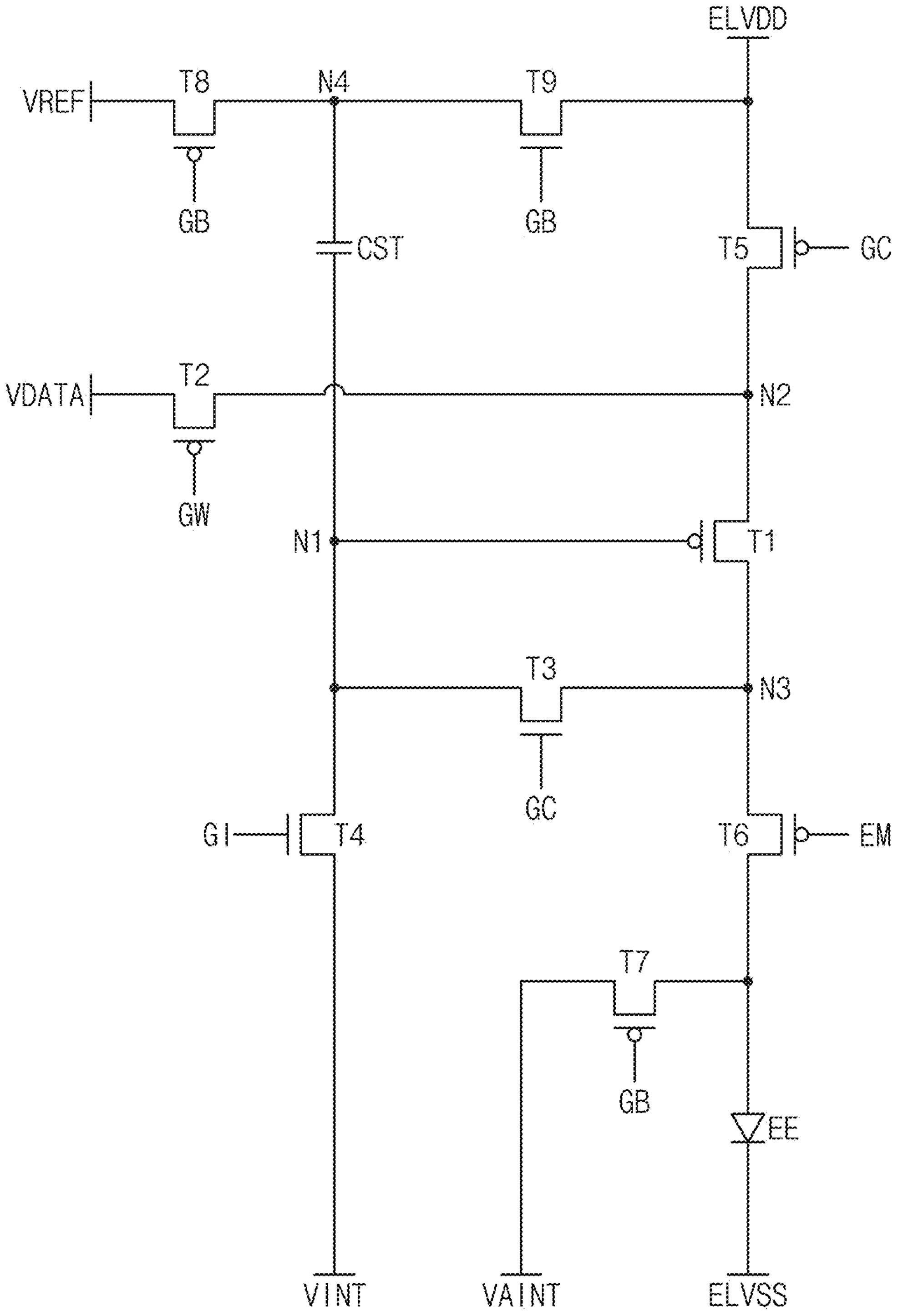
FIG. 27 is a circuit diagram illustrating a pixel circuit of a display apparatus according to an embodiment of the present inventive concept.
Figure 28:
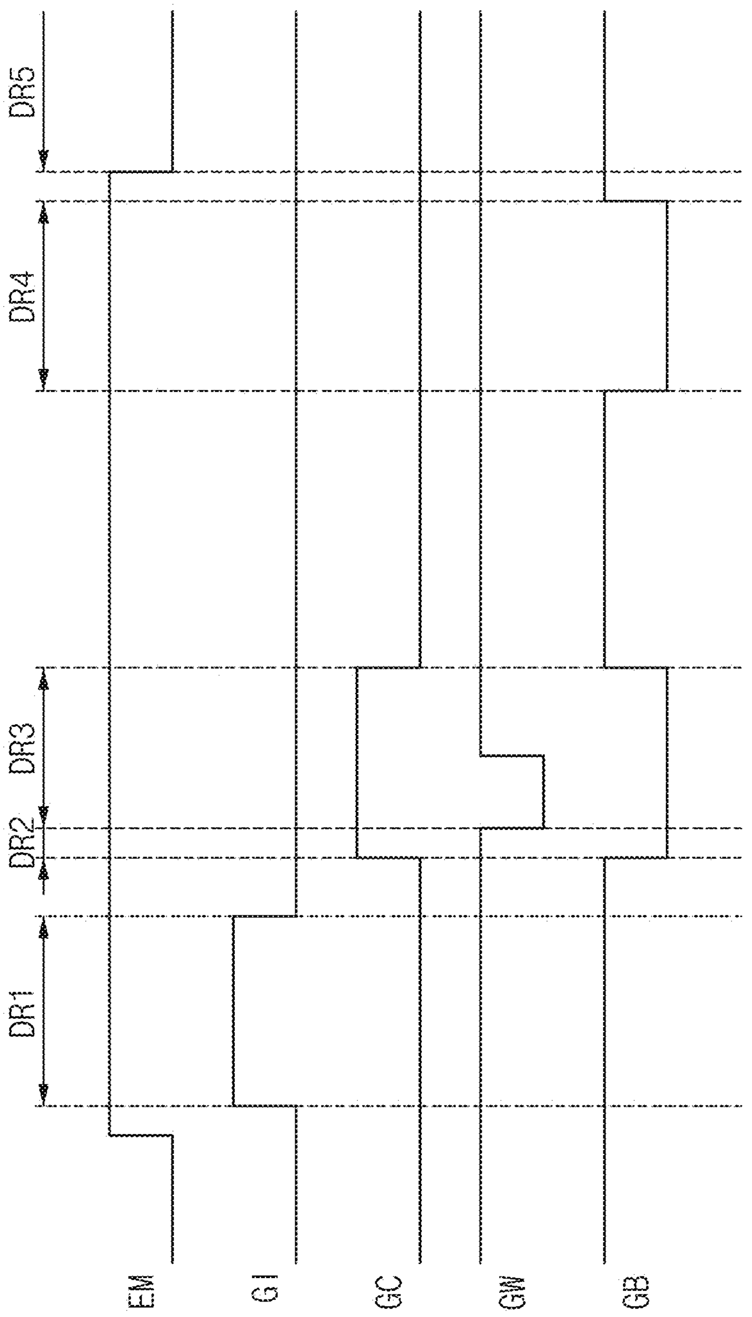
FIG. 28 is a timing diagram illustrating an example of an operation of the pixel circuit of FIG. 27.

FIG. 27 is a circuit diagram illustrating a pixel circuit of a display apparatus according to an embodiment of the present inventive concept. FIG. 28 is a timing diagram illustrating an example of an operation of the pixel circuit of FIG. 27.

The pixel circuit of the display apparatus according to the present embodiment is substantially the same as the pixel circuit of the display apparatus of the previous embodiment explained referring to FIGS. 1 to 12 except for the seventh switching element, the eighth switching element and the ninth switching element. Thus, the same reference numerals will be used to refer to the same or like parts as those described in the previous embodiment of FIGS. 1 to 12 and any repetitive explanation concerning the above elements will be omitted.

Referring to FIGS. 1, 27 and 28, the pixel circuit includes a light emitting element EE, a first switching element T1, a second switching element T2, a third switching element T3, a capacitor CST, a fifth switching element T5, a sixth switching element T6, an eighth switching element T8 and a ninth switching element T9.

The first switching element T1 includes a control electrode connected to a first node N1, a first electrode connected to a second node N2 and a second electrode connected to a third node N3. The first switching element T1 may apply a driving current to the light emitting element EE.

The second switching element T2 applies a data voltage VDATA to the second node N2 in response to a data writing gate signal GW.

The third switching element T3 connects the first node N1 and the third node N3 in response to a compensation gate signal GC.

The capacitor CST includes a first electrode connected to the first node N1 and a second electrode connected to a fourth node N4.

The fifth switching element T5 includes a first electrode receiving a first power voltage ELVDD and a second electrode connected to the second node N2. The sixth switching element T6 includes a first electrode connected to the third node N3 and a second electrode connected to an anode electrode of the light emitting element EE.

In an embodiment, a signal applied to a control electrode of the fifth switching element T5 is different from a signal applied to a control electrode of the sixth switching element T6.

The eighth switching element T8 includes a first electrode receiving a reference voltage VREF and a second electrode connected to the fourth node N4. The ninth switching element T9 includes a first electrode receiving a first power voltage ELVDD and a second electrode connected to the fourth node N4. In an embodiment, one of the eighth switching element T8 and the ninth switching element T9 is an N-type transistor and the other is a P-type transistor. For example, the eighth switching element T8 and the ninth switching element T9 may be complementary transistors. The eighth switching element T8 and the ninth switching element T9 may together form a Complementary Metal Oxide Semiconductor (CMOS) circuit.

In an embodiment, a control electrode of the eighth switching element T8 and a control electrode of the ninth switching element T9 receives the bias gate signal GB.

In the present embodiment, the eighth switching element T8 may be a P-type transistor and the ninth switching element T9 may be an N-type transistor. In an embodiment, a same signal (the bias gate signal GB) is applied to the control electrode of the eighth switching element T8 and the control electrode of the ninth switching element T9. Thus, when the eight switching element T8 is turned on, the ninth switching element T9 may be turned off. When the eight switching element T8 is turned off, the ninth switching element T9 may be turned on.

In the present embodiment, the driving current of the light emitting element EE may be determined based on a difference between the reference voltage VREF and the data voltage VDATA. The reference voltage VREF may be lower than the first power voltage ELVDD.

The pixel circuit may further include a fourth switching element T4 and a seventh switching element T7.

The fourth switching element T4 may include a control electrode receiving an initialization gate signal GI, a first electrode connected to the first node N1 and a second electrode receiving a first initialization voltage VINT.

In the present embodiment, the seventh switching element T7 may include a control electrode receiving the bias gate signal GB, a first electrode receiving a second initialization voltage VAINT and a second electrode connected to the anode electrode. Thus, in the present embodiment, the anode electrode of the light emitting element EE may be initialized in the second period DR2, the third period DR3 and the fourth period DR4 of FIG. 28.

A cathode electrode of the light emitting element EE may receive a second power voltage ELVSS.

For example, the first switching element T1 may be the P-type transistor. The second switching element T2 may be the P-type transistor. The third switching element T3 may be the N-type transistor. The fourth switching element T4 may be the N-type transistor. The fifth switching element T5 may be the P-type transistor. The sixth switching element T6 may be the P-type transistor. The seventh switching element T7 may be the P-type transistor.

The timing diagram in FIG. 28 is substantially the same as the timing diagrams in FIGS. 3, 5, 7, 9 and 11 except that the waveform of the bias gate signal GB is inverted.

According to the present embodiment, the driving current IEE of the light emitting element EE may be determined based on the difference between the reference voltage VREF, which is lower than the first power voltage ELVDD, and the data voltage VDATA in the pixel circuit. Thus, the power consumption of the pixel circuit may be reduced.

In addition, the bias operation of the first switching element T1 may be performed in the bias period DR4 when different signals are applied to the control electrode of the fifth switching element T5 and the control electrode of the sixth switching element T6. In this state, the first switching element T1 and the fifth switching element T5 are turned on while the sixth switching element T6 is turned off. Thus, the hysteresis characteristics of the first switching element T1 may be enhanced so that the display quality of the display panel 100 may be enhanced.

Figure 29:
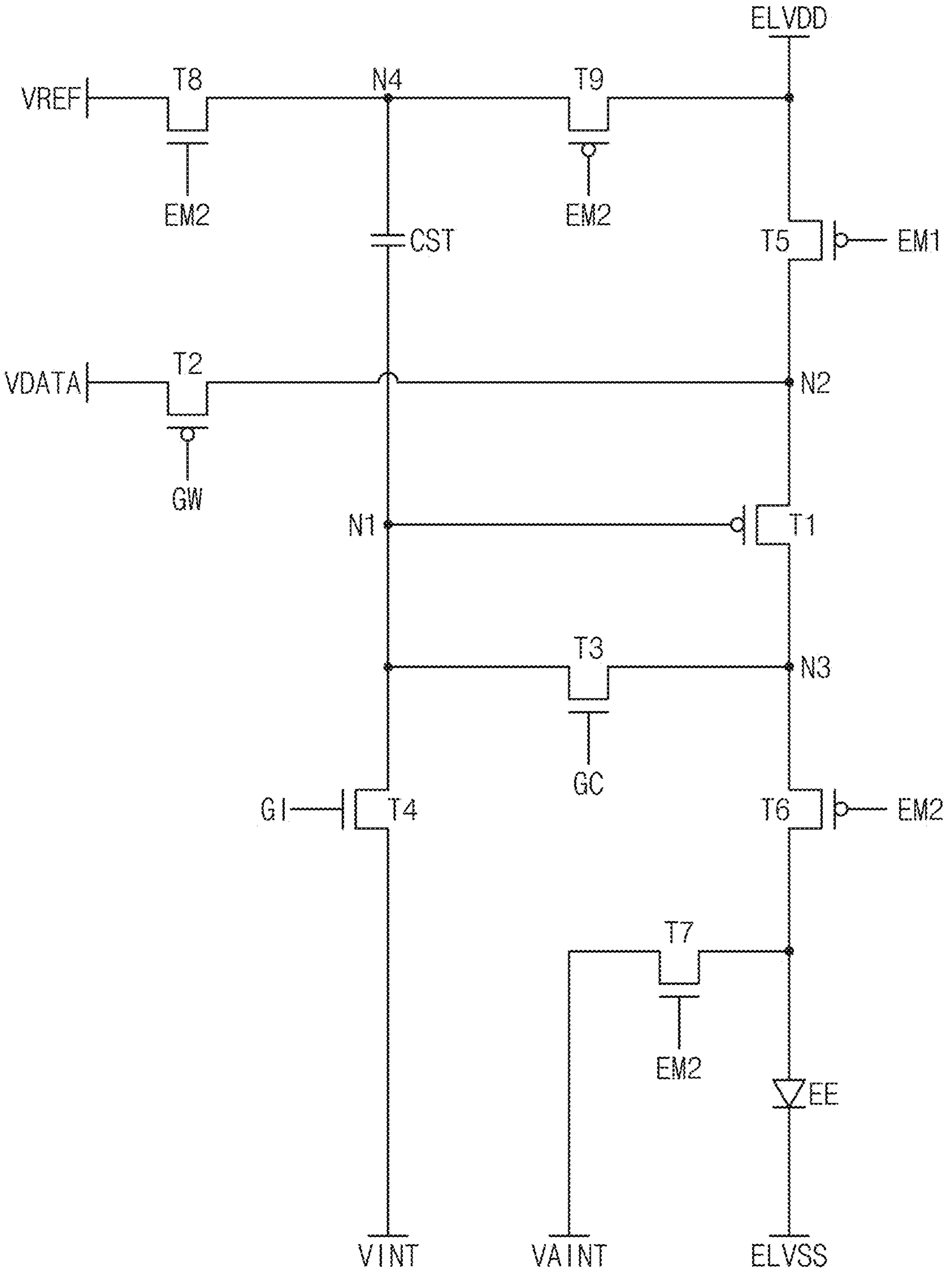
FIG. 29 is a circuit diagram illustrating a pixel circuit of a display apparatus according to an embodiment of the present inventive concept.
Figure 30:
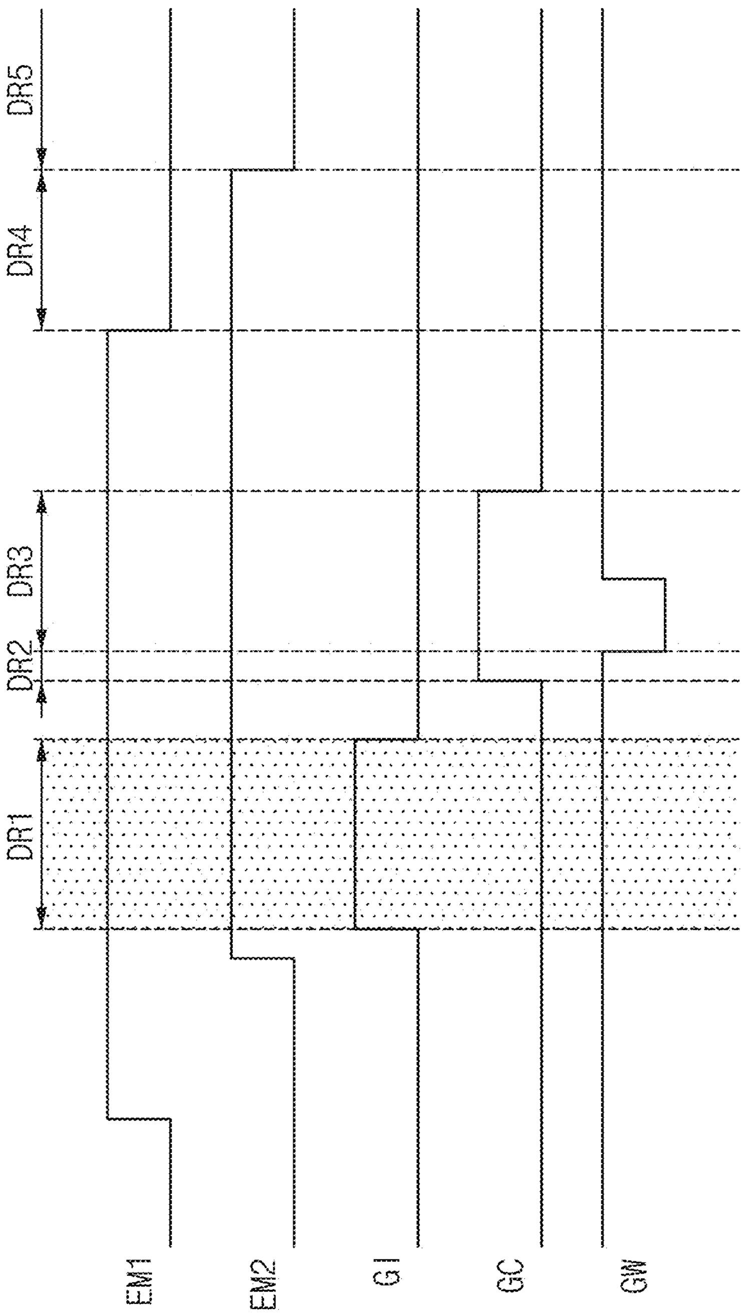
FIG. 30 is a timing diagram illustrating an example of an operation of the pixel circuit of FIG. 29 in a first period.
Figure 31:
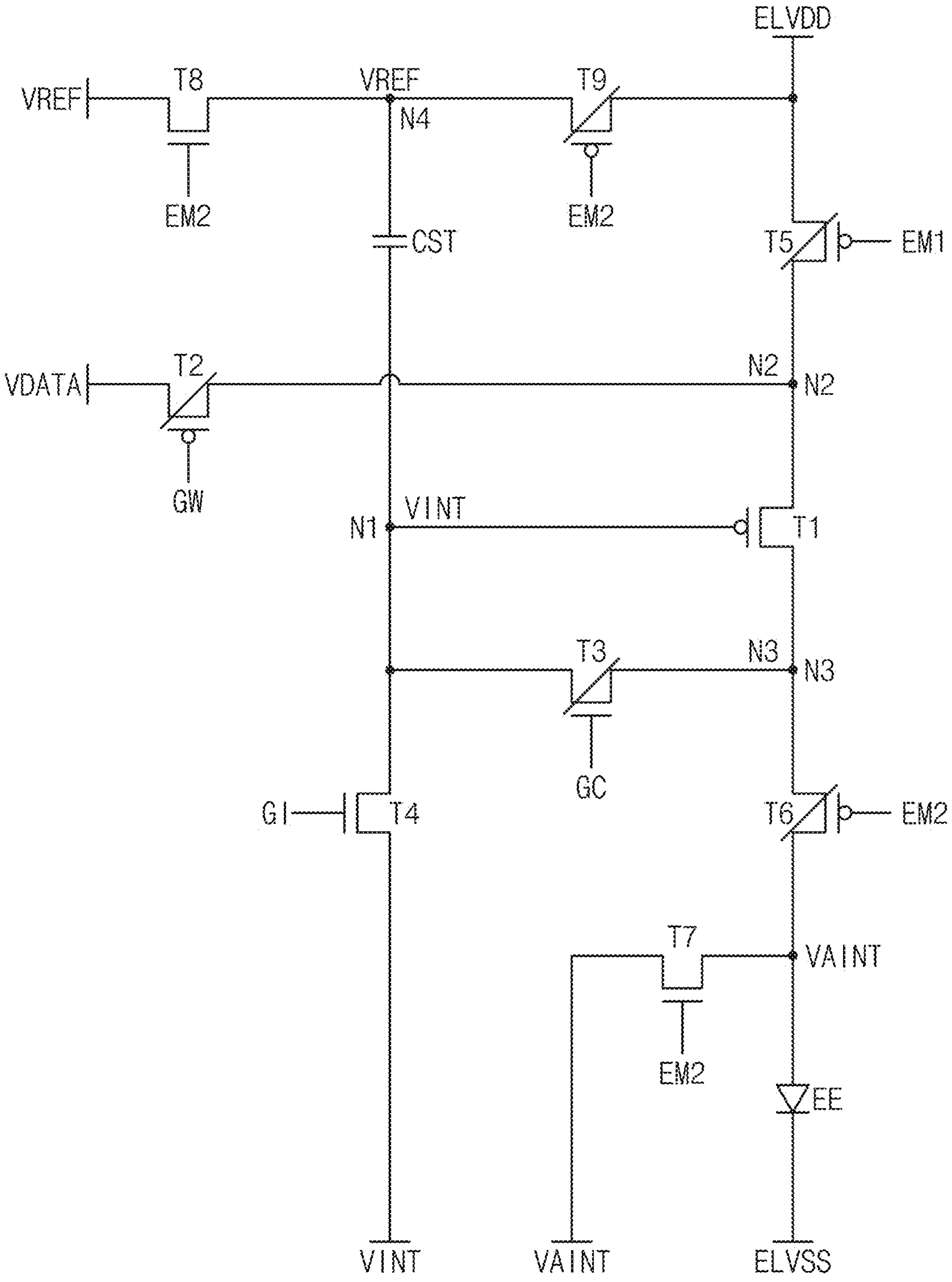
FIG. 31 is a circuit diagram illustrating an example of the operation of the pixel circuit of FIG. 29 in the first period.
Figure 32:
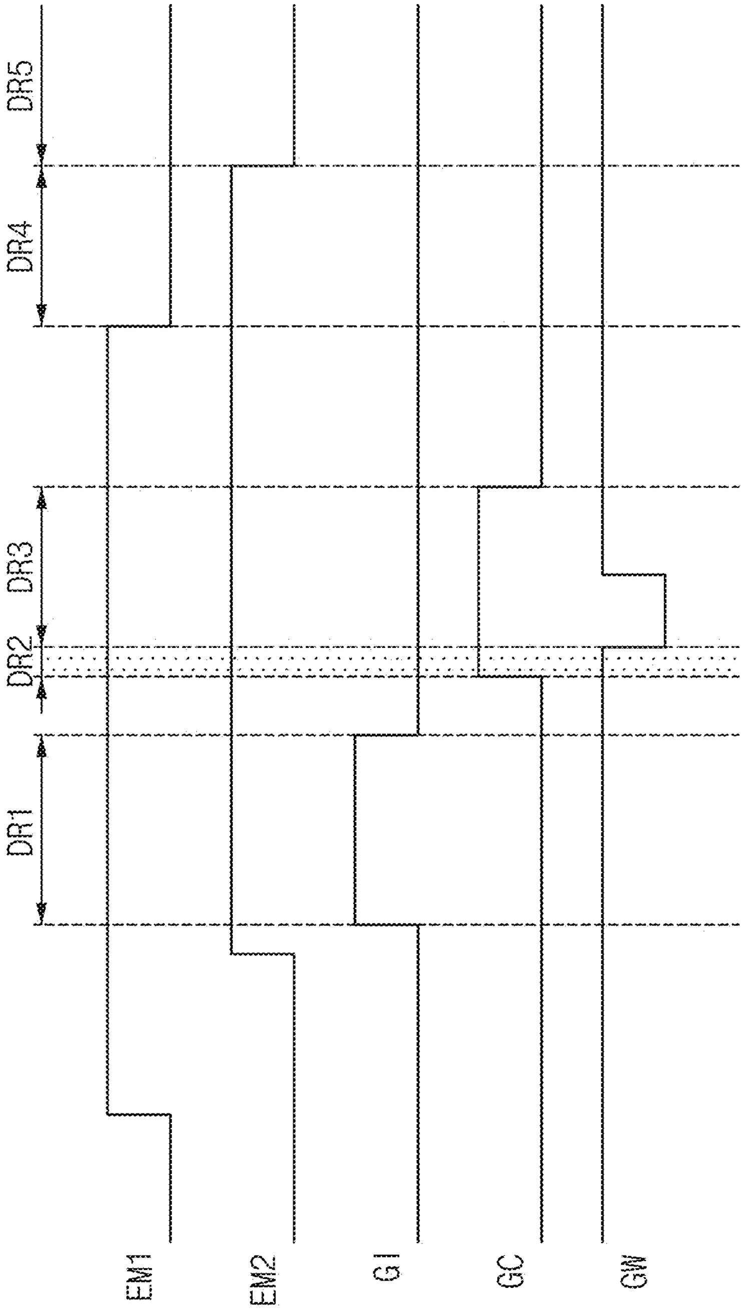
FIG. 32 is a timing diagram illustrating an example of an operation of the pixel circuit of FIG. 29 in a second period.
Figure 33:
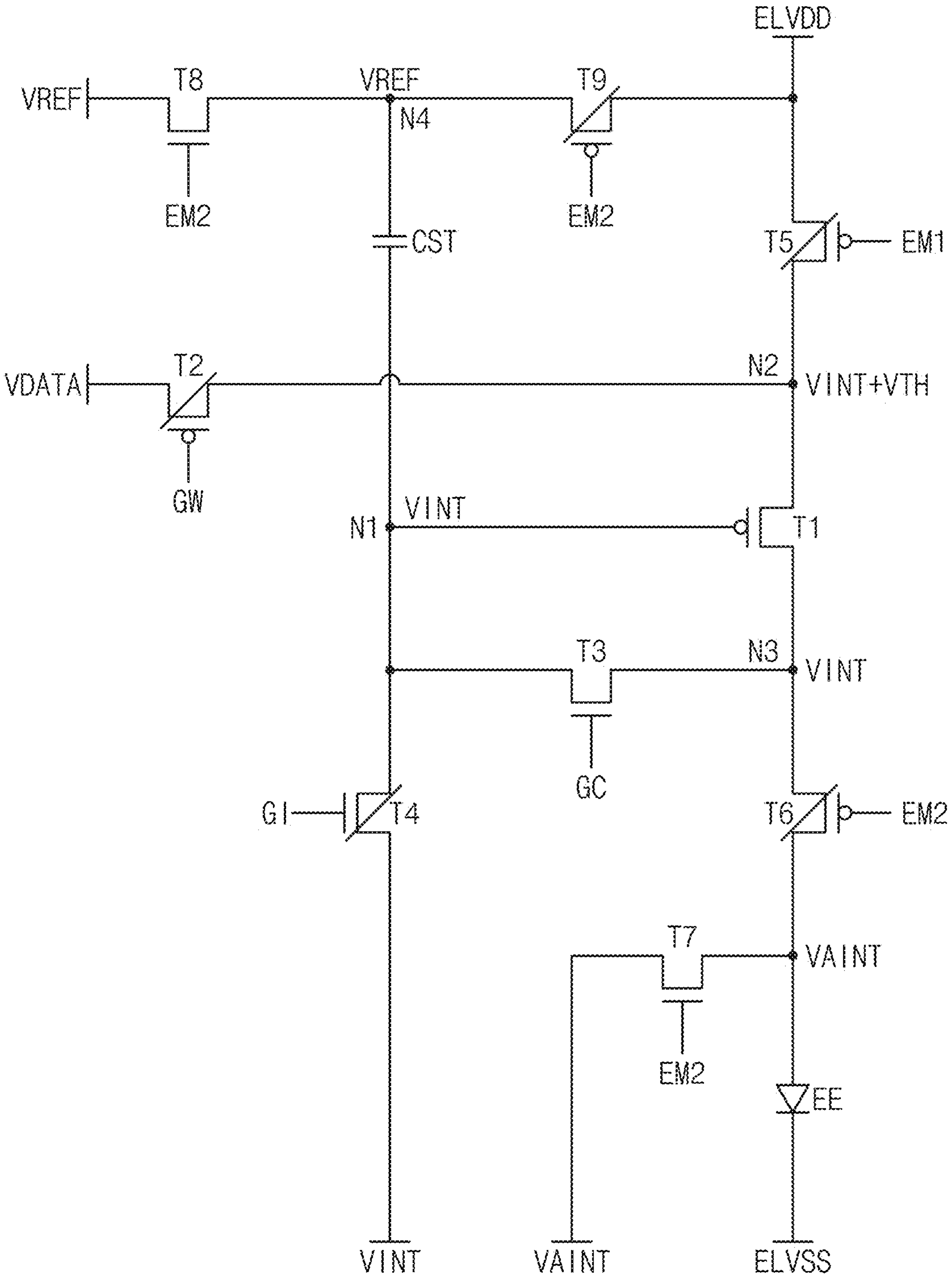
FIG. 33 is a circuit diagram illustrating an example of the operation of the pixel circuit of FIG. 29 in the second period.
Figure 34:
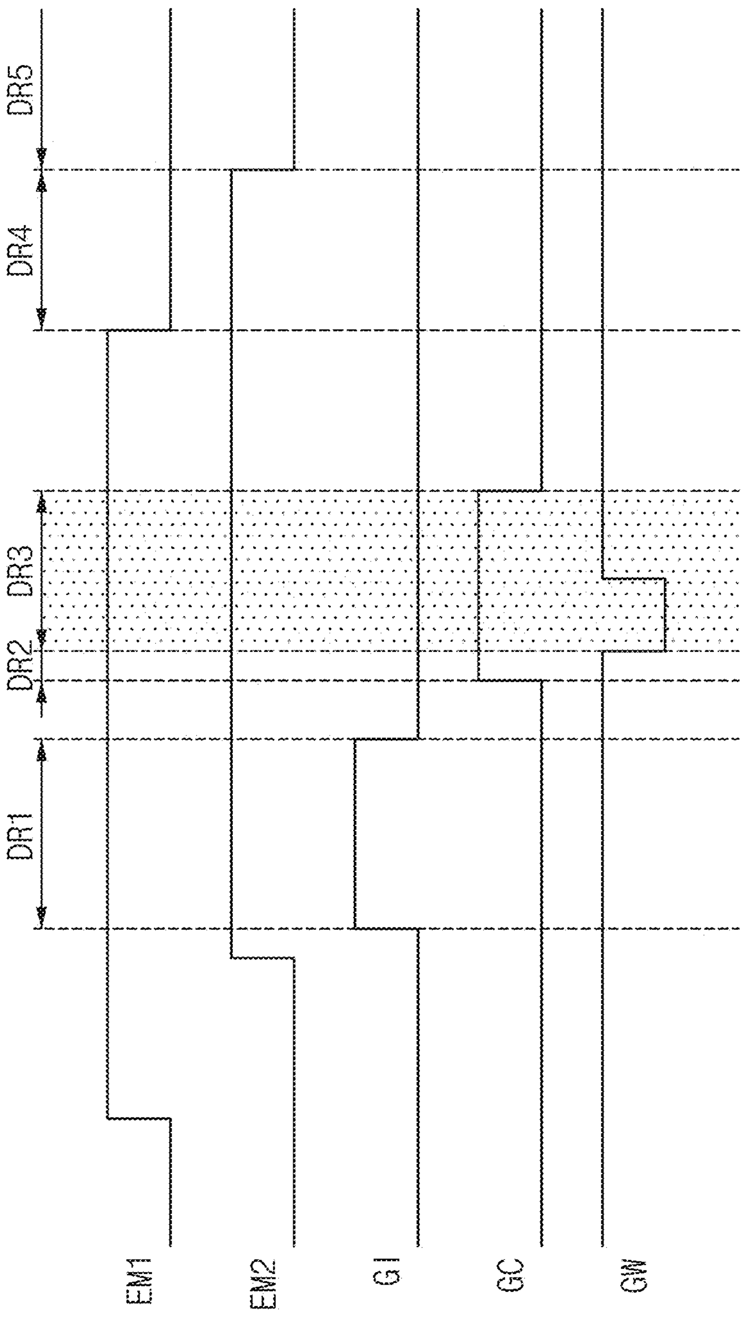
FIG. 34 is a timing diagram illustrating an example of an operation of the pixel circuit of FIG. 29 in a third period.
Figure 35:
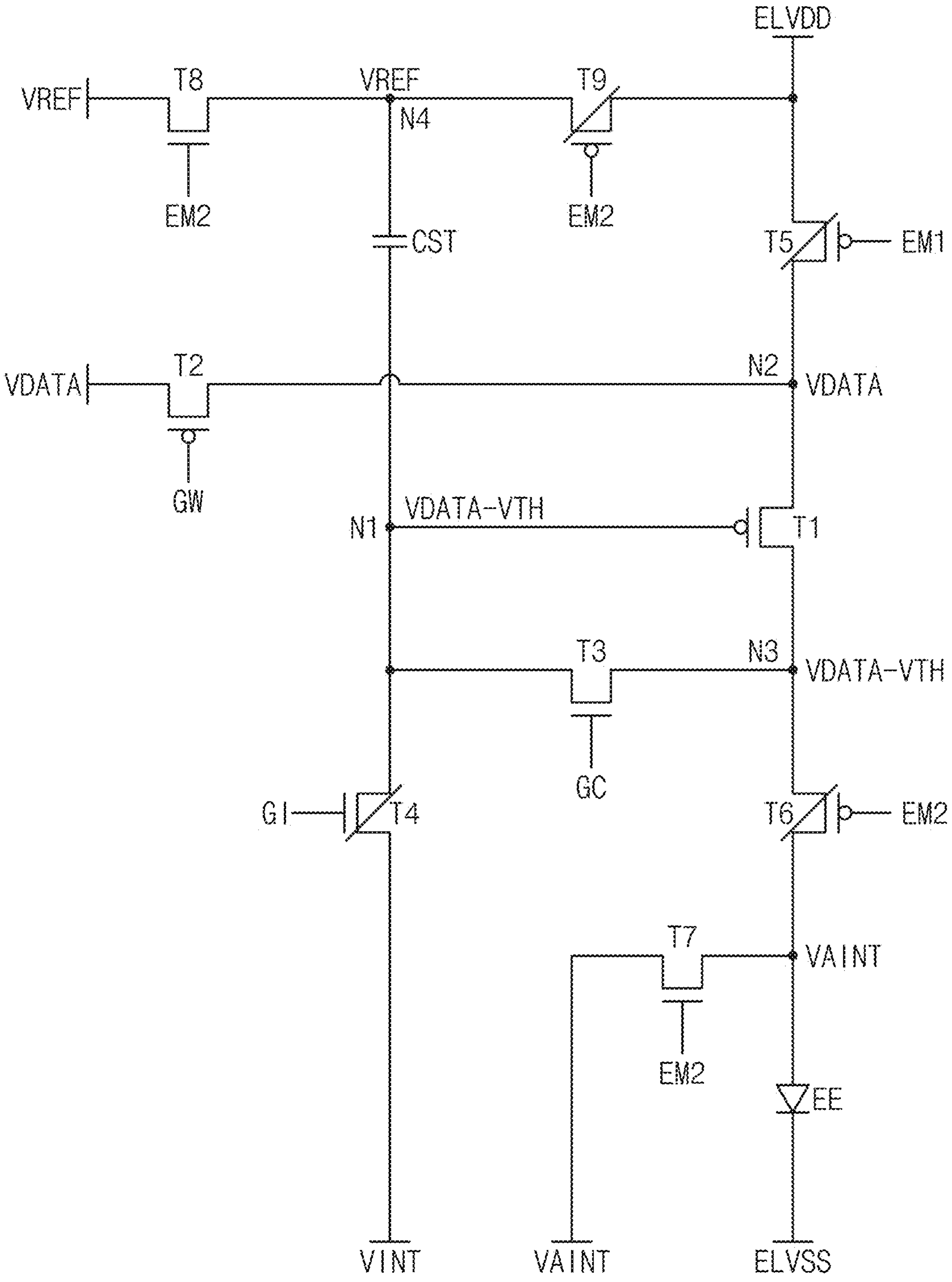
FIG. 35 is a circuit diagram illustrating an example of the operation of the pixel circuit of FIG. 29 in the third period.
Figure 36:
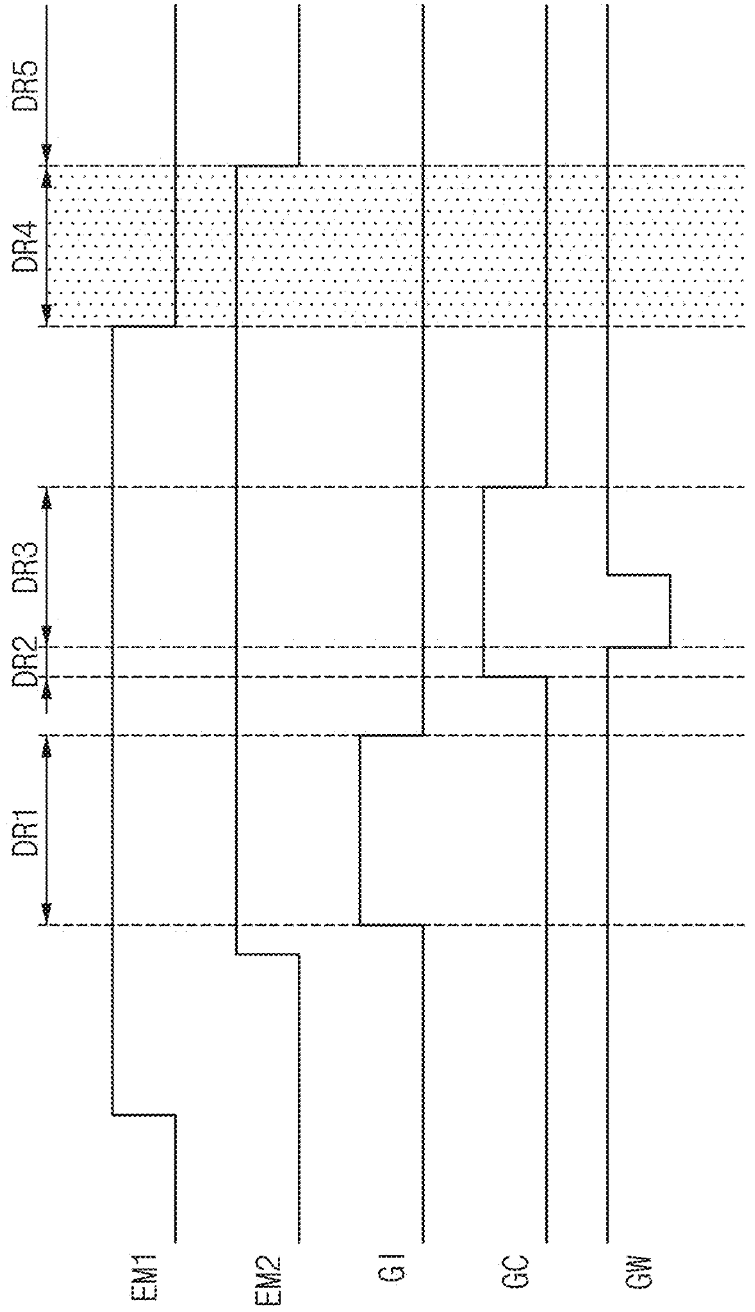
FIG. 36 is a timing diagram illustrating an example of an operation of the pixel circuit of FIG. 29 in a fourth period.
Figure 37:
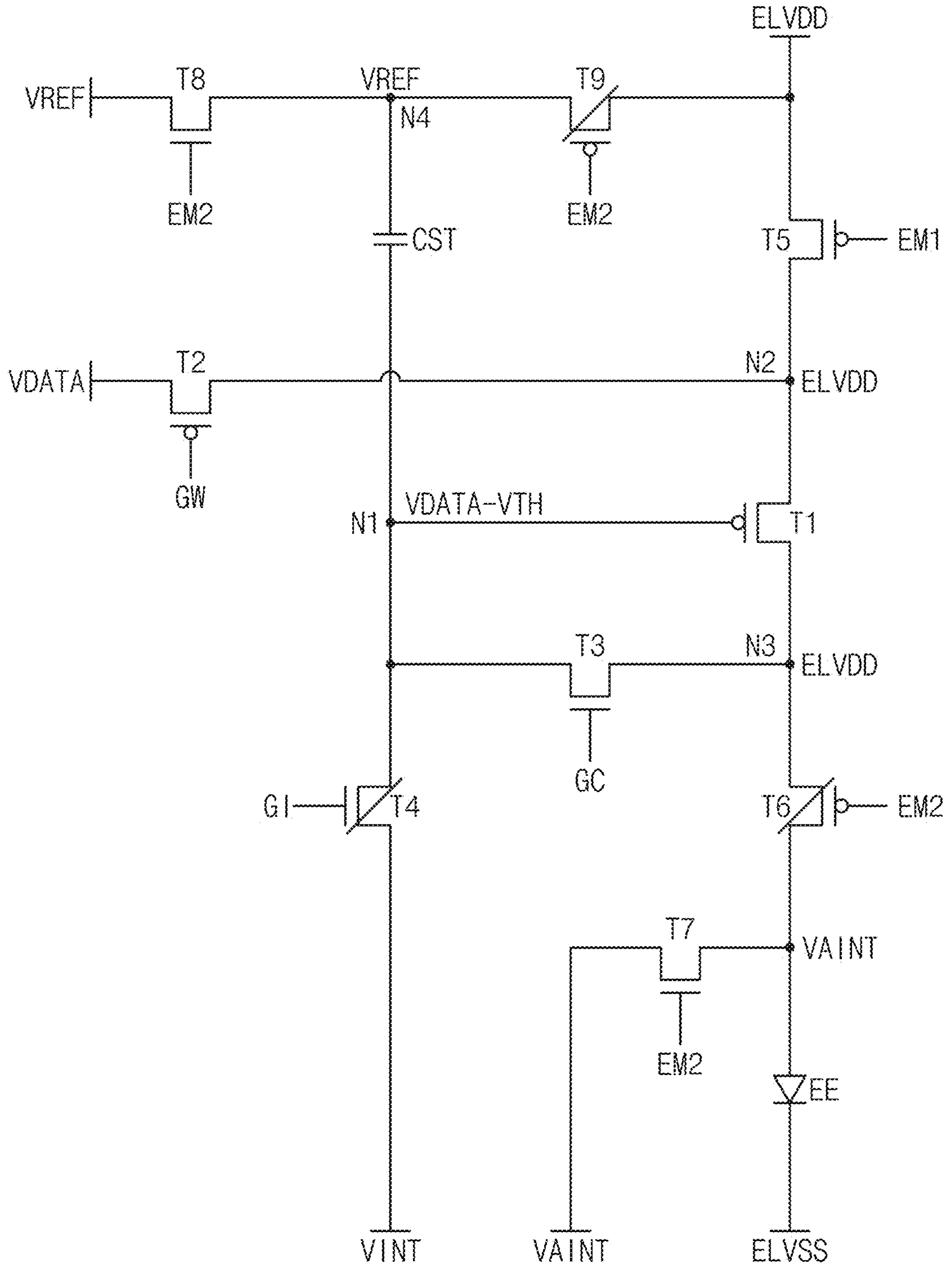
FIG. 37 is a circuit diagram illustrating an example of the operation of the pixel circuit of FIG. 29 in the fourth period.
Figure 38:
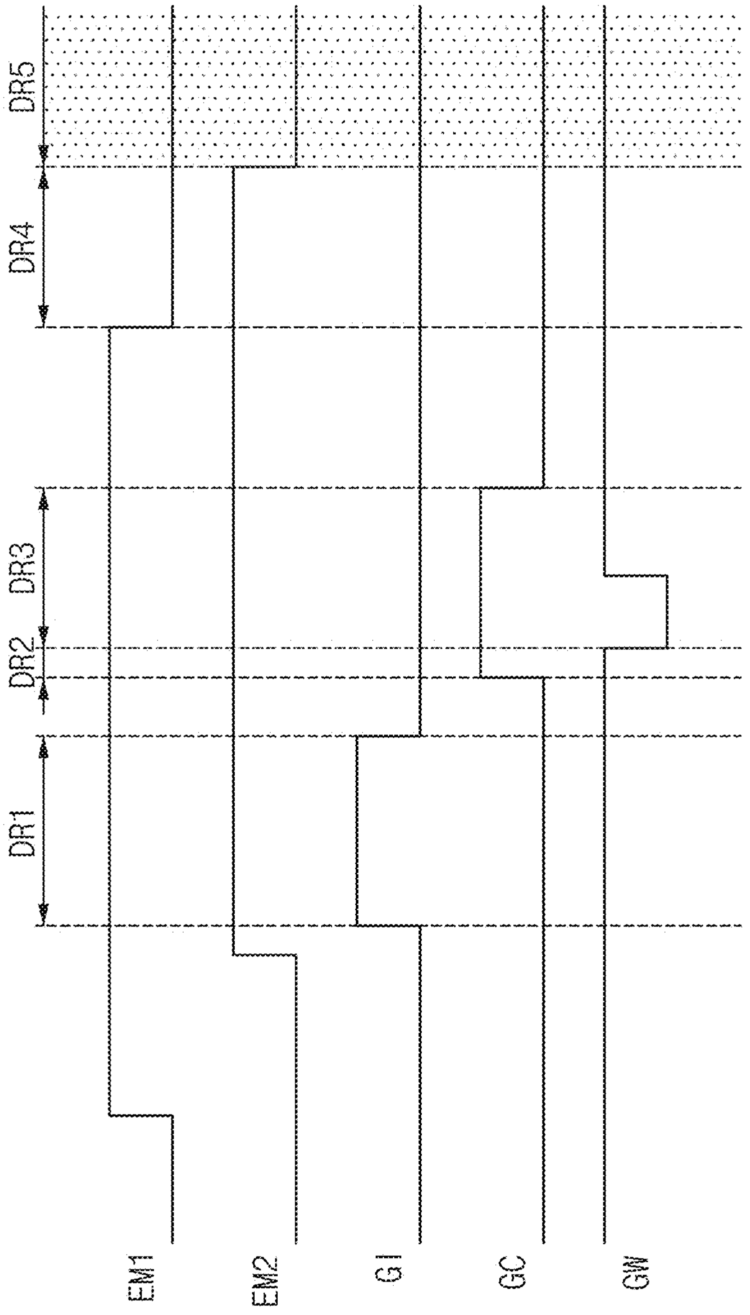
FIG. 38 is a timing diagram illustrating an example of an operation of the pixel circuit of FIG. 29 in a fifth period.
Figure 39:
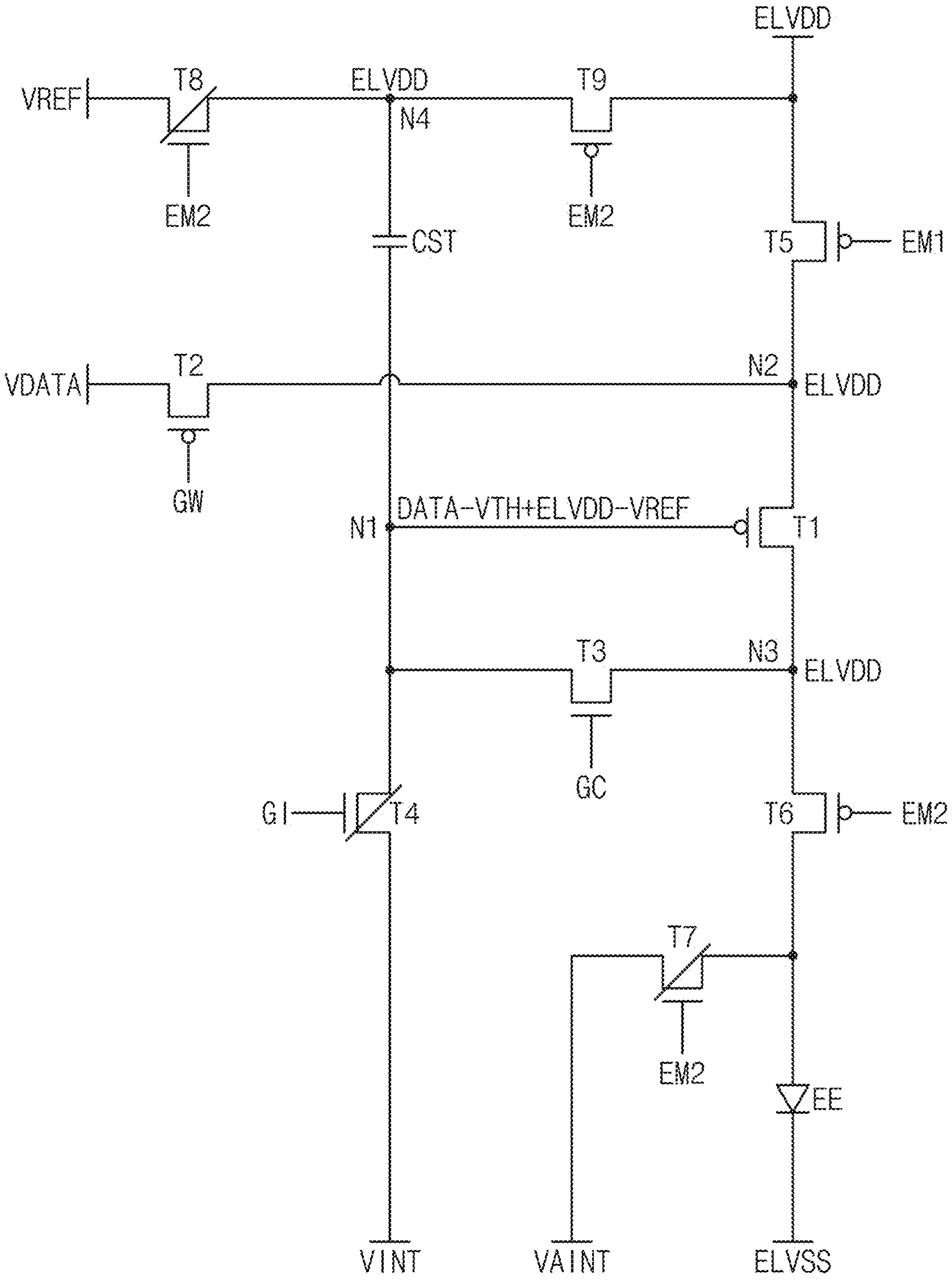
FIG. 39 is a circuit diagram illustrating an example of the operation of the pixel circuit of FIG. 29 in the fifth period.

FIG. 29 is a circuit diagram illustrating a pixel circuit of a display apparatus according to an embodiment of the present inventive concept. FIG. 30 is a timing diagram illustrating an example of an operation of the pixel circuit of FIG. 29 in a first period DR1. FIG. 31 is a circuit diagram illustrating an example of the operation of the pixel circuit of FIG. 29 in the first period DR1. FIG. 32 is a timing diagram illustrating an example of an operation of the pixel circuit of FIG. 29 in a second period DR2. FIG. 33 is a circuit diagram illustrating an example of the operation of the pixel circuit of FIG. 29 in the second period DR2. FIG. 34 is a timing diagram illustrating an example of an operation of the pixel circuit of FIG. 29 in a third period DR3. FIG. 35 is a circuit diagram illustrating an example of the operation of the pixel circuit of FIG. 29 in the third period DR3. FIG. 36 is a timing diagram illustrating an example of an operation of the pixel circuit of FIG. 29 in a fourth period DR4. FIG. 37 is a circuit diagram illustrating an example of the operation of the pixel circuit of FIG. 29 in the fourth period DR4. FIG. 38 is a timing diagram illustrating an example of an operation of the pixel circuit of FIG. 29 in a fifth period DR5. FIG. 39 is a circuit diagram illustrating an example of the operation of the pixel circuit of FIG. 29 in the fifth period DR5.

The pixel circuit of the display apparatus according to the present embodiment is substantially the same as the pixel circuit of the display apparatus of the previous embodiment explained referring to FIGS. 1 to 12 except for the fifth switching element, the sixth switching element, the seventh switching element, the eighth switching element and the ninth switching element. Thus, the same reference numerals will be used to refer to the same or like parts as those described in the previous embodiment of FIGS. 1 to 12 and any repetitive explanation concerning the above elements will be omitted.

Referring to FIGS. 1 and 29 to 39, the pixel circuit includes a light emitting element EE, a first switching element T1, a second switching element T2, a third switching element T3, a capacitor CST, a fifth switching element T5, a sixth switching element T6, an eighth switching element T8 and a ninth switching element T9.

The first switching element T1 includes a control electrode connected to a first node N1, a first electrode connected to a second node N2 and a second electrode connected to a third node N3. The first switching element T1 may apply a driving current to the light emitting element EE.

The second switching element T2 applies a data voltage VDATA to the second node N2 in response to a data writing gate signal GW.

The third switching element T3 connects the first node N1 and the third node N3 in response to a compensation gate signal GC.

The capacitor CST includes a first electrode connected to the first node N1 and a second electrode connected to a fourth node N4.

The fifth switching element T5 includes a first electrode receiving a first power voltage ELVDD and a second electrode connected to the second node N2. The sixth switching element T6 includes a first electrode connected to the third node N3 and a second electrode connected to an anode electrode of the light emitting element EE.

In an embodiment, a signal applied to a control electrode of the fifth switching element T5 is different from a signal applied to a control electrode of the sixth switching element T6.

In an embodiment, a control electrode of the fifth switching element T5 receives a first emission signal EM1 and a control electrode of the sixth switching element T6 receives a second emission signal EM2 having a waveform different from a waveform of the first emission signal EM1. In an embodiment, the emission driver 600 supplies the first and second emission signals EM1 and EM2.

The eighth switching element T8 includes a first electrode receiving a reference voltage VREF and a second electrode connected to the fourth node N4. The ninth switching element T9 includes a first electrode receiving a first power voltage ELVDD and a second electrode connected to the fourth node N4. In an embodiment, one of the eighth switching element T8 and the ninth switching element T9 is an N-type transistor and the other is a P-type transistor. For example, the eighth switching element T8 and the ninth switching element T9 may be complementary transistors. The eighth switching element T8 and the ninth switching element T9 may together form a Complementary Metal Oxide Semiconductor (CMOS) circuit.

In an embodiment, a control electrode of the eighth switching element T8 and a control electrode of the ninth switching element T9 receive the second emission signal EM2.

In the present embodiment, the eighth switching element T8 may be an N-type transistor and the ninth switching element T9 may be a P-type transistor. In an embodiment, a same signal (the second emission signal EM2) is applied to the control electrode of the eighth switching element T8 and the control electrode of the ninth switching element T9. Thus, when the eight switching element T8 is turned on, the ninth switching element T9 may be turned off. When the eight switching element T8 is turned off, the ninth switching element T9 may be turned on.

In the present embodiment, the driving current of the light emitting element EE may be determined based on a difference between the reference voltage VREF and the data voltage VDATA. The reference voltage VREF may be lower than the first power voltage ELVDD.

The pixel circuit may further include a fourth switching element T4 and a seventh switching element T7.

The fourth switching element T4 may include a control electrode receiving an initialization gate signal GI, a first electrode connected to the first node N1 and a second electrode receiving a first initialization voltage VINT.

In the present embodiment, the seventh switching element T7 may include a control electrode receiving the second emission signal EM2, a first electrode receiving a second initialization voltage VAINT and a second electrode connected to the anode electrode.

The light emitting element EE may include the anode electrode and a cathode electrode receiving a second power voltage ELVSS.

For example, the first switching element T1 may be the P-type transistor. The second switching element T2 may be the P-type transistor. The third switching element T3 may be the N-type transistor. The fourth switching element T4 may be the N-type transistor. The fifth switching element T5 may be the P-type transistor. The sixth switching element T6 may be the P-type transistor. The seventh switching element T7 may be the N-type transistor.

The first period DR1 may be an initialization period of the first switching element T1.

In the first period DR1, the first emission signal EM1 may have an inactive level, the second emission signal EM2 may have an inactive level, the initialization gate signal GI may have an active level, the compensation gate signal GC may have an inactive level and the data writing gate signal GW may have an inactive level.

Herein, when the transistor receiving the first emission signal EM1, the second emission signal EM2, the initialization gate signal GI, the compensation gate signal GC and the data writing gate signal GW is a P-type transistor, the active level may be a low level and the inactive level may be a high level. In contrast, when the transistor receiving the first emission signal EM1, the second emission signal EM2, the initialization gate signal GI, the compensation gate signal GC and the data writing gate signal GW is an N-type transistor, the active level may be a high level and the inactive level may be a low level.

Herein, the active level and the inactive level of the first emission signal EM1 are defined with respect to the fifth switching element T5, the active level and the inactive level of the second emission signal EM2 are defined with respect to the sixth switching element T6, the active level and the inactive level of the initialization gate signal GI are defined with respect to the fourth switching element T4, the active level and the inactive level of the compensation gate signal GC are defined with respect to the third switching element T3 and the active level and the inactive level of the data writing gate signal GW are defined with respect to the second switching element T2.

In the first period DR1, the first initialization voltage VINT may be applied to the first node N1 by the fourth switching element T4 turned on in response to the active level of the initialization gate signal GI.

In the first period DR1, the reference voltage VREF may be applied to the fourth node N4 by the eighth switching element T8 turned on in response to the inactive level of the second emission signal EM2.

In the first period DR1, switching elements T2, T3, T5, T6 and T9 may be turned off (e.g., see switching elements with a diagonal line in FIG. 31).

In the present embodiment, an initialization of the anode electrode of the light emitting element EE may be performed in the first period DR1 and the fourth period DR4. In the first period DR1 and the fourth period DR4, the second initialization voltage VAINT may be applied to the anode electrode by the seventh switching element T7 turned on in response to the inactive level of the second emission signal EM2.

The second period DR2 may be a turn-on period of the compensation gate signal GC.

In the second period DR2 subsequent to the first period DR1, the first emission signal EM1 may have the inactive level, the second emission signal EM2 may have the inactive level, the initialization gate signal GI may have an inactive level, the compensation gate signal GC may have an active level and the data writing gate signal GW may have the inactive level.

In the second period DR2, the reference voltage VREF may be applied to the fourth node N4 by the eighth switching element T8 turned on in response to the inactive level of the second emission signal EM2.

In the second period DR2, the first node N1 and the third node N3 may be connected to each other by the third switching element T3 turned on in response to the active level of the compensation gate signal GC.

In the second period DR2, the voltage of the first node N1 may be VINT, the voltage of the third node N3 may be VINT by the turned-on third switching element T3 and the voltage of the second node N2 may be VINT+VTH.

In the second period DR2, switching elements T2, T4, T5, T6 and T9 may be turned off (e.g., see switching elements with a diagonal line in FIG. 33).

The third period DR3 may be a data writing and compensation period.

In the third period DR3 subsequent to the second period DR2, the first emission signal EM1 may have the inactive level, the second emission signal EM2 may have the inactive level, the initialization gate signal GI may have the inactive level, the compensation gate signal GC may have the active level and the data writing gate signal GW may have an active level.

In the third period DR3, the reference voltage VREF may be still applied to the fourth node N4 by the eighth switching element T8 turned on in response to the inactive level of the second emission signal EM2.

In the third period DR3, the data voltage VDATA including a threshold voltage VTH of the first switching element T1 may be written to the first node N1 by the second switching element T2 turned on in response to the active level of the data writing gate signal GW, the first switching element T1 turned on in response to the voltage of the first node N1 and the third switching element T3 turned on in response to the active level of the compensation gate signal GC. In the third period DR3, the voltage of the first node N1 may be VDATA−VTH.

In the third period DR3, a voltage of the second node N2 may be VDATA and a gate-source voltage Vgs of the first switching element T1 may be VTH.

In the third period DR3, switching elements T4, T5, T6 and T9 may be turned off (e.g., see switching elements with a diagonal line in FIG. 35).

The fourth period DR4 may be a bias period.

In the fourth period DR4 subsequent to the third period DR3, the first emission signal EM1 may have an active level, the second emission signal EM2 may have the inactive level, the initialization gate signal GI may have the inactive level, the compensation gate signal GC may have the inactive level and the data writing gate signal GW may have the inactive level.

In the fourth period DR4, the reference voltage VREF may be still applied to the fourth node N4 by the eighth switching element T8 turned on in response to the inactive level of the second emission signal EM2.

In the fourth period DR4, the ninth switching element T9 may be turned off in response to the inactive level of the second emission signal EM2. In addition, in the fourth period DR4, the fifth switching element T5 may be turned on in response to the active level of the first emission signal EM1 so that the first power voltage ELVDD may be applied to the second node N2.

In the fourth period DR4, the voltage at the first node N1 may have a level of VDATA−VTH, consistent with its level in the third period DR3 and the gate source voltage Vgs of the first switching element T1 may be ELVDD-VDATA+VTH. In the fourth period DR4, the first switching element T1 may be turned on regardless of the level of the data voltage VDATA and this operation may be referred to as a bias operation of the first switching element T1. In the fourth period DR4, the second emission signal EM2 has the inactive level so that the sixth switching element T6 may be turned off. In the fourth period DR4, even though the first switching element T1 is turned on, the sixth switching element T6 is turned off so that the light emitting element EE does not emit light.

The bias operation is performed in which the first switching element T1 is turned on prior to a light emitting period (the fifth period DR5) so that the hysteresis characteristics of the first switching element T1 may be enhanced.

In the fourth period DR4, switching elements T4, T6 and T9 may be turned off (e.g., see switching elements with a diagonal line in FIG. 37).

The fifth period DR5 may be a light emitting period.

In the fifth period DR5 subsequent to the fourth period DR4, the first emission signal EM1 may have the active level, the second emission signal EM2 may have an active level, the initialization gate signal GI may have the inactive level, the compensation gate signal GC may have the inactive level and the data writing gate signal GW may have the inactive level.

In the fifth period DR5, the first power voltage ELVDD may be applied to the second node N2 by the fifth switching element T5 turned on in response to the active level of the first emission signal EM1.

In the fifth period DR5, the third node N3 may be connected to the anode electrode of the light emitting element EE by the sixth switching element T6 turned on in response to the active level of the second emission signal EM2.

In the fifth period DR5, the light emitting element EE may emit light through a path including the turned-on fifth switching element T5, the turned-on first switching element T1 and the turned-on sixth switching element T6.

In the fifth period DR5, the voltage of the first node N1 may be VDATA−VTH+(ELVDD−VREF).

In the fifth period DR5, the voltage of the second node N2 may be ELVDD and the gate-source voltage Vgs of the first switching element T1 may be VREF−VDATA+VTH.

In the fifth period DR5, a current of the light emitting element EE may calculated using above Equation 2. As shown in Equation 2, the current of the light emitting element EE may be determined based on a difference between the reference voltage VREF and the data voltage VDATA. Thus, a luminance of the light emitting element EE may be maintained even if levels of the reference voltage VREF and the data voltage VDATA are lowered together while maintaining the difference between the reference voltage VREF and the data voltage VDATA.

In the fifth period DR5, switching elements T4, T7 and T8 may be turned off (e.g., see switching elements with a diagonal line in FIG. 39).

In the pixel circuit of the present embodiment, the levels of the reference voltage VREF and the data voltage VDATA may be lowered compared to those of the conventional pixel circuit so that the power consumption of the display apparatus may be reduced.

According to the present embodiment, the driving current IEE of the light emitting element EE may be determined based on the difference between the reference voltage VREF, which is lower than the first power voltage ELVDD, and the data voltage VDATA in the pixel circuit. Thus, the power consumption of the pixel circuit may be reduced.

In addition, the bias operation of the first switching element T1 may be performed in the bias period DR4 when different signals are applied to the control electrode of the fifth switching element T5 and the control electrode of the sixth switching element T6. In this state, the first switching element T1 and the fifth switching element T5 are turned on while the sixth switching element T6 is turned off. Thus, the hysteresis characteristics of the first switching element T1 may be enhanced so that the display quality of the display panel 100 may be enhanced.

Figure 40:
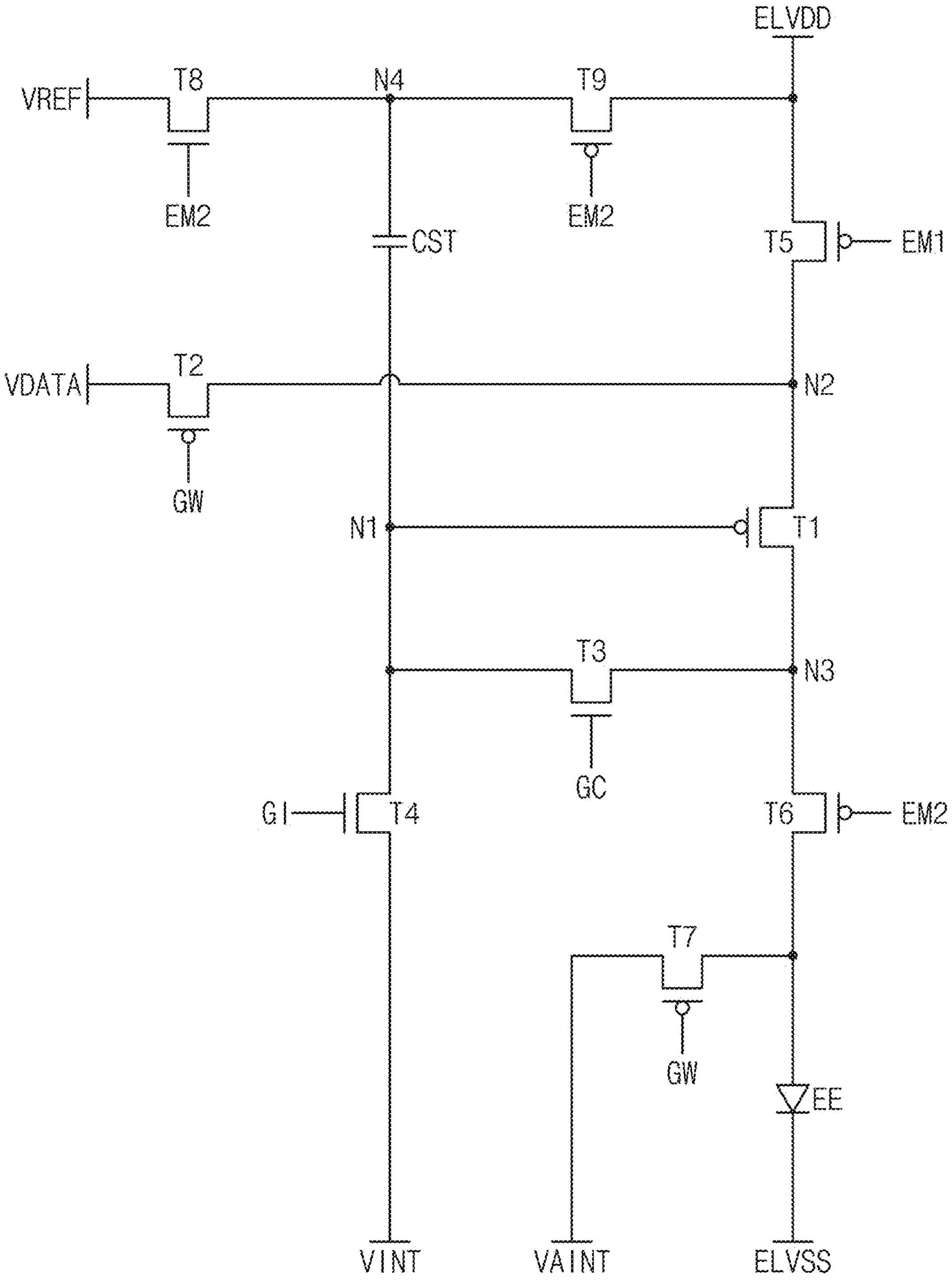
FIG. 40 is a circuit diagram illustrating a pixel circuit of a display apparatus according to an embodiment of the present inventive concept.

FIG. 40 is a circuit diagram illustrating a pixel circuit of a display apparatus according to an embodiment of the present inventive concept.

The pixel circuit of the display apparatus according to the present embodiment is substantially the same as the pixel circuit of the display apparatus of the previous embodiment explained referring to FIGS. 29 to 39 except for the seventh switching element. Thus, the same reference numerals will be used to refer to the same or like parts as those described in the previous embodiment of FIGS. 29 to 39 and any repetitive explanation concerning the above elements will be omitted.

Referring to FIGS. 1 and 40, the pixel circuit includes a light emitting element EE, a first switching element T1, a second switching element T2, a third switching element T3, a capacitor CST, a fifth switching element T5, a sixth switching element T6, an eighth switching element T8 and a ninth switching element T9.

The fifth switching element T5 includes a first electrode receiving a first power voltage ELVDD and a second electrode connected to the second node N2. The sixth switching element T6 includes a first electrode connected to the third node N3 and a second electrode connected to an anode electrode of the light emitting element EE.

In an embodiment, a signal applied to a control electrode of the fifth switching element T5 is different from a signal applied to a control electrode of the sixth switching element T6.

In an embodiment, a control electrode of the fifth switching element T5 receives a first emission signal EM1 and a control electrode of the sixth switching element T6 receives a second emission signal EM2 having a waveform different from a waveform of the first emission signal EM1.

The eighth switching element T8 includes a first electrode receiving a reference voltage VREF and a second electrode connected to the fourth node N4. The ninth switching element T9 includes a first electrode receiving a first power voltage ELVDD and a second electrode connected to the fourth node N4. In an embodiment, one of the eighth switching element T8 and the ninth switching element T9 is an N-type transistor and the other is a P-type transistor. For example, the eighth switching element T8 and the ninth switching element T9 may be complementary transistors. The eighth switching element T8 and the ninth switching element T9 may together form a Complementary Metal Oxide Semiconductor (CMOS) circuit.

In an embodiment, a control electrode of the eighth switching element T8 and a control electrode of the ninth switching element T9 receives the second emission signal EM2.

The pixel circuit may further include a fourth switching element T4 and a seventh switching element T7.

The fourth switching element T4 may include a control electrode receiving an initialization gate signal GI, a first electrode connected to the first node N1 and a second electrode receiving a first initialization voltage VINT.

In the present embodiment, the seventh switching element T7 may include a control electrode receiving the data writing gate signal GW, a first electrode receiving a second initialization voltage VAINT and a second electrode connected to the anode electrode. For example, the seventh switching element T7 may be the P-type transistor.

According to the present embodiment, the driving current IEE of the light emitting element EE may be determined based on the difference between the reference voltage VREF, which is lower than the first power voltage ELVDD, and the data voltage VDATA in the pixel circuit. Thus, the power consumption of the pixel circuit may be reduced.

In addition, the bias operation of the first switching element T1 may be performed in the bias period DR4 when different signals are applied to the control electrode of the fifth switching element T5 and the control electrode of the sixth switching element T6. In this state, the first switching element T1 and the fifth switching element T5 are turned on while the sixth switching element T6 is turned off. Thus, the hysteresis characteristics of the first switching element T1 may be enhanced so that the display quality of the display panel 100 may be enhanced.

Figure 41:
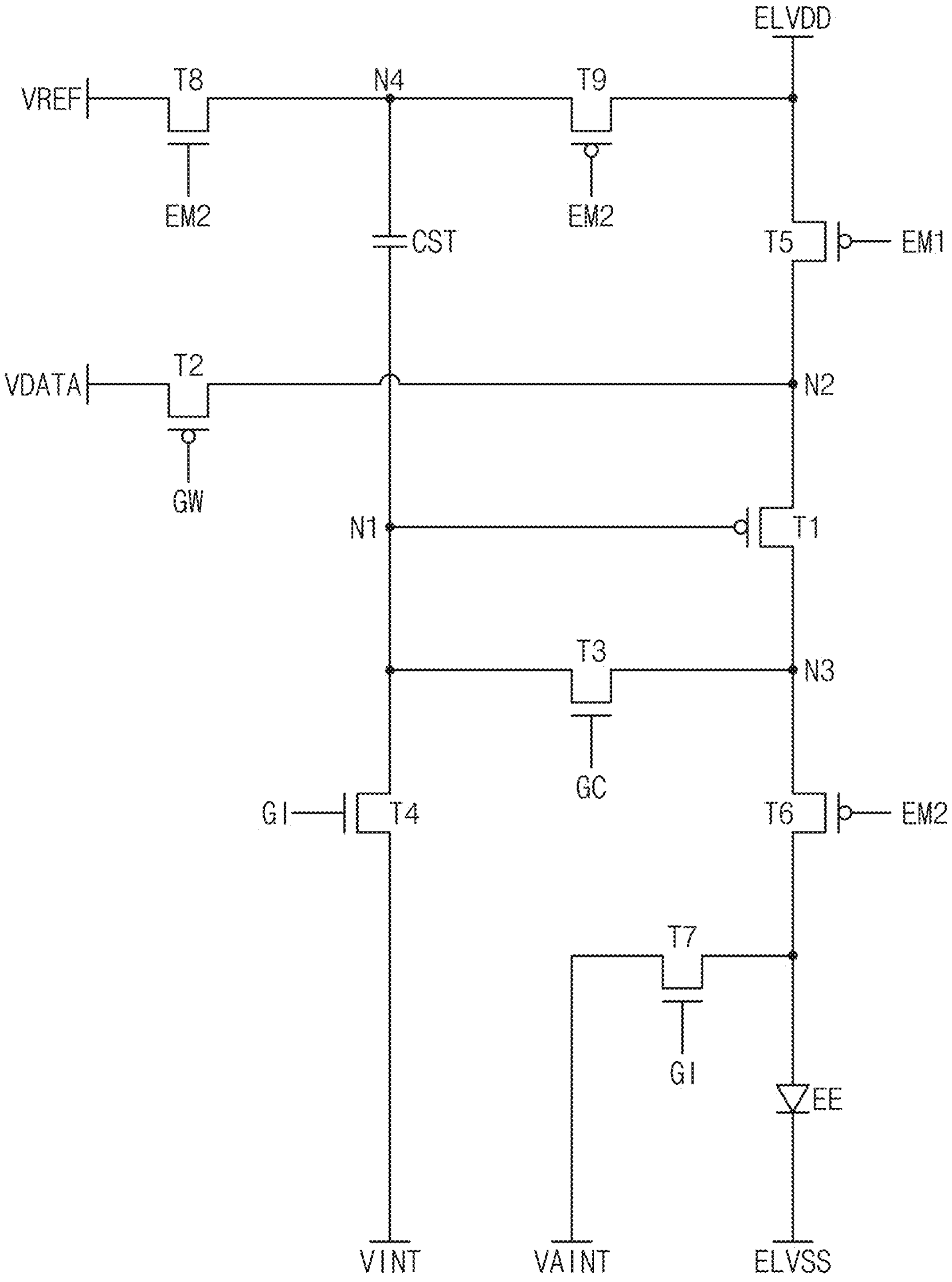
FIG. 41 is a circuit diagram illustrating a pixel circuit of a display apparatus according to an embodiment of the present inventive concept.

FIG. 41 is a circuit diagram illustrating a pixel circuit of a display apparatus according to an embodiment of the present inventive concept.

The pixel circuit of the display apparatus according to the present embodiment is substantially the same as the pixel circuit of the display apparatus of the previous embodiment explained referring to FIGS. 29 to 39 except for the seventh switching element. Thus, the same reference numerals will be used to refer to the same or like parts as those described in the previous embodiment of FIGS. 29 to 39 and any repetitive explanation concerning the above elements will be omitted.

Referring to FIGS. 1 and 41, the pixel circuit includes a light emitting element EE, a first switching element T1, a second switching element T2, a third switching element T3, a capacitor CST, a fifth switching element T5, a sixth switching element T6, an eighth switching element T8 and a ninth switching element T9.

The fifth switching element T5 includes a first electrode receiving a first power voltage ELVDD and a second electrode connected to the second node N2. The sixth switching element T6 includes a first electrode connected to the third node N3 and a second electrode connected to an anode electrode of the light emitting element EE.

In an embodiment, a signal applied to a control electrode of the fifth switching element T5 is different from a signal applied to a control electrode of the sixth switching element T6.

In an embodiment, a control electrode of the fifth switching element T5 receives a first emission signal EM1 and a control electrode of the sixth switching element T6 receives a second emission signal EM2 having a waveform different from a waveform of the first emission signal EM1.

The eighth switching element T8 includes a first electrode receiving a reference voltage VREF and a second electrode connected to the fourth node N4. The ninth switching element T9 includes a first electrode receiving a first power voltage ELVDD and a second electrode connected to the fourth node N4. In an embodiment, one of the eighth switching element T8 and the ninth switching element T9 is an N-type transistor and the other is a P-type transistor. For example, the eighth switching element T8 and the ninth switching element T9 may be complementary transistors. The eighth switching element T8 and the ninth switching element T9 may together form a Complementary Metal Oxide Semiconductor (CMOS) circuit.

In an embodiment, a control electrode of the eighth switching element T8 and a control electrode of the ninth switching element T9 receives the second emission signal EM2.

The pixel circuit may further include a fourth switching element T4 and a seventh switching element T7.

The fourth switching element T4 may include a control electrode receiving an initialization gate signal GI, a first electrode connected to the first node N1 and a second electrode receiving a first initialization voltage VINT.

In the present embodiment, the seventh switching element T7 may include a control electrode receiving the initialization gate signal GI, a first electrode receiving a second initialization voltage VAINT and a second electrode connected to the anode electrode. For example, the seventh switching element T7 may be the N-type transistor.

According to the present embodiment, the driving current IEE of the light emitting element EE may be determined based on the difference between the reference voltage VREF, which is lower than the first power voltage ELVDD, and the data voltage VDATA in the pixel circuit. Thus, the power consumption of the pixel circuit may be reduced.

In addition, the bias operation of the first switching element T1 may be performed in the bias period DR4 when different signals are applied to the control electrode of the fifth switching element T5 and the control electrode of the sixth switching element T6. In this state, the first switching element T1 and the fifth switching element T5 are turned on while the sixth switching element T6 is turned off. Thus, the hysteresis characteristics of the first switching element T1 may be enhanced so that the display quality of the display panel 100 may be enhanced.

Figure 42:
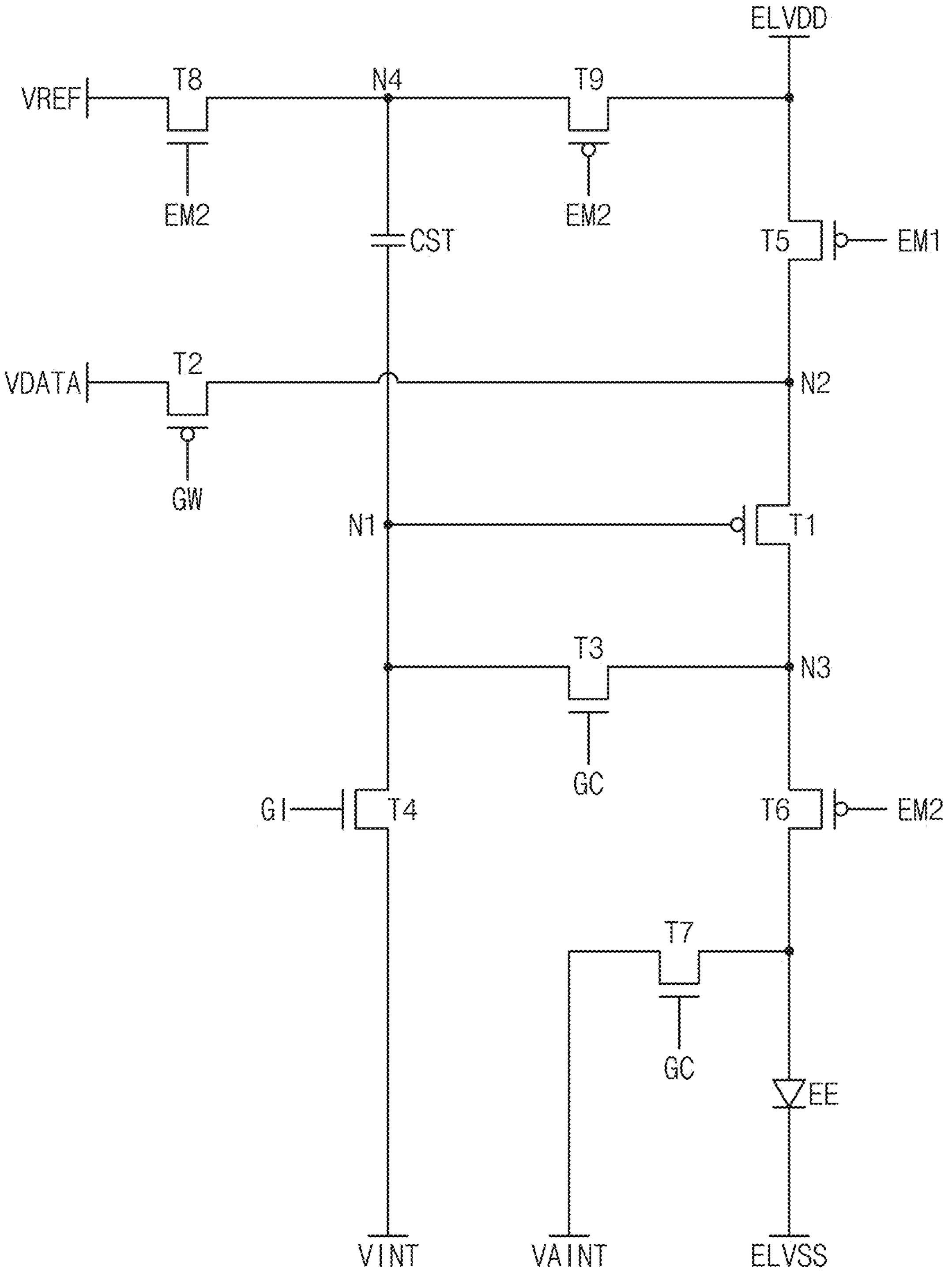
FIG. 42 is a circuit diagram illustrating a pixel circuit of a display apparatus according to an embodiment of the present inventive concept.

FIG. 42 is a circuit diagram illustrating a pixel circuit of a display apparatus according to an embodiment of the present inventive concept.

The pixel circuit of the display apparatus according to the present embodiment is substantially the same as the pixel circuit of the display apparatus of the previous embodiment explained referring to FIGS. 29 to 39 except for the seventh switching element. Thus, the same reference numerals will be used to refer to the same or like parts as those described in the previous embodiment of FIGS. 29 to 39 and any repetitive explanation concerning the above elements will be omitted.

Referring to FIGS. 1 and 42, the pixel circuit includes a light emitting element EE, a first switching element T1, a second switching element T2, a third switching element T3, a capacitor CST, a fifth switching element T5, a sixth switching element T6, an eighth switching element T8 and a ninth switching element T9.

The fifth switching element T5 includes a first electrode receiving a first power voltage ELVDD and a second electrode connected to the second node N2. The sixth switching element T6 includes a first electrode connected to the third node N3 and a second electrode connected to an anode electrode of the light emitting element EE.

In an embodiment, a signal applied to a control electrode of the fifth switching element T5 is different from a signal applied to a control electrode of the sixth switching element T6.

In an embodiment, a control electrode of the fifth switching element T5 receives a first emission signal EM1 and a control electrode of the sixth switching element T6 receives a second emission signal EM2 having a waveform different from a waveform of the first emission signal EM1.

The eighth switching element T8 includes a first electrode receiving a reference voltage VREF and a second electrode connected to the fourth node N4. The ninth switching element T9 includes a first electrode receiving a first power voltage ELVDD and a second electrode connected to the fourth node N4. In an embodiment, one of the eighth switching element T8 and the ninth switching element T9 is an N-type transistor and the other is a P-type transistor. For example, the eighth switching element T8 and the ninth switching element T9 may be complementary transistors.

The eighth switching element T8 and the ninth switching element T9 may together form a Complementary Metal Oxide Semiconductor (CMOS) circuit.

In an embodiment, a control electrode of the eighth switching element T8 and a control electrode of the ninth switching element T9 receive the second emission signal EM2.

The pixel circuit may further include a fourth switching element T4 and a seventh switching element T7.

The fourth switching element T4 may include a control electrode receiving an initialization gate signal GI, a first electrode connected to the first node N1 and a second electrode receiving a first initialization voltage VINT.

In the present embodiment, the seventh switching element T7 may include a control electrode receiving the compensation gate signal GC, a first electrode receiving a second initialization voltage VAINT and a second electrode connected to the anode electrode. For example, the seventh switching element T7 may be the N-type transistor.

According to the present embodiment, the driving current IEE of the light emitting element EE may be determined based on the difference between the reference voltage VREF, which is lower than the first power voltage ELVDD, and the data voltage VDATA in the pixel circuit. Thus, the power consumption of the pixel circuit may be reduced.

In addition, the bias operation of the first switching element T1 may be performed in the bias period DR4 when different signals are applied to the control electrode of the fifth switching element T5 and the control electrode of the sixth switching element T6. In this state, the first switching element T1 and the fifth switching element T5 are turned on while the sixth switching element T6 is turned off. Thus, the hysteresis characteristics of the first switching element T1 may be enhanced so that the display quality of the display panel 100 may be enhanced.

Figure 43:
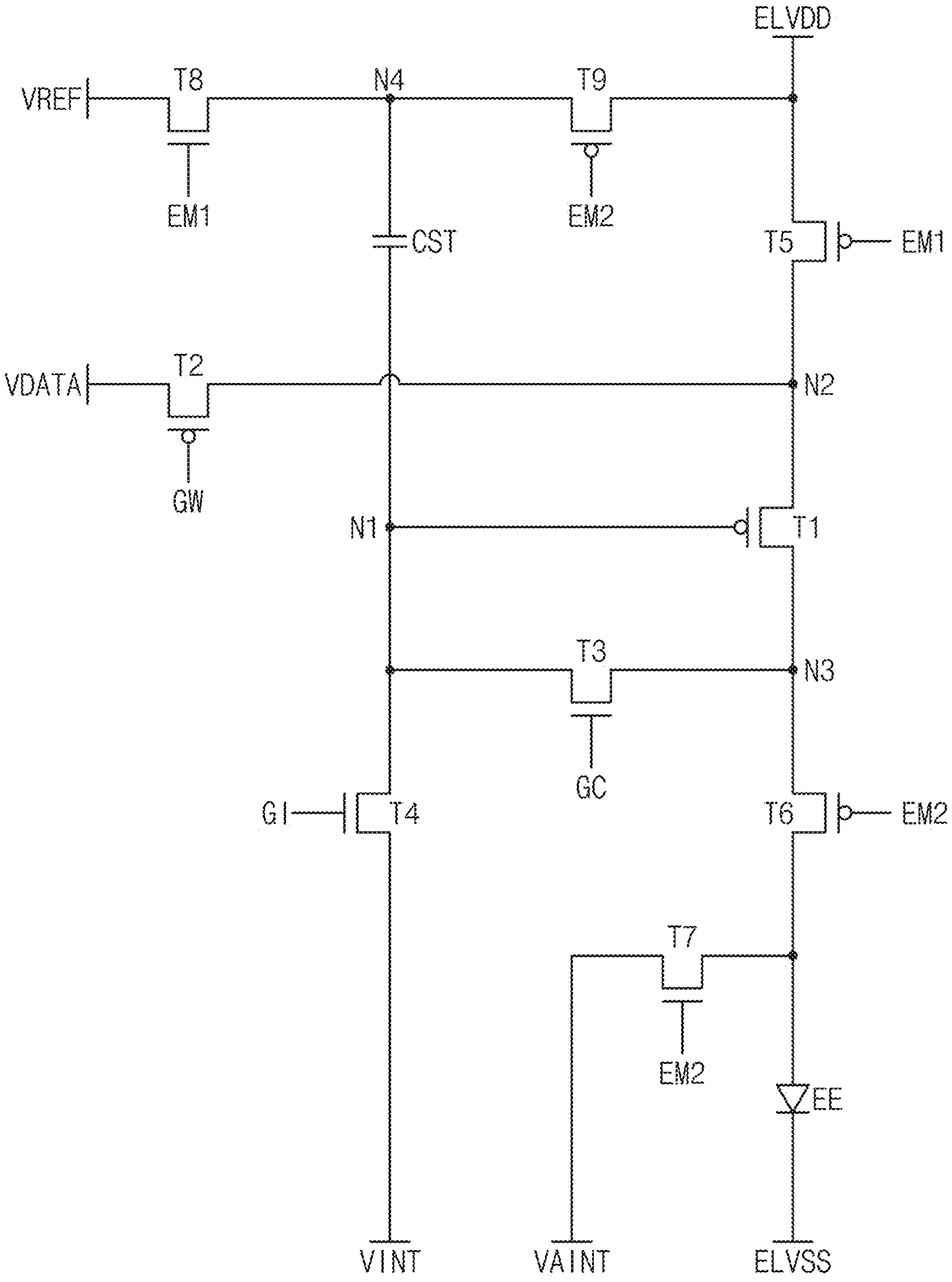
FIG. 43 is a circuit diagram illustrating a pixel circuit of a display apparatus according to an embodiment of the present inventive concept.
Figure 44:
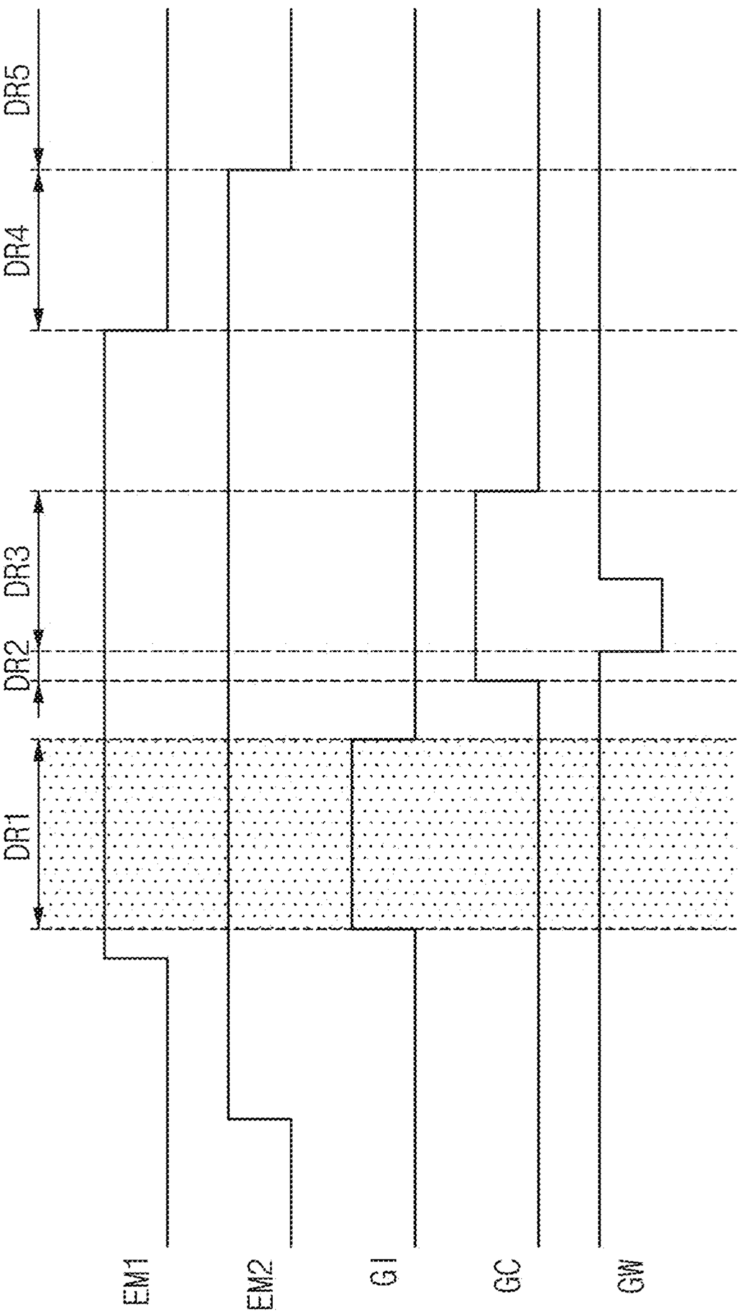
FIG. 44 is a timing diagram illustrating an example of an operation of the pixel circuit of FIG. 43 in a first period.
Figure 45:
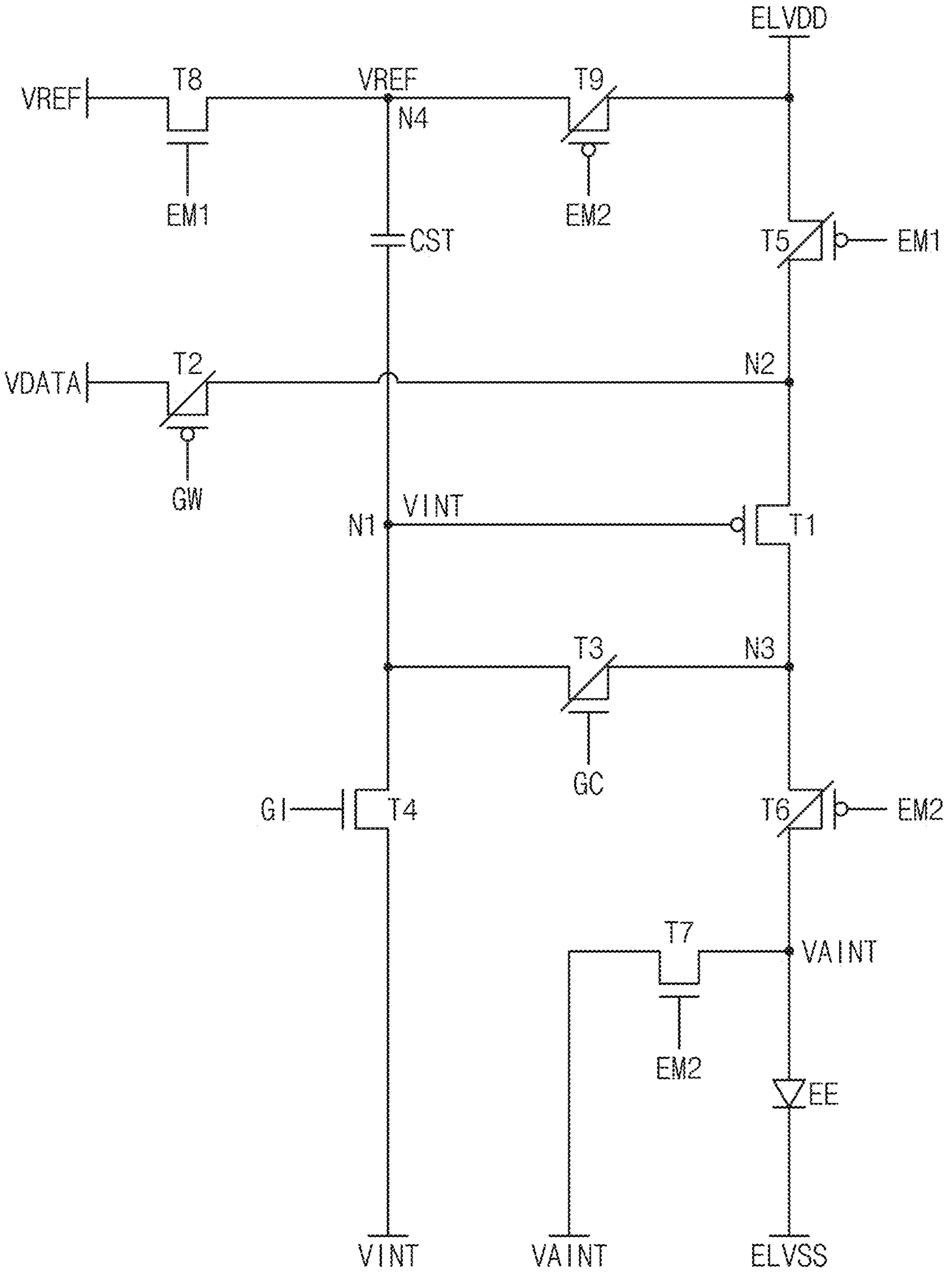
FIG. 45 is a circuit diagram illustrating an example of the operation of the pixel circuit of FIG. 43 in the first period.
Figure 46:
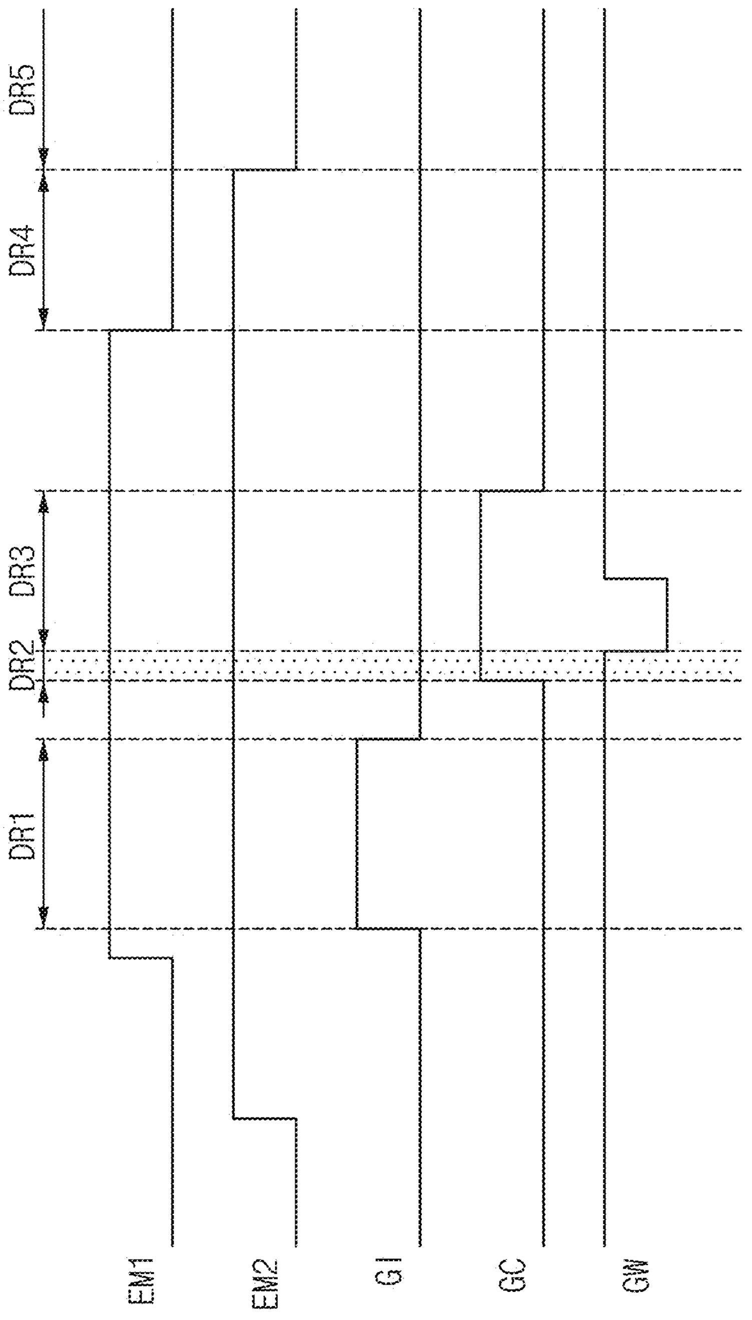
FIG. 46 is a timing diagram illustrating an example of an operation of the pixel circuit of FIG. 43 in a second period.
Figure 47:
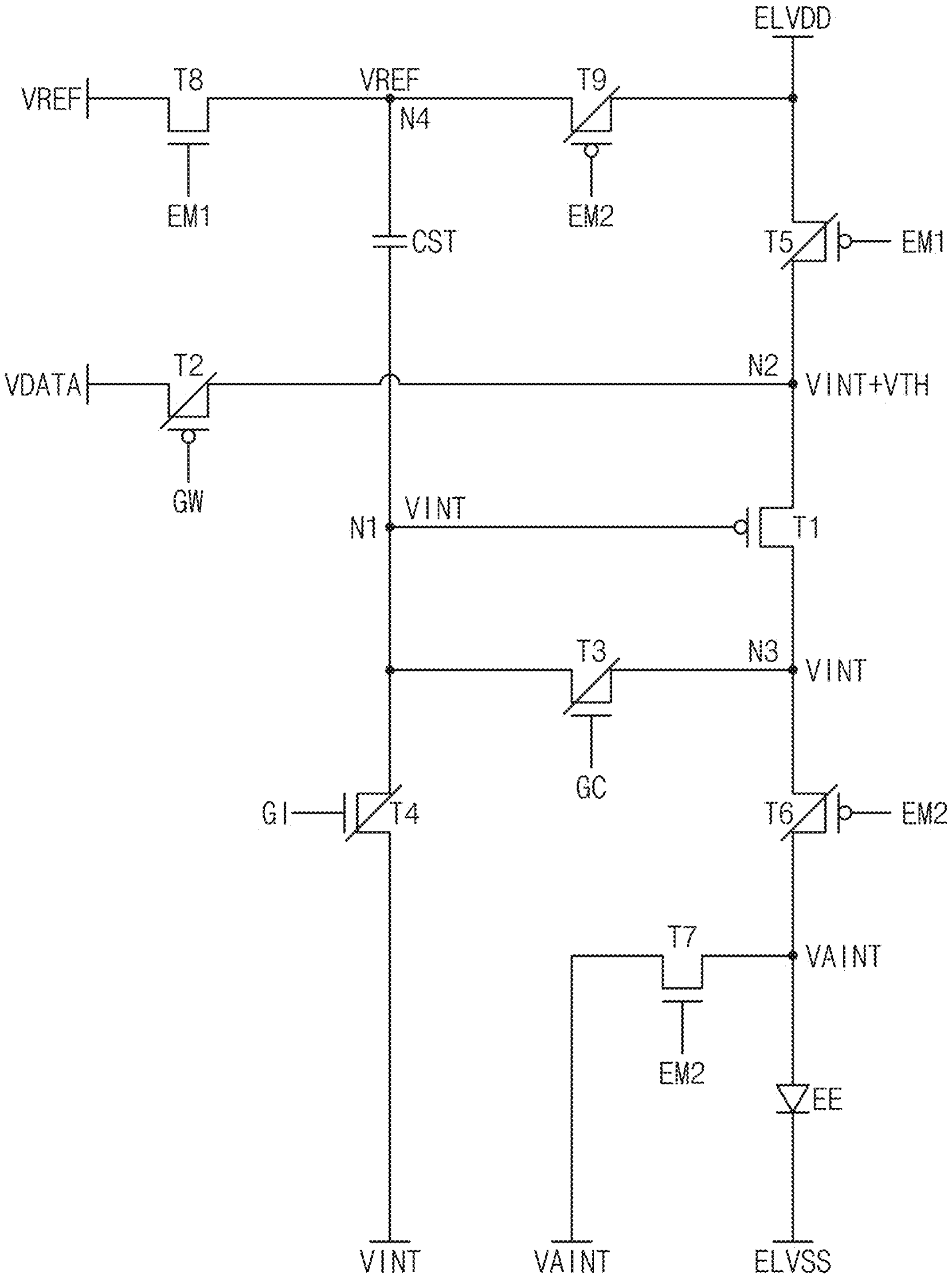
FIG. 47 is a circuit diagram illustrating an example of the operation of the pixel circuit of FIG. 43 in the second period.
Figure 48:
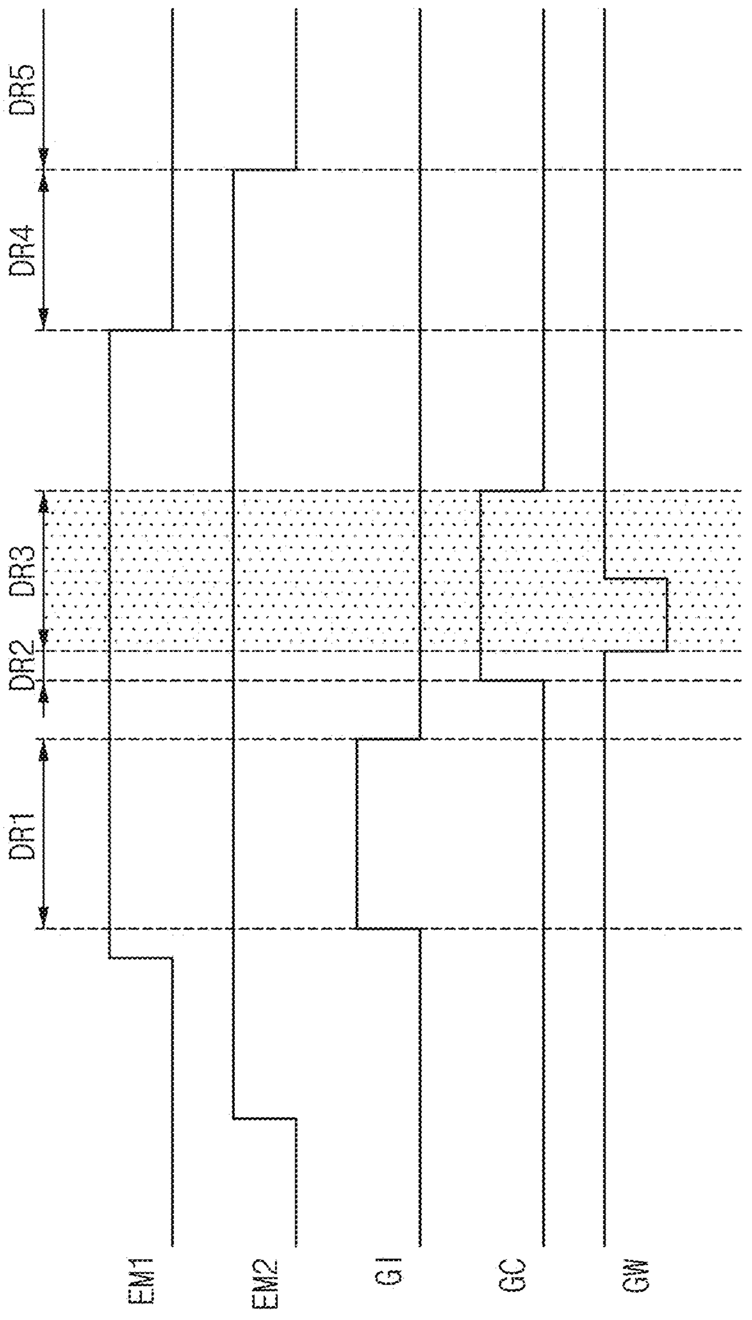
FIG. 48 is a timing diagram illustrating an example of an operation of the pixel circuit of FIG. 43 in a third period.
Figure 49:
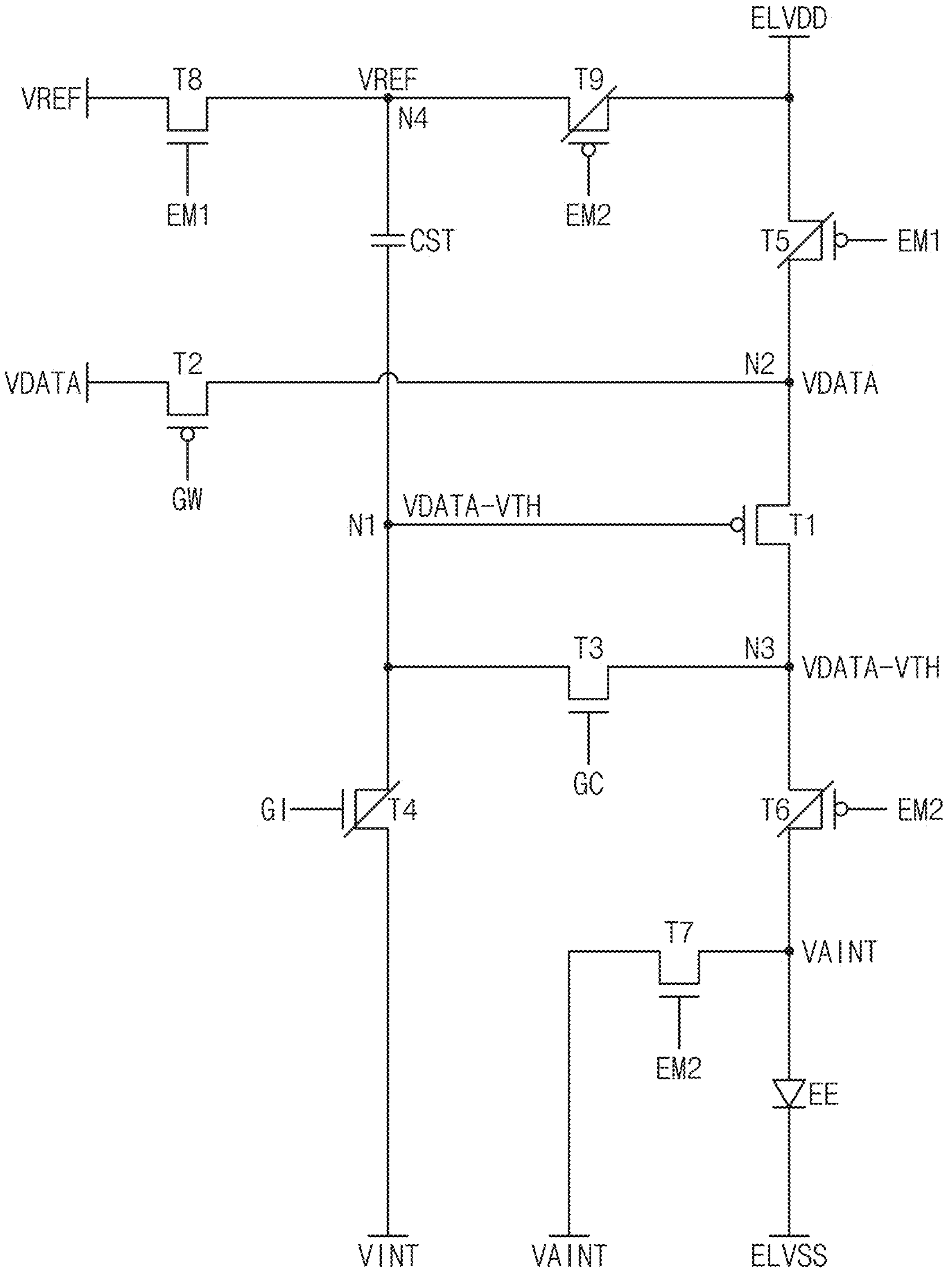
FIG. 49 is a circuit diagram illustrating an example of the operation of the pixel circuit of FIG. 43 in the third period.
Figure 50:
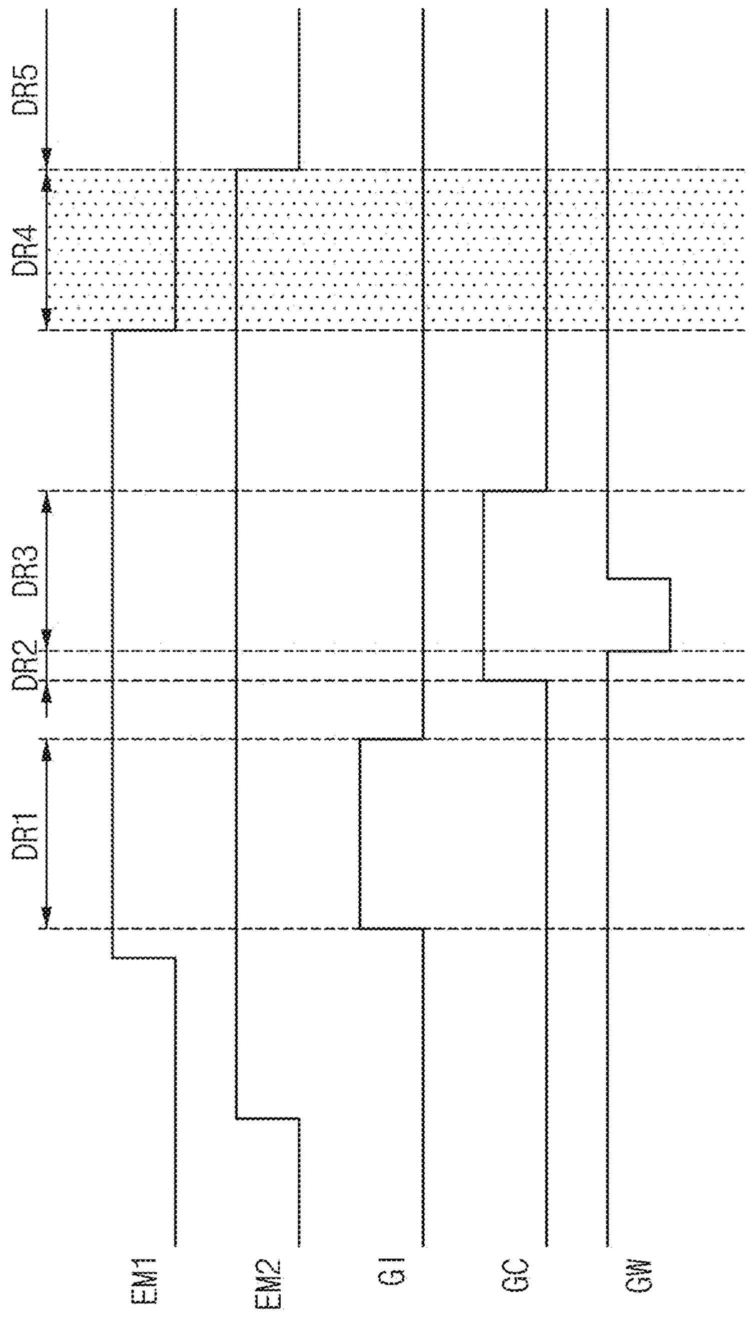
FIG. 50 is a timing diagram illustrating an example of an operation of the pixel circuit of FIG. 43 in a fourth period.
Figure 51:
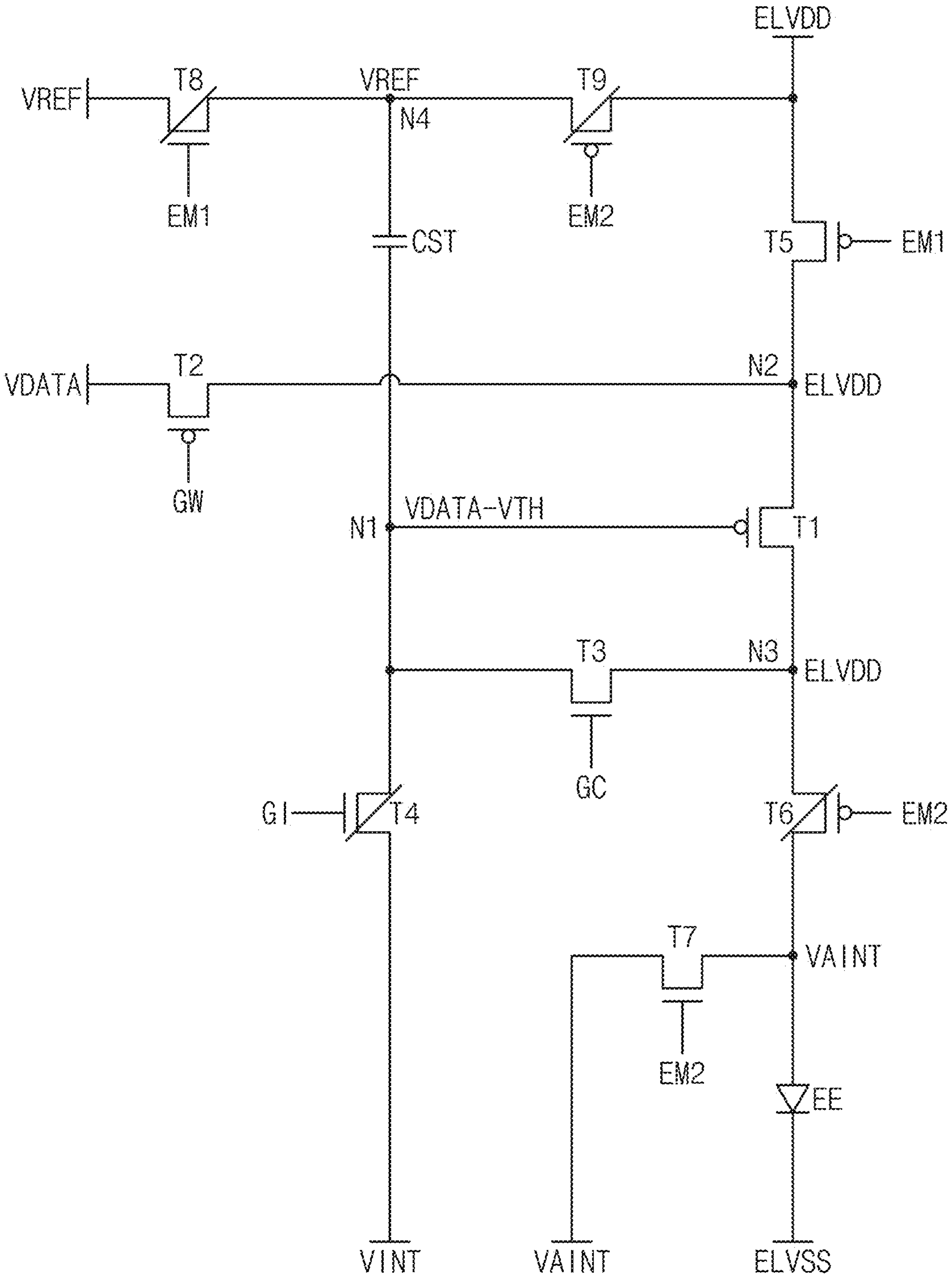
FIG. 51 is a circuit diagram illustrating an example of the operation of the pixel circuit of FIG. 43 in the fourth period.
Figure 52:
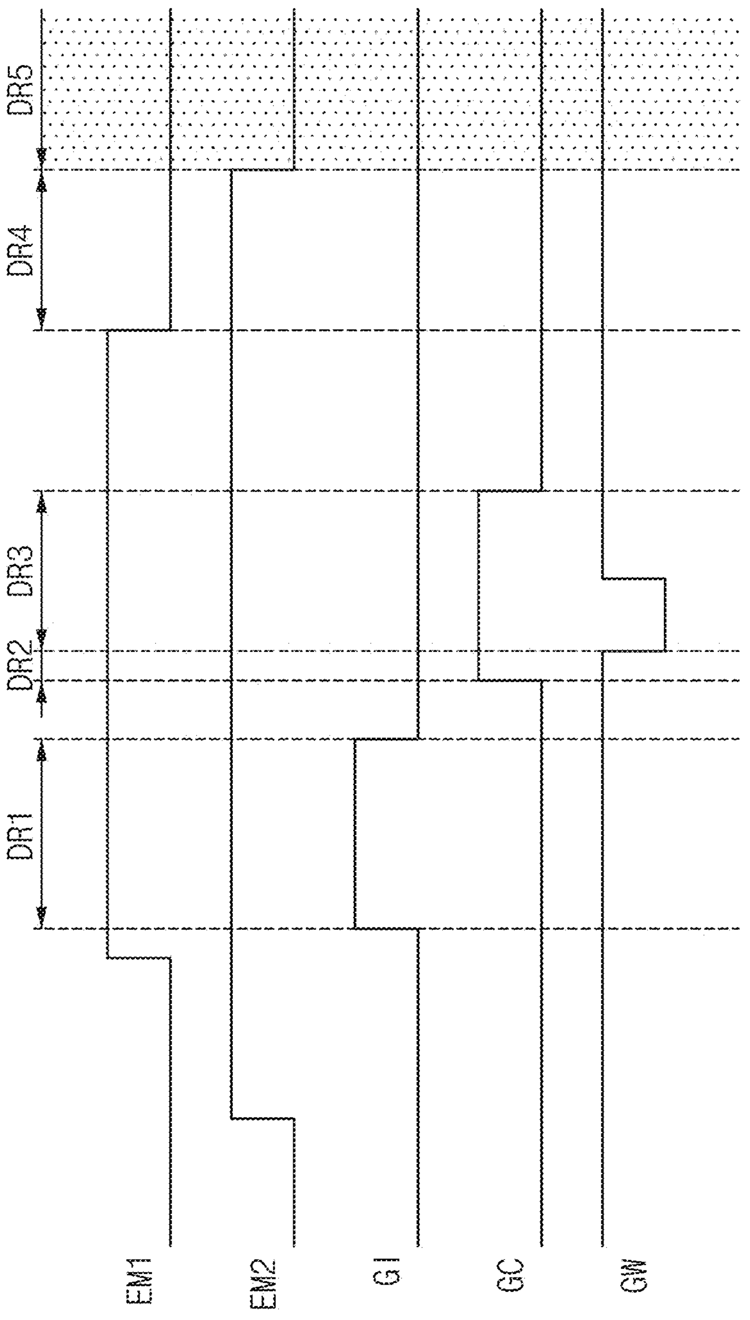
FIG. 52 is a timing diagram illustrating an example of an operation of the pixel circuit of FIG. 43 in a fifth period.
Figure 53:
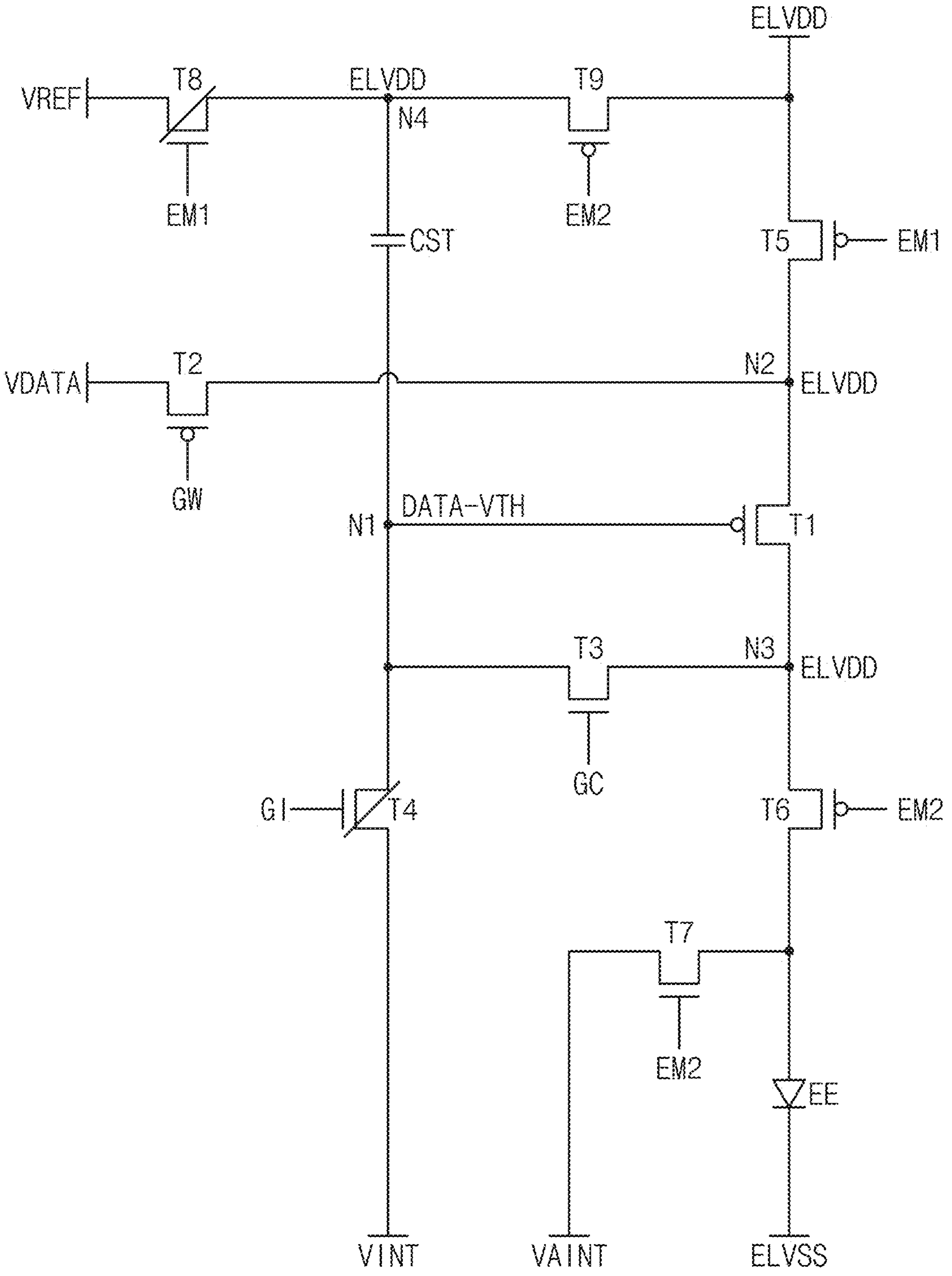
FIG. 53 is a circuit diagram illustrating an example of the operation of the pixel circuit of FIG. 43 in the fifth period.

FIG. 43 is a circuit diagram illustrating a pixel circuit of a display apparatus according to an embodiment of the present inventive concept. FIG. 44 is a timing diagram illustrating an example of an operation of the pixel circuit of FIG. 43 in a first period DR1. FIG. 45 is a circuit diagram illustrating an example of the operation of the pixel circuit of FIG. 43 in the first period DR1. FIG. 46 is a timing diagram illustrating an example of an operation of the pixel circuit of FIG. 43 in a second period DR2. FIG. 47 is a circuit diagram illustrating an example of the operation of the pixel circuit of FIG. 43 in the second period DR2. FIG. 48 is a timing diagram illustrating an example of an operation of the pixel circuit of FIG. 43 in a third period DR3. FIG. 49 is a circuit diagram illustrating an example of the operation of the pixel circuit of FIG. 43 in the third period DR3. FIG. 50 is a timing diagram illustrating an example of an operation of the pixel circuit of FIG. 43 in a fourth period DR4. FIG. 51 is a circuit diagram illustrating an example of the operation of the pixel circuit of FIG. 43 in the fourth period DR4. FIG. 52 is a timing diagram illustrating an example of an operation of the pixel circuit of FIG. 43 in a fifth period DR5. FIG. 53 is a circuit diagram illustrating an example of the operation of the pixel circuit of FIG. 43 in the fifth period DR5.

The pixel circuit of the display apparatus according to the present embodiment is substantially the same as the pixel circuit of the display apparatus of the previous embodiment explained referring to FIGS. 29 to 39 except that the first emission signal is applied to the control electrode of the eighth switching element. Thus, the same reference numerals will be used to refer to the same or like parts as those described in the previous embodiment of FIGS. 29 to 39 and any repetitive explanation concerning the above elements will be omitted.

Referring to FIGS. 1 and 43 to 53, the pixel circuit includes a light emitting element EE, a first switching element T1, a second switching element T2, a third switching element T3, a capacitor CST, a fifth switching element T5, a sixth switching element T6, an eighth switching element T8 and a ninth switching element T9.

The fifth switching element T5 includes a first electrode receiving a first power voltage ELVDD and a second electrode connected to the second node N2. The sixth switching element T6 includes a first electrode connected to the third node N3 and a second electrode connected to an anode electrode of the light emitting element EE.

In an embodiment, a signal applied to a control electrode of the fifth switching element T5 is different from a signal applied to a control electrode of the sixth switching element T6.

In an embodiment, a control electrode of the fifth switching element T5 receives a first emission signal EM1 and a control electrode of the sixth switching element T6 receives a second emission signal EM2 having a waveform different from a waveform of the first emission signal EM1.

The eighth switching element T8 includes a first electrode receiving a reference voltage VREF and a second electrode connected to the fourth node N4. The ninth switching element T9 includes a first electrode receiving a first power voltage ELVDD and a second electrode connected to the fourth node N4. One of the eighth switching element T8 and the ninth switching element T9 is an N-type transistor and the other is a P-type transistor.

In the present embodiment, the eighth switching element T8 may further include a control electrode receiving the first emission signal EM1. In addition, the ninth switching element T9 may further include a control electrode receiving the second emission signal EM2. In an embodiment, a waveform of the first emission signal EM1 is different from that of the second emission signal EM2.

In the present embodiment, the eighth switching element T8 may be an N-type transistor and the ninth switching element T9 may be a P-type transistor. The signals (the first emission signal EM1 and the second emission signal EM2) having similar timings may be applied to the control electrode of the eighth switching element T8 and the control electrode of the ninth switching element T9. Thus, when the eight switching element T8 is turned on, the ninth switching element T9 may be generally turned off. When the eight switching element T8 is turned off, the ninth switching element T9 may be turned on.

The pixel circuit may further include a fourth switching element T4 and a seventh switching element T7.

The fourth switching element T4 may include a control electrode receiving an initialization gate signal GI, a first electrode connected to the first node N1 and a second electrode receiving a first initialization voltage VINT.

In the present embodiment, the seventh switching element T7 may include a control electrode receiving the second emission signal EM2, a first electrode receiving a second initialization voltage VAINT and a second electrode connected to the anode electrode.

The timing diagrams in FIGS. 44, 46, 48, 50 and 52 are substantially the same as the timing diagrams in FIGS. 30, 32, 34, 36 and 38 except for the waveform of the first emission signal EM1 and the second emission signal EM2.

In a period prior to the first period DR1 in FIG. 30, the second emission signal EM2 may rise after a rise of the first emission signal EM1. For example, in FIG. 30, the second emission signal EM2 may rise after the first emission signal EM1 rises. In contrast, in a period prior to the first period DR1 in FIG. 44, the first emission signal EM1 may rise after a rise of the second emission signal EM2. For example, in FIG. 44, the first emission signal EM1 may rise after the second emission signal EM2 has risen. When the first emission signal EM1 rises after a rise of the second emission signal EM2 in FIG. 44, the eight switching element T8 and the ninth switching element T9 may not be simultaneously turned on so that a reliability of the pixel circuit may be enhanced.

The operation of the pixel of FIG. 43 in the first period DR1 which is illustrated in FIGS. 44 and 45 may be substantially the same as the operation of the pixel of FIG. 29 in the first period DR1 which is illustrated in FIGS. 30 and 31.

The operation of the pixel of FIG. 43 in the second period DR2 which is illustrated in FIGS. 46 and 47 may be substantially the same as the operation of the pixel of FIG. 29 in the second period DR2 which is illustrated in FIGS. 32 and 33.

The operation of the pixel of FIG. 43 in the third period DR3 which is illustrated in FIGS. 48 and 49 may be substantially the same as the operation of the pixel of FIG. 29 in the third period DR3 which is illustrated in FIGS. 34 and 35.

The operation of the pixel of FIG. 43 in the fourth period DR4 which is illustrated in FIGS. 50 and 51 may be substantially the same as the operation of the pixel of FIG. 29 in the fourth period DR4 which is illustrated in FIGS. 36 and 37.

The operation of the pixel of FIG. 43 in the fifth period DR5 which is illustrated in FIGS. 52 and 53 may be substantially the same as the operation of the pixel of FIG. 29 in the fifth period DR5 which is illustrated in FIGS. 38 and 39.

According to the present embodiment, the driving current IEE of the light emitting element EE may be determined based on the difference between the reference voltage VREF, which is lower than the first power voltage ELVDD, and the data voltage VDATA in the pixel circuit. Thus, the power consumption of the pixel circuit may be reduced.

In addition, the bias operation of the first switching element T1 may be performed in the bias period DR4 when different signals are applied to the control electrode of the fifth switching element T5 and the control electrode of the sixth switching element T6. In this state, the first switching element T1 and the fifth switching element T5 are turned on while the sixth switching element T6 is turned off. Thus, the hysteresis characteristics of the first switching element T1 may be enhanced so that the display quality of the display panel 100 may be enhanced.

Figure 54:
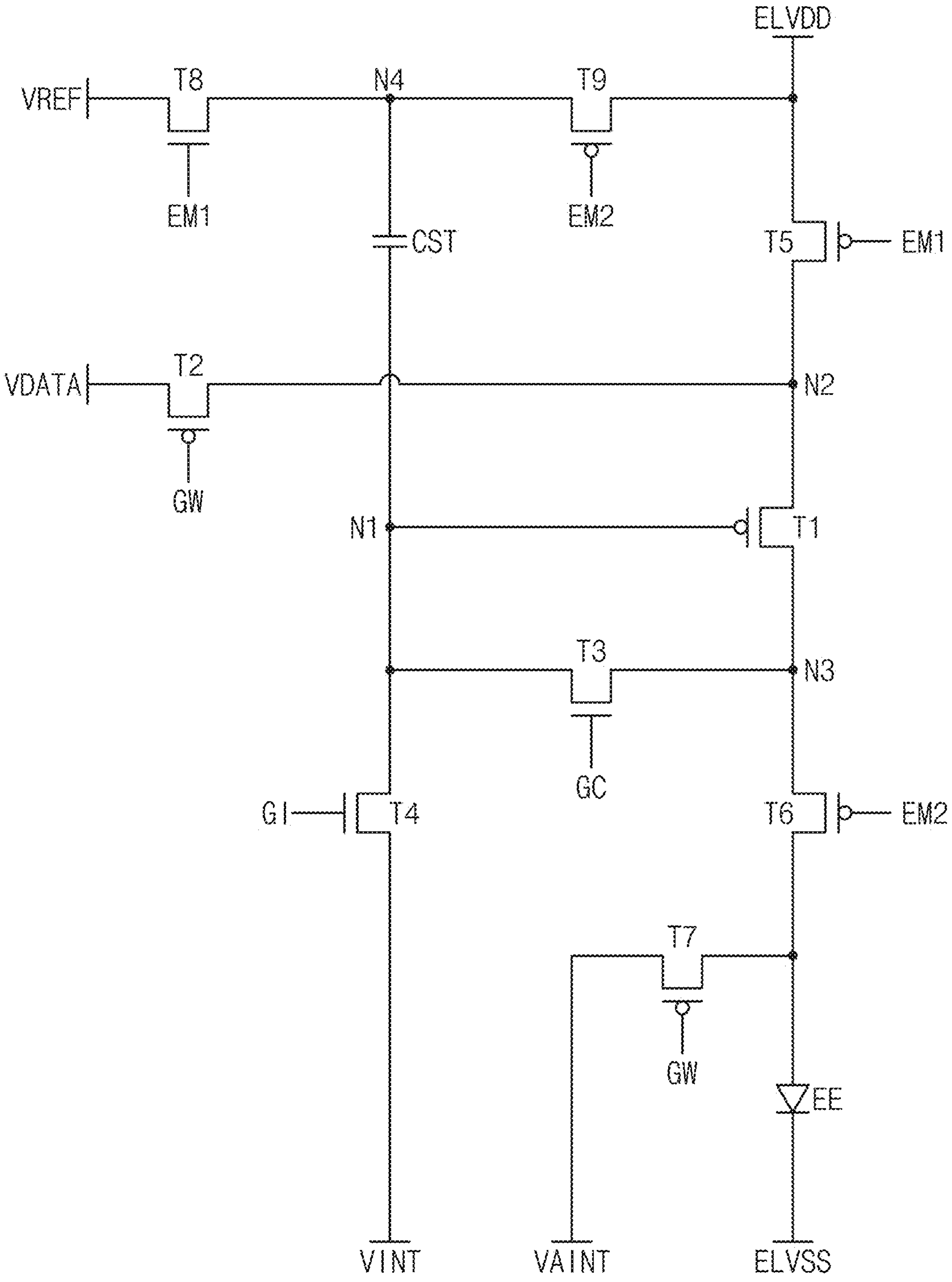
FIG. 54 is a circuit diagram illustrating a pixel circuit of a display apparatus according to an embodiment of the present inventive concept.

FIG. 54 is a circuit diagram illustrating a pixel circuit of a display apparatus according to an embodiment of the present inventive concept.

The pixel circuit of the display apparatus according to the present embodiment is substantially the same as the pixel circuit of the display apparatus of the previous embodiment explained referring to FIG. 40 except that the first emission signal is applied to the control electrode of the eighth switching element. Thus, the same reference numerals will be used to refer to the same or like parts as those described in the previous embodiment of FIG. 40 and any repetitive explanation concerning the above elements will be omitted.

Referring to FIGS. 1 and 54, the pixel circuit includes a light emitting element EE, a first switching element T1, a second switching element T2, a third switching element T3, a capacitor CST, a fifth switching element T5, a sixth switching element T6, an eighth switching element T8 and a ninth switching element T9.

In an embodiment, a signal applied to a control electrode of the fifth switching element T5 is different from a signal applied to a control electrode of the sixth switching element T6.

In an embodiment, a control electrode of the fifth switching element T5 receives a first emission signal EM1 and a control electrode of the sixth switching element T6 receives a second emission signal EM2 having a waveform different from a waveform of the first emission signal EM1.

In an embodiment, one of the eighth switching element T8 and the ninth switching element T9 is an N-type transistor and the other is a P-type transistor. For example, the eighth switching element T8 and the ninth switching element T9 is an N-type transistor may be complementary transistors. The eighth switching element T8 and the ninth switching element T9 may together form a Complementary Metal Oxide Semiconductor (CMOS) circuit.

In the present embodiment, the eighth switching element T8 may include a control electrode receiving the first emission signal EM1. In addition, the ninth switching element T9 may include a control electrode receiving the second emission signal EM2.

In the present embodiment, the seventh switching element T7 may include a control electrode receiving the data writing gate signal GW, a first electrode receiving a second initialization voltage VAINT and a second electrode connected to the anode electrode. For example, the seventh switching element T7 may be the P-type transistor.

According to the present embodiment, the driving current IEE of the light emitting element EE may be determined based on the difference between the reference voltage VREF, which is lower than the first power voltage ELVDD, and the data voltage VDATA in the pixel circuit. Thus, the power consumption of the pixel circuit may be reduced.

In addition, the bias operation of the first switching element T1 may be performed in the bias period DR4 when different signals are applied to the control electrode of the fifth switching element T5 and the control electrode of the sixth switching element T6. In this state, the first switching element T1 and the fifth switching element T5 are turned on while the sixth switching element T6 is turned off. Thus, the hysteresis characteristics of the first switching element T1 may be enhanced so that the display quality of the display panel 100 may be enhanced.

Figure 55:
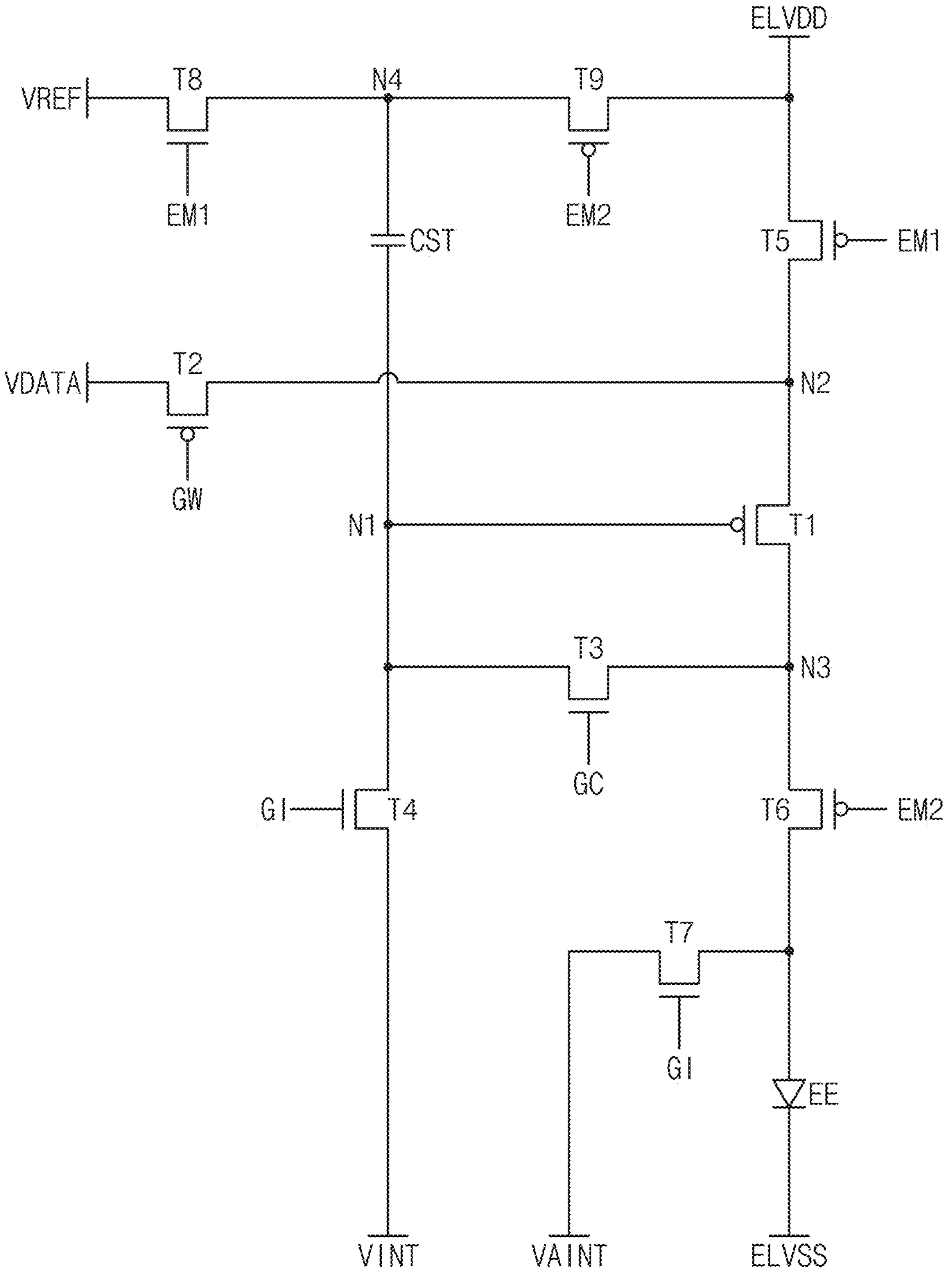
FIG. 55 is a circuit diagram illustrating a pixel circuit of a display apparatus according to an embodiment of the present inventive concept.

FIG. 55 is a circuit diagram illustrating a pixel circuit of a display apparatus according to an embodiment of the present inventive concept.

The pixel circuit of the display apparatus according to the present embodiment is substantially the same as the pixel circuit of the display apparatus of the previous embodiment explained referring to FIG. 41 except that the first emission signal is applied to the control electrode of the eighth switching element. Thus, the same reference numerals will be used to refer to the same or like parts as those described in the previous embodiment of FIG. 41 and any repetitive explanation concerning the above elements will be omitted.

Referring to FIGS. 1 and 55, the pixel circuit includes a light emitting element EE, a first switching element T1, a second switching element T2, a third switching element T3, a capacitor CST, a fifth switching element T5, a sixth switching element T6, an eighth switching element T8 and a ninth switching element T9.

In an embodiment, a signal applied to a control electrode of the fifth switching element T5 is different from a signal applied to a control electrode of the sixth switching element T6.

In an embodiment, a control electrode of the fifth switching element T5 receives a first emission signal EM1 and a control electrode of the sixth switching element T6 receives a second emission signal EM2 having a waveform different from a waveform of the first emission signal EM1.

In an embodiment, one of the eighth switching element T8 and the ninth switching element T9 is an N-type transistor and the other is a P-type transistor. For example, the eighth switching element T8 and the ninth switching element T9 may be complementary transistors. The eighth switching element T8 and the ninth switching element T9 together form a Complementary Metal Oxide Semiconductor (CMOS) circuit.

In the present embodiment, the eighth switching element T8 may include a control electrode receiving the first emission signal EM1. In addition, the ninth switching element T9 may include a control electrode receiving the second emission signal EM2.

In the present embodiment, the seventh switching element T7 may include a control electrode receiving the initialization gate signal GI, a first electrode receiving a second initialization voltage VAINT and a second electrode connected to the anode electrode. For example, the seventh switching element T7 may be the N-type transistor.

According to the present embodiment, the driving current IEE of the light emitting element EE may be determined based on the difference between the reference voltage VREF, which is lower than the first power voltage ELVDD, and the data voltage VDATA in the pixel circuit. Thus, the power consumption of the pixel circuit may be reduced.

In addition, the bias operation of the first switching element T1 may be performed in the bias period DR4 when different signals are applied to the control electrode of the fifth switching element T5 and the control electrode of the sixth switching element T6 and the first switching element T1. In this state, the fifth switching element T5 are turned on while the sixth switching element T6 is turned off. Thus, the hysteresis characteristics of the first switching element T1 may be enhanced so that the display quality of the display panel 100 may be enhanced.

Figure 56:
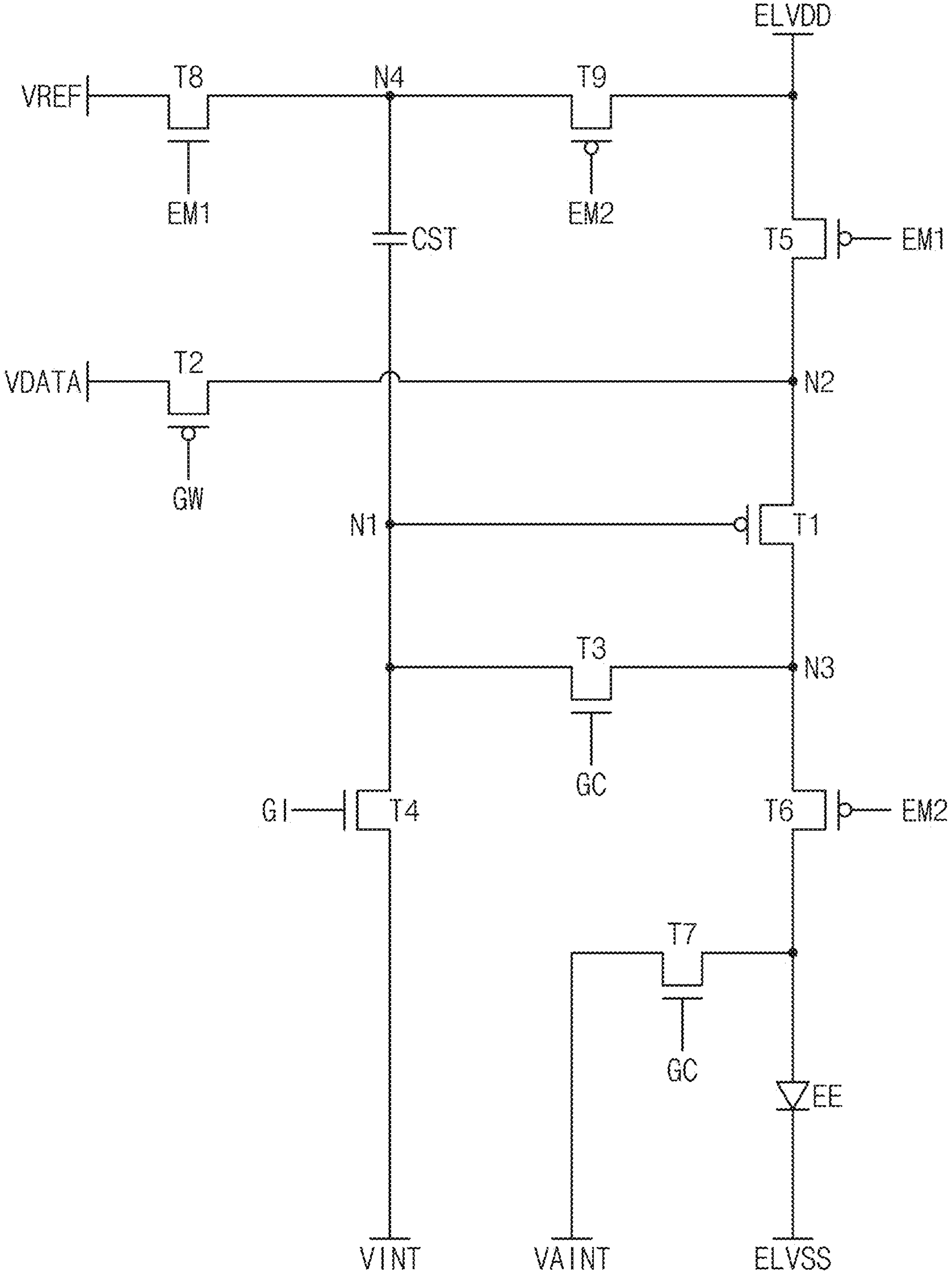
FIG. 56 is a circuit diagram illustrating a pixel circuit of a display apparatus according to an embodiment of the present inventive concept.

FIG. 56 is a circuit diagram illustrating a pixel circuit of a display apparatus according to an embodiment of the present inventive concept.

The pixel circuit of the display apparatus according to the present embodiment is substantially the same as the pixel circuit of the display apparatus of the previous embodiment explained referring to FIG. 42 except that the first emission signal is applied to the control electrode of the eighth switching element. Thus, the same reference numerals will be used to refer to the same or like parts as those described in the previous embodiment of FIG. 42 and any repetitive explanation concerning the above elements will be omitted.

Referring to FIGS. 1 and 56, the pixel circuit includes a light emitting element EE, a first switching element T1, a second switching element T2, a third switching element T3, a capacitor CST, a fifth switching element T5, a sixth switching element T6, an eighth switching element T8 and a ninth switching element T9.

In an embodiment, a signal applied to a control electrode of the fifth switching element T5 is different from a signal applied to a control electrode of the sixth switching element T6.

In an embodiment, a control electrode of the fifth switching element T5 receives a first emission signal EM1 and a control electrode of the sixth switching element T6 receives a second emission signal EM2 having a waveform different from a waveform of the first emission signal EM1.

In an embodiment, one of the eighth switching element T8 and the ninth switching element T9 is an N-type transistor and the other is a P-type transistor. For example, the eighth switching element T8 and the ninth switching element T9 may be complementary transistors. The eighth switching element T8 and the ninth switching element T9 may together form a Complementary Metal Oxide Semiconductor (CMOS) circuit.

In the present embodiment, the eighth switching element T8 may include a control electrode receiving the first emission signal EM1. In addition, the ninth switching element T9 may include a control electrode receiving the second emission signal EM2.

In the present embodiment, the seventh switching element T7 may include a control electrode receiving the compensation gate signal GC, a first electrode receiving a second initialization voltage VAINT and a second electrode connected to the anode electrode. For example, the seventh switching element T7 may be the N-type transistor.

According to the present embodiment, the driving current IEE of the light emitting element EE may be determined based on the difference between the reference voltage VREF, which is lower than the first power voltage ELVDD, and the data voltage VDATA in the pixel circuit. Thus, the power consumption of the pixel circuit may be reduced.

In addition, the bias operation of the first switching element T1 may be performed in the bias period DR4 when different signals are applied to the control electrode of the fifth switching element T5 and the control electrode of the sixth switching element T6. In this state, the first switching element T1 and the fifth switching element T5 are turned on while the sixth switching element T6 is turned off. Thus, the hysteresis characteristics of the first switching element T1 may be enhanced so that the display quality of the display panel 100 may be enhanced.

Figure 57:
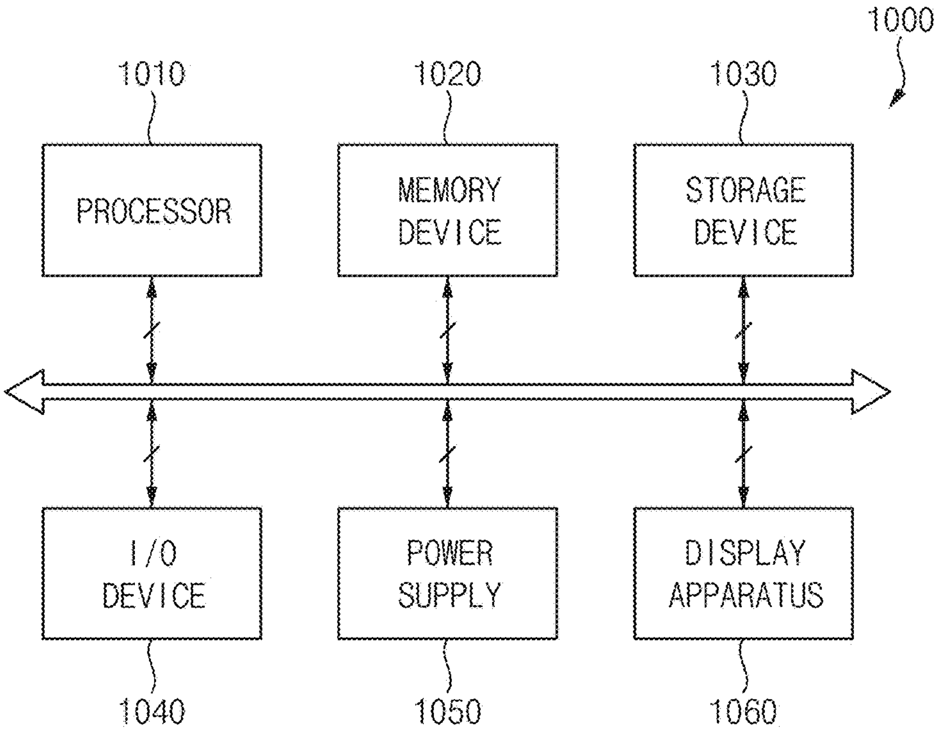
FIG. 57 is a block diagram illustrating an electronic apparatus according to an embodiment of the present inventive concept.
Figure 58:
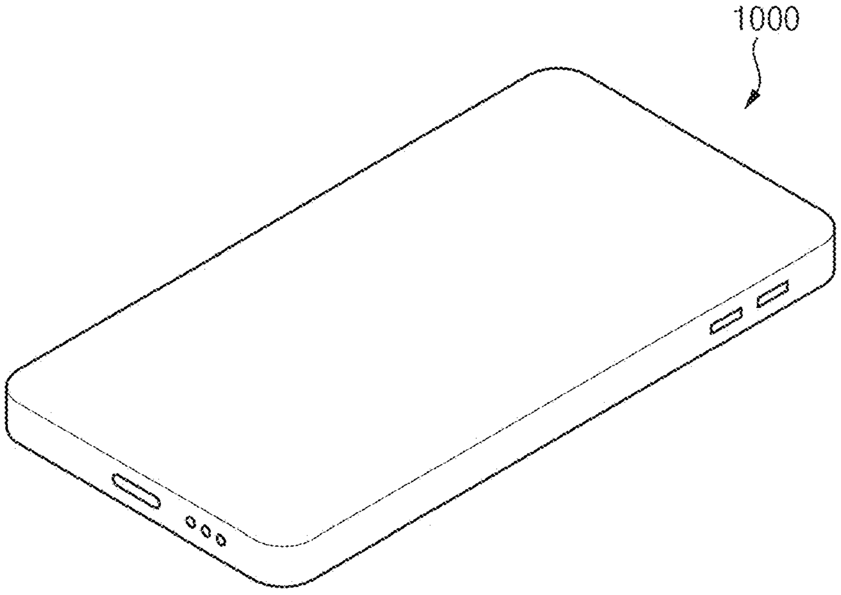
FIG. 58 is a diagram illustrating an example in which the electronic apparatus of FIG. 57 is implemented as a smart phone.

FIG. 57 is a block diagram illustrating an electronic apparatus 1000 according to an embodiment of the present inventive concept. FIG. 58 is a diagram illustrating an example in which the electronic apparatus 1000 of FIG. 57 is implemented as a smart phone.

Referring to FIGS. 57 and 58, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In an embodiment, the power supply 1050 supplies at least one of the first initialization voltage VINT, the second initialization voltage VAINT, the reference voltage VREF, the first power supply voltage ELVDD and the second power supply voltage ELVSS. In an embodiment, the reference voltage VREF is provided by the gamma reference voltage generator 400. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 58, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

According to the pixel circuit, the display apparatus and the electronic apparatus of the present embodiment as explained above, the pixel circuit may include the light emitting element having the driving current determined based on the difference between the reference voltage and the data voltage so that the power consumption of the display apparatus may be reduced. In addition, the hysteresis characteristics of the first switching element may be enhanced so that the display quality may be enhanced.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the present inventive concept. Accordingly, all such modifications are intended to be included within the scope of the present inventive concept. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims.

What is claimed is:

1. A pixel circuit comprising:

a light emitting element;

a first switching element including a control electrode connected to a first node, a first electrode connected to a second node and a second electrode connected to a third node;

a second switching element configured to apply a data voltage to the second node in response to a data writing gate signal;

a third switching element configured to connect the first node to the third node in response to a compensation gate signal;

a capacitor including a first electrode connected to the first node and a second electrode connected to a fourth node;

a fifth switching element including a first electrode configured to receive a first power voltage and a second electrode connected to the second node;

a sixth switching element including a first electrode connected to the third node and a second electrode connected to an anode electrode of the light emitting element;

an eighth switching element including a first electrode configured to receive a reference voltage and a second electrode connected to the fourth node; and a ninth switching element including a first electrode configured to receive the first power voltage and a second electrode connected to the fourth node, wherein one of the eighth switching element and the ninth switching element is an N-type transistor and the other is a P-type transistor, and wherein a signal applied to a control electrode of the fifth switching element is different from a signal applied to a control electrode of the sixth switching element and different from a signal applied to a control electrode of the ninth switching element.

2. The pixel circuit of claim 1, wherein the reference voltage is lower than the first power voltage.

3. The pixel circuit of claim 1, wherein driving current of the light emitting element is determined based on a difference between the reference voltage and the data voltage.

4. The pixel circuit of claim 1, wherein the eighth switching element further includes a control electrode configured to receive a bias gate signal, and wherein the control electrode of the ninth switching element is configured to receive the bias gate signal.

5. The pixel circuit of claim 4, further comprising:

a fourth switching element including a control electrode configured to receive an initialization gate signal, a first electrode connected to the first node and a second electrode configured to receive a first initialization voltage; and a seventh switching element including a control electrode configured to receive the bias gate signal, a first electrode configured to receive a second initialization voltage and a second electrode connected to the anode electrode.

6. The pixel circuit of claim 5, wherein the seventh switching element and the eighth switching element are N-type transistors and the ninth switching element is the P-type transistor.

7. The pixel circuit of claim 5, wherein the seventh switching element and the eighth switching element are P-type transistors and the ninth switching element is the N-type transistor.

8. The pixel circuit of claim 4, further comprising:

a fourth switching element including a control electrode configured to receive an initialization gate signal, a first electrode connected to the first node and a second electrode configured to receive a first initialization voltage; and a seventh switching element including a control electrode configured to receive the data writing gate signal, a first electrode configured to receive a second initialization voltage and a second electrode connected to the anode electrode.

9. The pixel circuit of claim 4, further comprising:

a fourth switching element including a control electrode configured to receive an initialization gate signal, a first electrode connected to the first node and a second electrode configured to receive a first initialization voltage; and a seventh switching element including a control electrode configured to receive the initialization gate signal, a first electrode configured to receive a second initialization voltage and a second electrode connected to the anode electrode.

10. The pixel circuit of claim 4, further comprising:

a fourth switching element including a control electrode configured to receive an initialization gate signal, a first electrode connected to the first node and a second electrode configured to receive a first initialization voltage; and a seventh switching element including a control electrode configured to receive the compensation gate signal, a first electrode configured to receive a second initialization voltage and a second electrode connected to the anode electrode.

11. The pixel circuit of claim 4, further comprising:

a fourth switching element including a control electrode configured to receive an initialization gate signal, a first electrode connected to the first node and a second electrode configured to receive a first initialization voltage; and a seventh switching element including a control electrode configured to receive an emission signal, a first electrode configured to receive a second initialization voltage and a second electrode connected to the anode electrode.

12. The pixel circuit of claim 1, wherein the control electrode of the fifth switching element is configured to receive the compensation gate signal, and wherein the control electrode of the sixth switching element is configured to receive an emission signal.

13. The pixel circuit of claim 1, wherein the third switching element and the eighth switching element are N-type transistors, and wherein the first switching element, the second switching element, the fifth switching element, the sixth switching element and the ninth switching element are P-type transistors.

14. The pixel circuit of claim 1, further comprising a fourth switching element including a control electrode configured to receive an initialization gate signal, a first electrode connected to the first node and a second electrode configured to receive a first initialization voltage, wherein the eighth switching element further comprises a control electrode configured to receive a bias gate signal, wherein the control electrode of the ninth switching element is configured to receive the bias gate signal, wherein the control electrode of the fifth switching element is configured to receive the compensation gate signal, and wherein the control electrode of the sixth switching element is configured to receive an emission signal.

15. The pixel circuit of claim 14, wherein the emission signal has an inactive level in a first period, wherein the initialization gate signal has an active level in the first period, wherein the compensation gate signal has an inactive level in the first period, wherein the data writing gate signal has an inactive level in the first period, and wherein the bias gate signal has an inactive level in the first period.

16. The pixel circuit of claim 15, wherein the emission signal has the inactive level in a second period subsequent to the first period, wherein the initialization gate signal has an inactive level in the second period, wherein the compensation gate signal has an active level in the second period, wherein the data writing gate signal has the inactive level in the second period, and wherein the bias gate signal has an active level in the second period.

17. The pixel circuit of claim 16, wherein the emission signal has the inactive level in a third period subsequent to the second period, wherein the initialization gate signal has the inactive level in the third period, wherein the compensation gate signal has the active level in the third period, wherein the data writing gate signal has an active level in the third period, and wherein the bias gate signal has the active level in the third period.

18. The pixel circuit of claim 17, wherein the emission signal has the inactive level in a fourth period subsequent to the third period, wherein the initialization gate signal has the inactive level in the fourth period, wherein the compensation gate signal has the inactive level in the fourth period, wherein the data writing gate signal has the inactive level in the fourth period, and wherein the bias gate signal has the active level in the fourth period.

19. The pixel circuit of claim 18, wherein the emission signal has an active level in a fifth period subsequent to the fourth period, wherein the initialization gate signal has the inactive level in the fifth period, wherein the compensation gate signal has the inactive level in the fifth period, wherein the data writing gate signal has the inactive level in the fifth period, and wherein the bias gate signal has the inactive level in the fifth period.

20. The pixel circuit of claim 14, wherein the emission signal has an inactive level in a first period, wherein the initialization gate signal has an active level in the first period, wherein the compensation gate signal has an active level in the first period, wherein the data writing gate signal has an inactive level in the first period, and wherein the bias gate signal has an inactive level in the first period.

21. The pixel circuit of claim 1, wherein the control electrode of the fifth switching element is configured to receive a first emission signal, wherein the control electrode of the sixth switching element is configured to receive a second emission signal having a waveform different from a waveform of the first emission signal, and wherein the control electrode of the ninth switching element is configured to receive the second emission signal.

22. The pixel circuit of claim 21, wherein the eighth switching element further includes a control electrode configured to receive the second emission signal.

23. The pixel circuit of claim 21, wherein the eighth switching element further includes a control electrode configured to receive the first emission signal.

24. The pixel circuit of claim 21, further comprising:

a fourth switching element including a control electrode configured to receive an initialization gate signal, a first electrode connected to the first node and a second electrode configured to receive a first initialization voltage; and a seventh switching element including a control electrode configured to receive the second emission signal, a first electrode configured to receive a second initialization voltage and a second electrode connected to the anode electrode.

25. The pixel circuit of claim 24, wherein the first emission signal has an inactive level in a first period, wherein the second emission signal has an inactive level in the first period, wherein the initialization gate signal has an active level in the first period, wherein the compensation gate signal has an inactive level in the first period, wherein the data writing gate signal has an inactive level in the first period, wherein the first emission signal has the inactive level in a second period subsequent to the first period, wherein the second emission signal has the inactive level in the second period, wherein the initialization gate signal has an inactive level in the second period, wherein the compensation gate signal has an active level in the second period, wherein the data writing gate signal has the inactive level in the second period, wherein the first emission signal has the inactive level in a third period subsequent to the second period, wherein the second emission signal has the inactive level in the third period, wherein the initialization gate signal has the inactive level in the third period, wherein the compensation gate signal has the active level in the third period, wherein the data writing gate signal has an active level in the third period, wherein the first emission signal has an active level in a fourth period subsequent to the third period, wherein the second emission signal has the inactive level in the fourth period, wherein the initialization gate signal has the inactive level in the fourth period, wherein the compensation gate signal has the inactive level in the fourth period, wherein the data writing gate signal has the inactive level in the fourth period, wherein the first emission signal has the active level in a fifth period subsequent to the fourth period, wherein the second emission signal has an active level in the fifth period, wherein the initialization gate signal has the inactive level in the fifth period, wherein the compensation gate signal has the inactive level in the fifth period, and wherein the data writing gate signal has the inactive level in the fifth period.

26. The pixel circuit of claim 21, further comprising:

a fourth switching element including a control electrode configured to receive an initialization gate signal, a first electrode connected to the first node and a second electrode configured to receive a first initialization voltage; and a seventh switching element including a control electrode configured to receive the data writing gate signal, a first electrode configured to receive a second initialization voltage and a second electrode connected to the anode electrode.

27. The pixel circuit of claim 21, further comprising:

a fourth switching element including a control electrode configured to receive an initialization gate signal, a first electrode connected to the first node and a second electrode configured to receive a first initialization voltage; and a seventh switching element including a control electrode configured to receive the initialization gate signal, a first electrode configured to receive a second initialization voltage and a second electrode connected to the anode electrode.

28. The pixel circuit of claim 21, further comprising:

a fourth switching element including a control electrode configured to receive an initialization gate signal, a first electrode connected to the first node and a second electrode configured to receive a first initialization voltage; and a seventh switching element including a control electrode configured to receive the compensation gate signal, a first electrode configured to receive a second initialization voltage and a second electrode connected to the anode electrode.

29. A display device comprising:

a display panel including a pixel;

a gate driver;

a data driver configured to apply a data voltage; and a power supply configured to provide a first power voltage, wherein the pixel comprises:

a light emitting element;

a first switching element including a control electrode connected to a first node, a first electrode connected to a second node and a second electrode connected to a third node;

a second switching element configured to apply the data voltage to the second node in response to a data writing gate signal from the gate driver;

a third switching element configured to connect the first node to the third node in response to a compensation gate signal from the gate driver;

a capacitor including a first electrode connected to the first node and a second electrode connected to a fourth node;

a fifth switching element including a first electrode configured to receive the first power voltage and a second electrode connected to the second node;

a sixth switching element including a first electrode connected to the third node and a second electrode connected to an anode electrode of the light emitting element;

an eighth switching element including a first electrode configured to receive a reference voltage and a second electrode connected to the fourth node; and a ninth switching element including a first electrode configured to receive the first power voltage and a second electrode connected to the fourth node, wherein the eighth switching element and the ninth switching element are complementary transistors, and wherein a signal applied to a control electrode of the fifth switching element is different from a signal applied to a control electrode of the sixth switching element and different from a signal applied to a control electrode of the ninth switching element.

30. An electronic device comprising:

a display device; and a power supply configured to provide a first power voltage to the display device, wherein the display device comprises:

a gate driver;

an emission driver;

a data driver configured to apply a data voltage; and a pixel comprising:

a light emitting element;

a first switching element including a control electrode connected to a first node, a first electrode connected to a second node and a second electrode connected to a third node;

a second switching element configured to apply the data voltage to the second node in response to a data writing gate signal from the gate driver;

a third switching element configured to connect the first node to the third node in response to a compensation gate signal from the gate driver;

a capacitor including a first electrode connected to the first node and a second electrode connected to a fourth node;

a fifth switching element including a first electrode configured to receive a first power voltage and a second electrode connected to the second node;

a sixth switching element including a first electrode connected to the third node and a second electrode connected to an anode electrode of the light emitting element;

an eighth switching element including a first electrode configured to receive a reference voltage and a second electrode connected to the fourth node; and a ninth switching element including a first electrode configured to receive the first power voltage and a second electrode connected to the fourth node, wherein the eighth switching element and the ninth switching element are complementary transistors, and wherein a signal applied to a control electrode of the fifth switching element by the gate driver is different from a signal applied to a control electrode of the sixth switching element by the emission driver and different from a signal applied to a control electrode of the ninth switching element by the gate driver.

* * * * *